United States Patent
Haro

(10) Patent No.: US 11,568,646 B2
(45) Date of Patent: Jan. 31, 2023

(54) REAL-TIME VIDEO DIMENSIONAL TRANSFORMATIONS OF VIDEO FOR PRESENTATION IN MIXED REALITY-BASED VIRTUAL SPACES

(71) Applicant: Kickback Space Inc., Carlsbad, CA (US)

(72) Inventor: Rocco Haro, Carlsbad, CA (US)

(73) Assignee: Kickback Space Inc., Carlsbad, CA (US)

( * ) Notice: Subject to any disclaimer, the term of this patent is extended or adjusted under 35 U.S.C. 154(b) by 0 days.

(21) Appl. No.: 17/682,910

(22) Filed: Feb. 28, 2022

(65) Prior Publication Data
US 2022/0277565 A1 Sep. 1, 2022

Related U.S. Application Data

(60) Provisional application No. 63/154,411, filed on Feb. 26, 2021.

(51) Int. Cl.
| | |
|---|---|
| G06V 20/40 | (2022.01) |
| G06V 40/20 | (2022.01) |
| G06T 19/00 | (2011.01) |
| G06V 40/16 | (2022.01) |

(52) U.S. Cl.
CPC ............ *G06V 20/46* (2022.01); *G06T 19/003* (2013.01); *G06T 19/006* (2013.01); *G06V 40/174* (2022.01); *G06V 40/23* (2022.01)

(58) Field of Classification Search
CPC ...... G06V 20/46; G06V 40/174; G06V 40/23; G06T 19/003; G06T 19/006
See application file for complete search history.

(56) References Cited

U.S. PATENT DOCUMENTS

| | | |
|---|---|---|
| 10,628,931 B1 | 4/2020 | Ramos et al. |
| 10,803,646 B1 | 10/2020 | Bogan, III et al. |
| 10,952,006 B1 | 3/2021 | Krol et al. |
| 10,979,672 B1 | 4/2021 | Krol et al. |
| 11,070,768 B1 | 7/2021 | Krol et al. |
| 11,076,128 B1 | 7/2021 | Krol et al. |

(Continued)

OTHER PUBLICATIONS

Bansal, A., Ma, S., Ramanan, D. and Sheikh, Y., 2018. Recycle-gan: Unsupervised video retargeting. In Proceedings of the European conference on computer vision (ECCV) (pp. 119-135).*

(Continued)

*Primary Examiner* — Zhitong Chen
(74) *Attorney, Agent, or Firm* — Cooley LLP

(57) ABSTRACT

A non-immersive virtual reality (NIVR) method includes receiving sets of images of a first user and a second user, each image from the sets of images being an image of the associated user taken at a different angle from a set of angles. Video of the first user and the second user is received and processed. A first location and a first field of view are determined for a first virtual representation of the first user, and a second location and a second field of view are determined for a second virtual representation of the second user. Frames are generated for video planes of each of the first virtual representation of the first user and the second virtual representation of the second user based on the processed video, the sets of images, the first and second locations, and the first and second fields of view.

20 Claims, 44 Drawing Sheets

(56) References Cited

U.S. PATENT DOCUMENTS

| | | | |
|---|---|---|---|
| 11,095,857 B1 | 8/2021 | Krol et al. | |
| 11,140,361 B1 | 10/2021 | Krol et al. | |
| 11,184,362 B1 | 11/2021 | Krol et al. | |
| 11,290,688 B1 | 3/2022 | Krol et al. | |
| 2009/0033737 A1 | 2/2009 | Goose et al. | |
| 2014/0040783 A1* | 2/2014 | Goldman | G06F 3/04815 715/757 |
| 2016/0300387 A1* | 10/2016 | Ziman | G06F 3/165 |
| 2020/0294317 A1 | 9/2020 | Segal | |
| 2020/0322395 A1 | 10/2020 | Copley et al. | |
| 2020/0322575 A1 | 10/2020 | Valli | |

OTHER PUBLICATIONS

Alam et al. "Sparse Simultaneous Recurrent Deep Learning for Robust Facial Expression Recognition", IEEE Transactions On Neural Networks and Learning Systems, 2018, 12 pages.

Bruno et al. "From 3D reconstruction to virtual reality: A complete methodology for digital archaeological exhibition", Journal of Cultural Heritage, 2010, vol. 11, p. 42-49.

Caroppo et al. "Comparison Between Deep Learning Models and Traditional Machine Learning Approaches for Facial Expression Recognition in Ageing Adults", Journal of Computer Science and Technology, 2020, vol. 35, No. 5, p. 1127-1146.

Kauff et al. "An Immersive 3D Video-Conferenceing System Using Shared Virtual Team User Environments", Conference Paper, Jan. 2020, 9 pages.

Lee et al. "Optimising the learning process with immersive virtual reality and non-immersive virtual reality in an educational environment", Int. J. Mobile Learning and Organisation, 2020, vol. 14, No. 1, p. 21-35.

Lin et al. "Robust High-Resolution Video Matting with Temporal Guidance", Proceedings of the IEEE, 2021, 14 pages.

Moon et al. "An Improved Early Detection Algorithm for All-Zero Blocks in H.264 Video Encoding", IEEE Transactions On Circuits and Systems for Video Technology, 2005, vol. 15, No. 8, p. 1053-1057.

International Search Report and Written Opinion for International Application No. PCT/US2022/018186 dated Jun. 24, 2022, 22 pages.

* cited by examiner

3000

Receive, via a processor and from a first user compute device of a NIVR system, the first user compute device associated with a first user, a first plurality of images of the first user, each image from the first plurality of images being an image of the first user taken at an associated angle from a plurality of different angles 3001

↓

Receive, via the processor and from a second user compute device associated with a second user, a second plurality of images of the second user, each image from the second plurality of images being an image of the second user taken at an associated angle from the plurality of different angles 3002

↓

Receive, via the processor and from the first user compute device, a first video of the first user 3003

↓

Process, via the processor, the first video to generate a first processed video 3004

↓

Receive, via the processor and from the second user compute device, a second video of the second user 3005

↓

Process, via the processor, the second video to generate a second processed video 3006

↓

Determine, via the processor and for a first virtual representation mirroring the first user, (1) a first location of the first virtual representation in a virtual environment, and (2) a first field of view of the first virtual representation in the virtual environment 3007

↓

(Continuing at FIG. 3B)

FIG. 3A (Continuing from FIG. 3A)

↓

Determine, via the processor and for a second virtual representation mirroring the second user, (1) a second location of the second virtual representation in the virtual environment, and (2) a second field of view of the second virtual representation in the virtual environment 3008

↓

Generate, via the processor, at least one first frame for a first video plane for the first virtual representation based on the first processed video, at least one image from the first plurality of images, the second location, the first field of view, and the second field of view 3009

↓

Generate, via the processor, at least one second frame for a second video plane for the second virtual representation based on the second processed video, at least one image from the second plurality of images, the first location, the second location, the first field of view, and the second field of view 3010

↓

Send, via the processor, at least one first signal representing the at least one first frame for the first video plane to at least one engine, to cause display, at the second user compute device, of the at least one first frame for the first video plane in the virtual environment to the second user 3011

↓

Send, via the processor, at least one second signal representing the at least one second frame for of the second video plane to the at least one engine, to cause display, at the first user compute device, of the second video plane in the virtual environment to the first user 3012

Receive, via a processor of a non-immersive virtual reality system, first state information indicating (1) a first location of a first virtual representation of a first user in a virtual environment, (2) a second location of a second virtual representation of a second user in the virtual environment, (3) a first field of view of the first virtual representation of the first user in the virtual environment, and (4) a second field of view of the second virtual representation of the second user in the virtual environment 4001

Receive, via the processor and from a first user compute device associated with the first user, a plurality of images of the first user, each image from the plurality of images being an image of the first user taken at an associated angle from a plurality of different angles 4002

Receive, via the processor and from the first user compute device, a first set of video frames of the first user 4003

Generate, via the processor and at a first time, a first set of frames for a video plane of the first virtual representation based on the first set of video frames, at least one image from the plurality of images, the first location, the second location, the first field of view, and the second field of view 4004

Send, via the processor, a first signal representing the first set of frames to at least one engine to cause a second user compute device associated with the second user to display the first set of frames in the virtual environment to the second user 4005

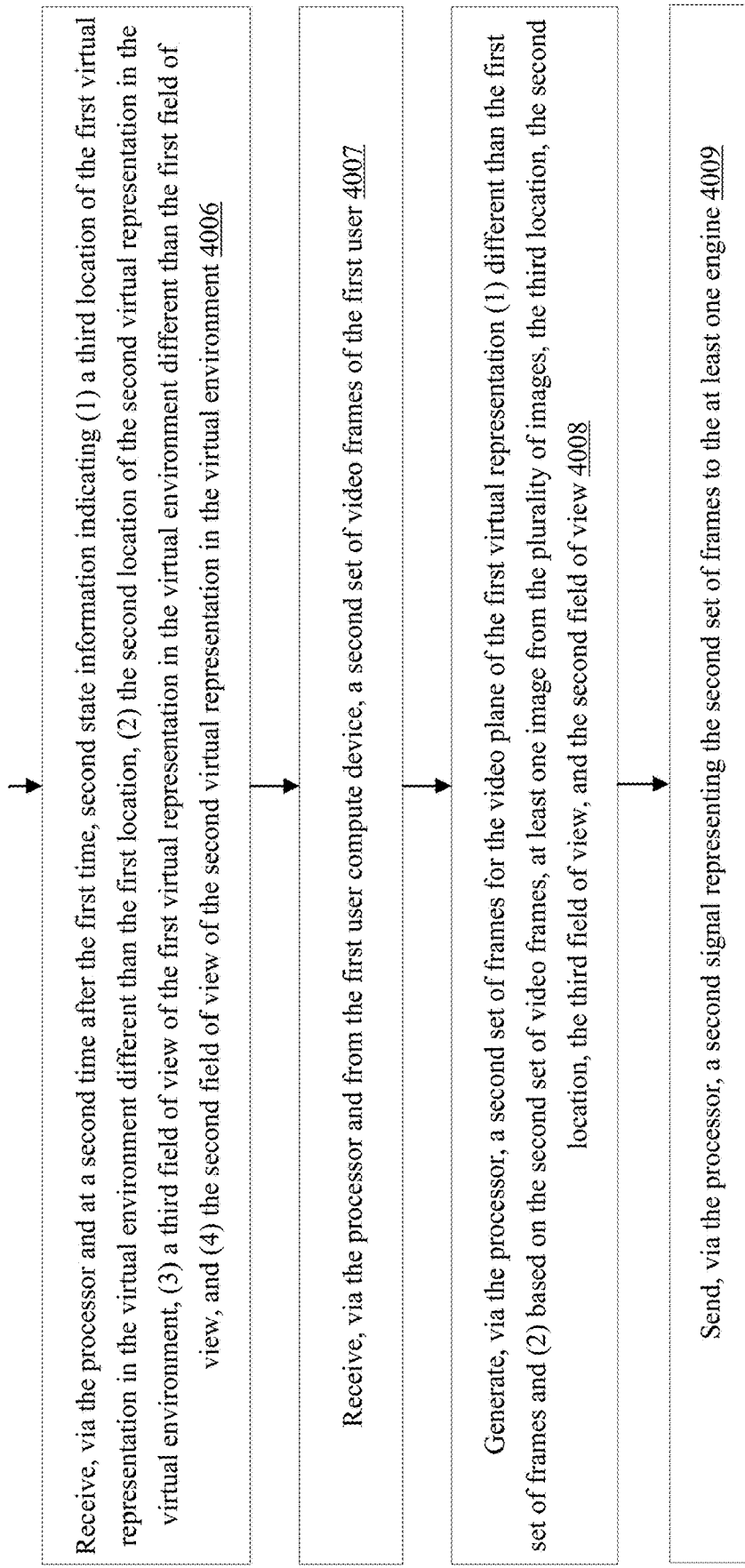

5000

Receive, via a processor and from N compute devices associated with N users, a plurality of sets of images, each set of images from the plurality of sets of images being associated with on user from the N users and including images of that user and taken at different angles, N being at least two 5001

Receive, via the processor and from the N compute devices, N videos, each video from the N videos associated with a unique user from the N users 5002

Process, via the processor, each frame from the N videos to generate N processed videos 5003

Receive, via the processor and for each time from a plurality of times, state information indicating, for each virtual representation of N virtual representations, where that virtual representation is associated with a user from the N users, a location for that virtual representation in a virtual environment at that time, and a viewing direction for that virtual representation in the virtual environment at that time 5004

Generate, via the processor and for each time from the plurality of times, (N) x (N-1) unique sets of frames for (N) x (N-1) video planes based on the state information, the N processed videos, and the plurality of sets of images, each set of frames from the (N) x (N-1) unique sets of frames associated with (1) one virtual representation from the N virtual representations, and (2) one video plane from the (N) x (N-1) video planes 5005

Causing, via the processor and using at least one engine, at least one compute device from the N compute devices to display (N-1) unique sets of frames from the (N) x (N-1) unique sets of frames within the virtual environment 5006

FIG. 5

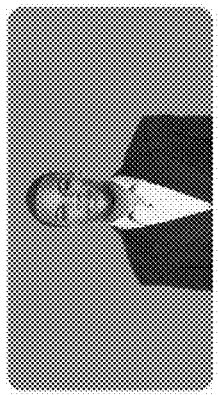
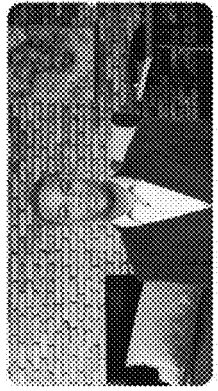
FIG. 7A

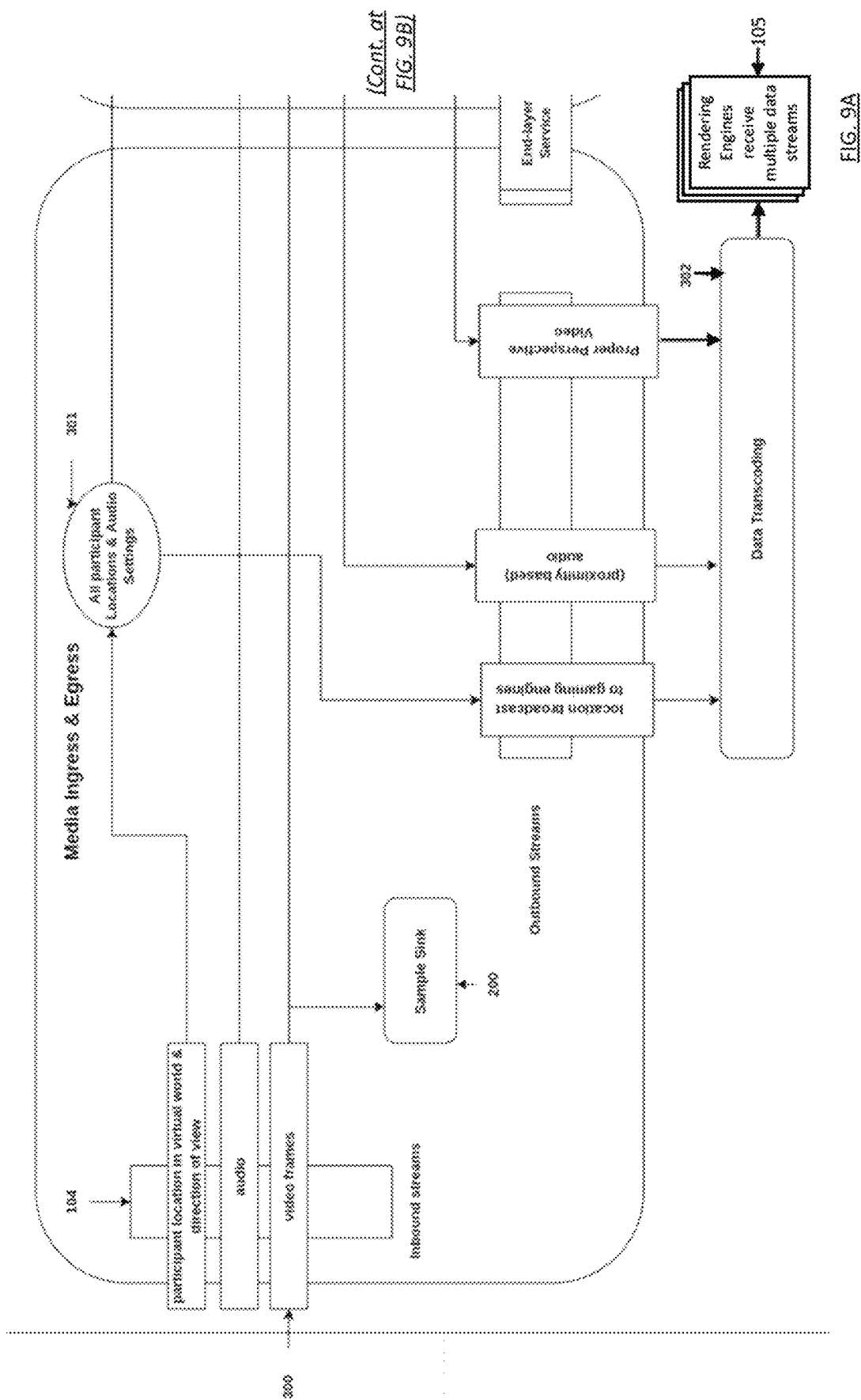

From a system perspective there may be 6 streams in total. U is the number of users in a room. With U = 3 (users "B," "R," and "G," represented as circles), each user will observe U-1 video planes. Here, the video planes for user B are shown. The video planes are represented as rectangles "R" and "G." Plane R supports a video feed of user R, and plane G supports a video feed of user G.

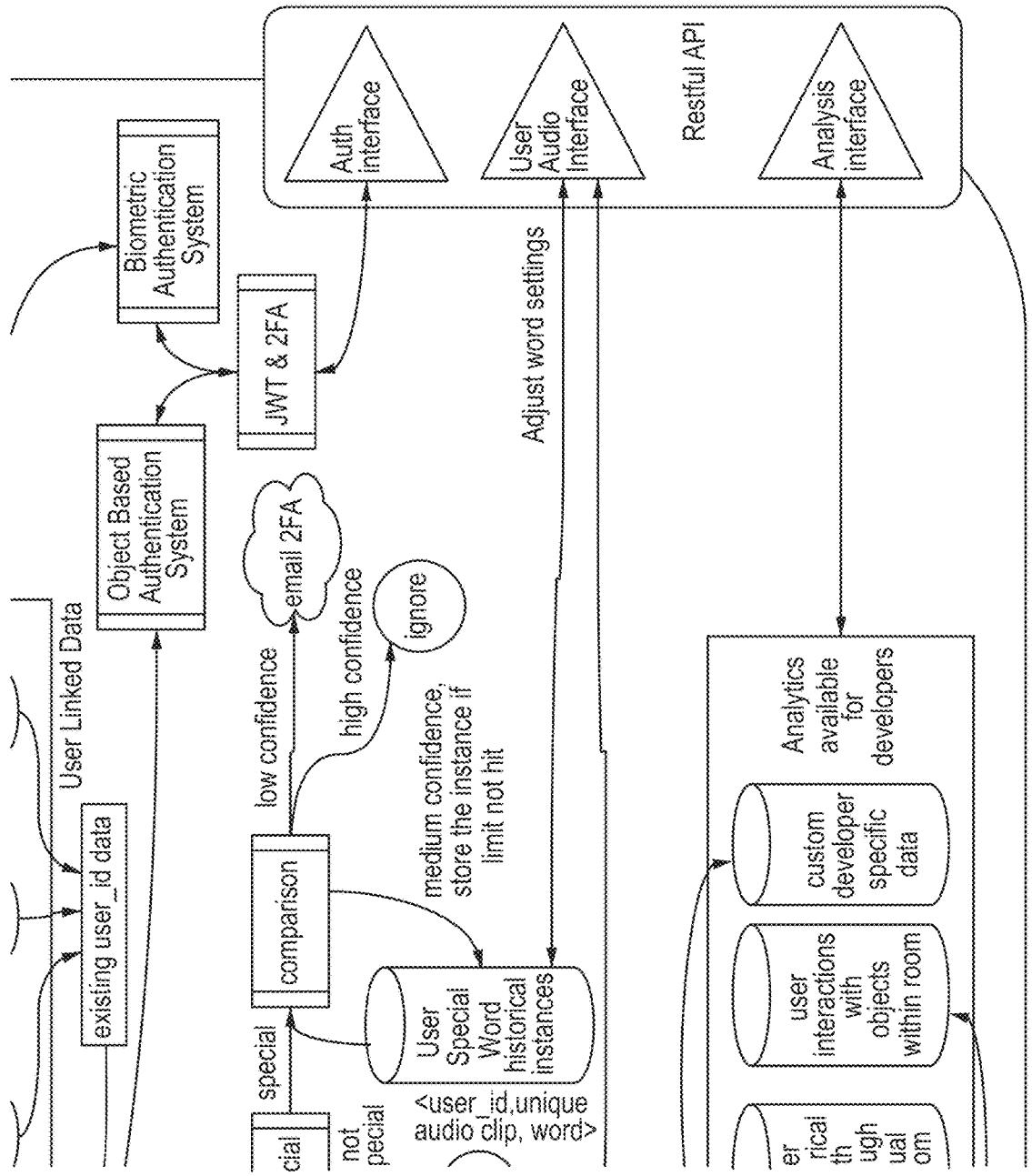

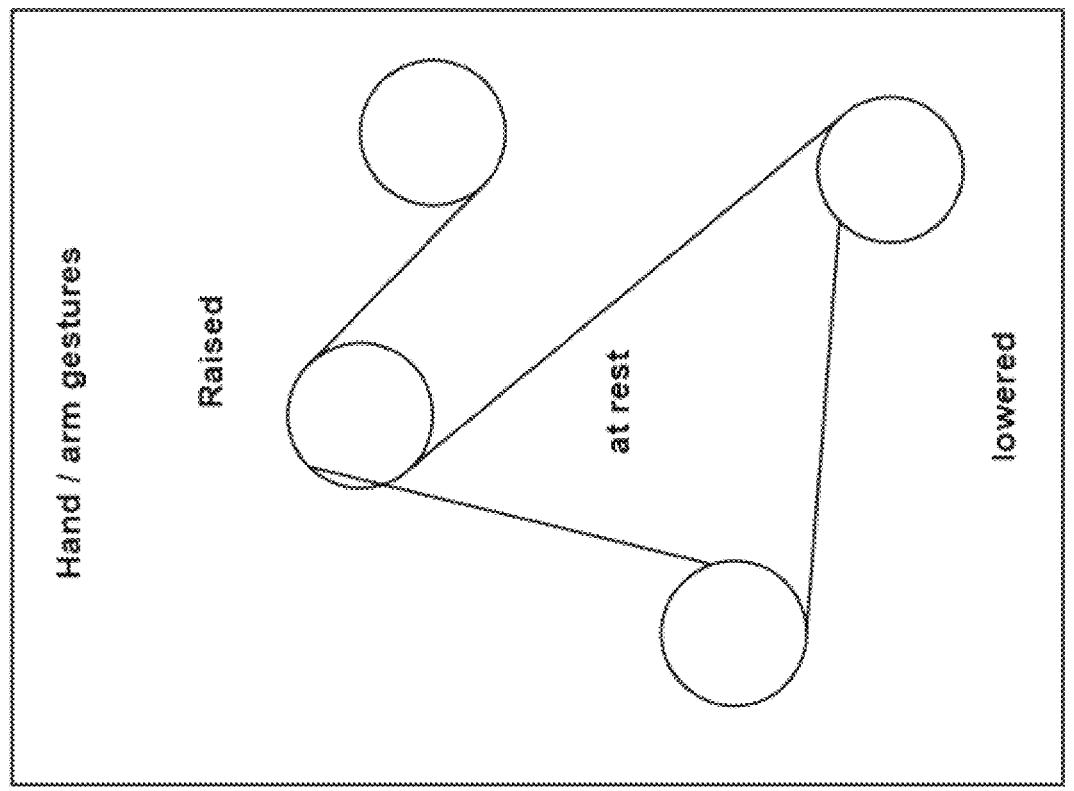
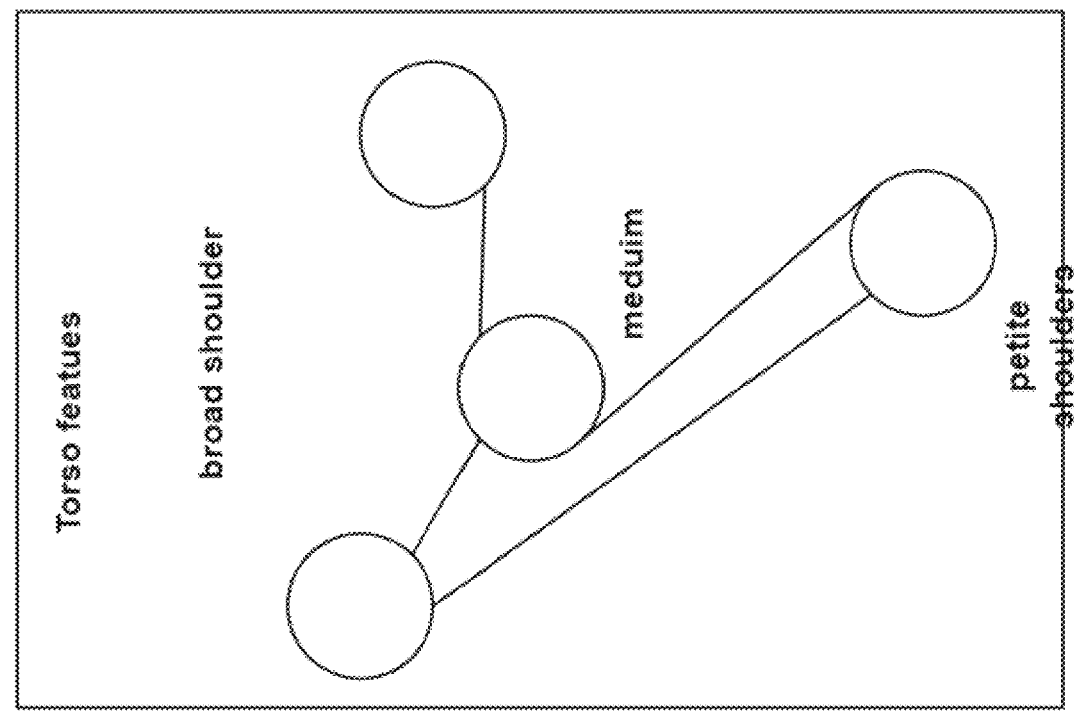
FIG. 24

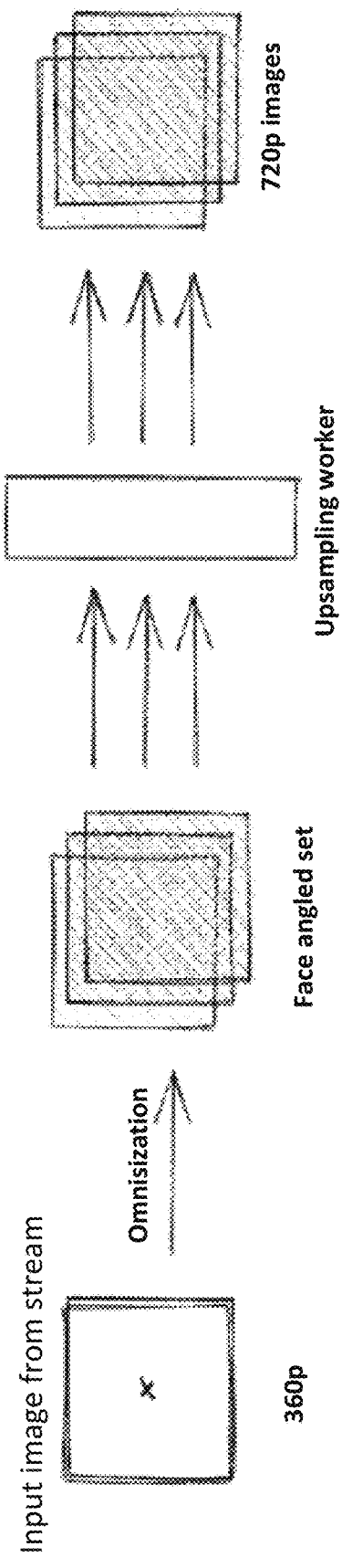

REAL-TIME VIDEO DIMENSIONAL TRANSFORMATIONS OF VIDEO FOR PRESENTATION IN MIXED REALITY-BASED VIRTUAL SPACES

CROSS-REFERENCE TO RELATED APPLICATIONS

This application claims priority to and the benefit of U.S. Provisional Patent Application No. 63/154,411, filed Feb. 26, 2021 and titled "DATA PROCESS & SYSTEM IMPLEMENTATION DESIGN FOR REAL-TIME VIDEO DIMENSIONAL TRANSFORMATIONS: CONVERT A USERS VIDEO INPUT INTO A LIVE THREE DIMENSIONAL REPRESENTATION WHICH IS CONSUMED IN A MIXED REALITY-BASED VIRTUAL SPACE," the contents of which are incorporated by reference herein in their entirety.

FIELD

The present disclosure generally relates to systems and methods for facilitating interactive virtual communication in non-immersive virtual reality video environments for two or more users.

BACKGROUND

Video communication (e.g., 3D chat rooms) can be desirable in certain scenarios. Video communication, however, can fail to express certain realities that exist when meeting in-person and/or fail to convey certain social cues.

SUMMARY

In some embodiments, a non-immersive virtual reality (NIVR) method includes receiving, via a processor and from a first user compute device of a non-immersive virtual reality system, a first plurality of images of the first user. The first user compute device is associated with a first user. Each image from the first plurality of images is an image of the first user taken at an associated angle from a plurality of different angles. A second plurality of images of a second user associated with a second user compute device of the non-immersive virtual reality system is received, via the processor and from the second user compute device. Each image from the second plurality of images is an image of the second user taken at an associated angle from the plurality of different angles. A first video of the first user is received via the processor and from the first user compute device. The first video is processed via the processor to generate a first processed video. A second video of the second user is received via the processor and from the second user compute device. The second video is processed via the processor to generate a second processed video. The method also includes determining, via the processor and for a first virtual representation of the first user: (1) a first location of the first virtual representation in a virtual environment, and (2) a first field of view of the first virtual representation in the virtual environment. The method also includes determining, via the processor and for a second virtual representation of the second user: (1) a second location of the second virtual representation in the virtual environment, and (2) a second field of view of the second virtual representation in the virtual environment. The method also includes generating, via the processor, at least one first frame for a first video plane of the first virtual representation based on the first processed video, at least one image from the first plurality of images, the first location, the second location, the first field of view, and the second field of view. The method also includes generating, via the processor, at least one second frame for a second video plane of the second virtual representation based on the second processed video, at least one image from the second plurality of images, the first location, the second location, the first field of view, and the second field of view. The method also includes sending, via the processor, at least one first signal representing the at least one first frame for the first video plane to at least one engine, to cause display, at the second user compute device, of the at least one first frame for the first video plane in the virtual environment to the second user. The method also includes sending, via the processor, at least one second signal representing the at least one second frame for the second video plane to the at least one engine, to cause display, at the first user compute device, of the at least one second frame for the second video plane in the virtual environment to the first user.

In some embodiments, a non-immersive virtual reality (NIVR) method includes receiving, via a processor of a non-immersive virtual reality system, first state information. The first state information indicates (1) a first location of a first virtual representation of a first user in a virtual environment, (2) a second location of a second virtual representation of a second user in the virtual environment, (3) a first field of view of the first virtual representation of the first user in the virtual environment, and (4) a second field of view of the second virtual representation of the second user in the virtual environment. The method also includes receiving, via the processor and from a first user compute device associated with the first user, a plurality of images of the first user, each image from the plurality of images being an image of the first user taken at an associated angle from a plurality of different angles. A first set of video frames of the first user is received via the processor and from the first user compute device. The method also includes generating, via the processor, a first set of frames for a video plane of the first virtual representation based on the first set of video frames, at least one image from the plurality of images, the first location, the second location, the first field of view, and the second field of view. The method also includes sending, via the processor, a first signal representing the first set of frames to at least one engine to cause a second user compute device associated with the second user to display the first set of frames in the virtual environment to the second user. The method also includes receiving, via the processor, second state information indicating (1) a third location of the first virtual representation in the virtual environment different than the first location, (2) the second location of the second virtual representation in the virtual environment, (3) a third field of view of the first virtual representation in the virtual environment different than the first field of view, and (4) the second field of view of the second virtual representation in the virtual environment. The method also includes receiving, via the processor and from the first user compute device, a second set of video frames of the first user. The method also includes generating, via the processor, a second set of frames for the video plane of the first virtual representation (1) different than the first set of frames and (2) based on the second set of video frames, at least one image from the plurality of images, the third location, the second location, the third field of view, and the second field of view. The method also includes sending, via the processor, a second signal representing the second set of frames to the at least one engine.

In some embodiments, a non-immersive virtual reality (NIVR) method includes receiving, via a processor and from N compute devices of a non-immersive virtual reality system, the N compute devices associated with N users, a plurality of sets of images. Each set of images from the plurality of sets of images is associated with one user from the N users and includes images of that user and taken at different angles, N being at least two. N videos are received via the processor and from the N compute devices, each video from the N videos associated with a unique user from the N users. Each frame from the N videos is processed, via the processor, to generate a N processed videos. The method also includes receiving, via the processor and for each time from a plurality of times, state information indicating, for each virtual representation that is from N virtual representations and that is associated with a user from the N users, (1) a location for that virtual representation in a virtual environment at that time, and (2) a viewing direction for that virtual representation in the virtual environment at that time. The method also includes generating, via the processor and for each time from the plurality of times, (N)×(N−1) unique sets of frames for (N)×(N−1) video planes based on the state information, the N processed videos, and the plurality of sets of images, each set of frames from the (N)×(N−1) unique sets of frames associated with (1) one virtual representation from the N virtual representations, and (2) one video plane from the (N)×(N−1) video planes. The method also includes causing, via the processor and using at least one engine, at least one compute device from the N compute devices to display (N−1) unique sets of frames from the (N)×(N−1) unique sets of frames within the virtual environment.

BRIEF DESCRIPTION OF THE DRAWINGS

FIG. 1C shows a screenshot of a virtual environment from a user's perspective, according to an embodiment.

FIGS. 3A and 3B show a flowchart of a method for hosting a meeting between multiple users in a virtual environment, according to an embodiment.

FIGS. 4A and 4B show a flowchart of a method for hosting a meeting between multiple users in a virtual environment, according to an embodiment.

FIG. 5 shows a flowchart of a method for hosting a meeting between multiple users in a virtual environment, according to an embodiment.

FIG. 7A illustrates a video capturing and processing process, according to an embodiment.

FIGS. 9A and 9B together show a sub-architecture for receiving and using input streams of media, according to an embodiment.

FIGS. 20A-20D show a data processing and heuristic-based pipeline, according to an embodiment.

FIG. 24 shows clusters for a torso, hand(s), and arm(s), according to an embodiment.

FIGS. 25A-25C illustrate generating 3D geometries of faces from frontal and/or angular posture, according to an embodiment.

DETAILED DESCRIPTION

Figure 1A:
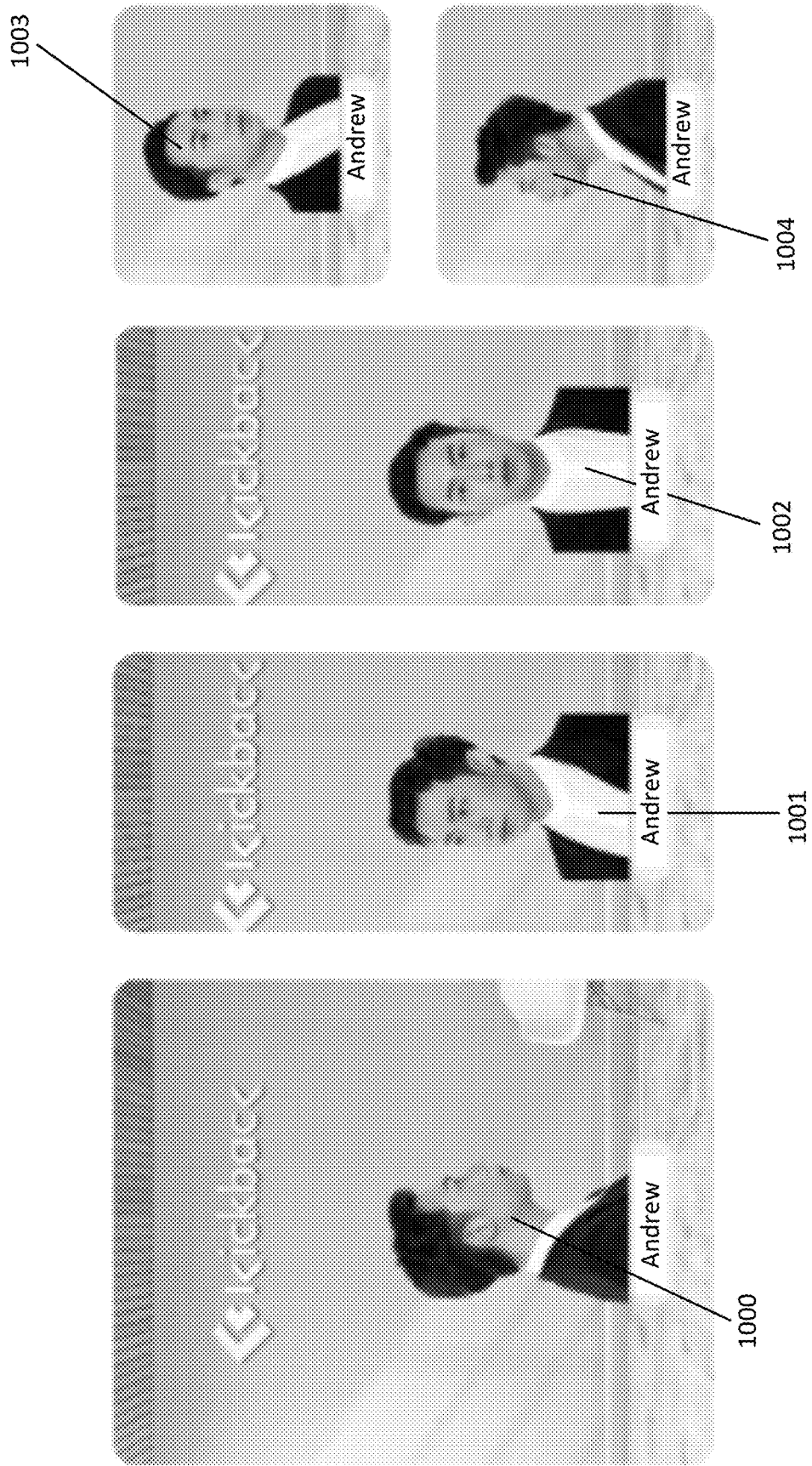
FIG. 1A shows multiple different perspective views of a virtual representation, according to an embodiment.

Some consumers prefer video collaboration tools over audio collaboration tools, because of the degree of interaction and familiarity that can be achieved between a caller and one or more callee(s), or among participants more generally, using video. There has therefore been increasing interest, within the video conferencing industry and particularly during the Covid era, in making technical advancements to video conferencing technologies. Improvements to video-based conference call quality has been lagging, however, due to factors such as non-uniformity in bandwidths, slow video compression techniques, and excessive dependence on hardware. Moreover, many video communication applications limit conversations within a group to communications in a one-to-many fashion, where the "one" is the only person who can be speaking at once, and the "many" are the other participants within that virtual session.

Three-dimensional (3D) chat rooms are increasingly popular among consumers and enthusiasts alike, and the availability of certain augmented reality equipment has generated interest in related commercial opportunities. Some known products that have been introduced in the market, however, require specialized hardware and software resources. For example, Google's Project Starline is a 3D video chat booth in which participants sit on opposing sides of a glass window. The hardware setup for Project Starline is rather extensive, in that it includes three capture pods capable of capturing both color imagery and depth data, four additional tracking cameras, four microphones, two loudspeakers, and infrared projectors. In total, color images from four viewpoints are captured along with three depth maps, for a total of seven video streams. The computing resources can include several NVIDIA graphic cards and robust RAM along with bandwidth speeds ranging from 30 to 100 Mbp. Audio spatialization also is a challenge due to the requirement of 3D-acoustic microphones. The Holoxica "TelePresence" system includes a depth camera and a Looking Glass light field display. 3D video calls are performed using Microsoft Azure Kinect 3D depth cameras, the Scotland 5G Centre, The Crichton Trust and Nokia's 5G infrastructure. Though Holoxica places 5G as the most vital criterion, there are a number of other unmentioned requirements which have to operate in synchronization, in order to achieve the kind of quality and comfort the company proposes.

Immersive Virtual Reality (IVR) systems facilitate interactions among users within a 3D virtual environment, while totally isolating the users from their "real" (i.e., non-virtual) surroundings (e.g., due to the users wearing virtual reality (VR) headsets, optionally with earphones, to block light and/or sound from the natural/real environment). Non-immersive virtual reality (VR) (NIVR) systems differ from IVR in that, for example, users can interact with other users while retaining the ability to view and control their physical surroundings (e.g., maintaining an awareness of sounds, visuals, and haptics within their real surroundings). NIVR can provide the user with a computer-generated environment in which they can view the virtual world in third person, second person, or first person. Digital content perception can also be different in NIVR than in IVR systems. For example, NIVR systems may be configured to display imagery projected in two dimensions (2D) while IVR may be configured to display 3D imagery including the depths of objects. NIVR systems can include one or more display terminals and/or one or more input devices/peripherals such as keyboards, mice and controllers. The user can thus interact with digital content presented via the NIVR display terminal(s). NIVR is the least immersive and interactive type of immersive technologies, followed by semi-immersive systems, then by (fully) immersive systems.

Some known video chat applications, regardless of the VR mode, may fail to appropriately convey social cues of non-verbal communication (e.g., involving eye contact or animated gestures). Although a live communication exchange may be occurring amongst the various participants in a chat room, a feeling of a timing mismatch can sometimes exist as a result of a mismatch between subjective human perception and the capabilities of the technology. Thus, an approach to processing and displaying a 3-D virtual reality environment that ingests real-time, user-generated communication media, and that modifies the media by taking into account human-centric perception can be desirable. Improvements to the quality of data provided by or associated with the user can also be desirable.

Systems and methods of the present disclosure address several of the shortcomings in known video teleconferencing technologies discussed above. For example, in some embodiments, a cloud-based (i.e., using cloud computing) 3D video chat software application takes, as inputs, video data generated by multiple cameras, and engineers (e.g., modifies, enhances, etc.) the video data to provide (or make available to) each user, within a multi-user arrangement, with multiple perspective views of each other user. The multiple perspective views can be provided to the users in real-time via a high bandwidth communication channel and with improved spatial audio, relative to known teleconferencing techniques. In some implementations, the system is an NIVR system that includes modules (in hardware and/or software) that implement one or more machine learning (ML) algorithms, such that the NIVR system can continuously (or according to a predefined schedule) learn from the inputs that it receives/processes. The NIVR system can also be configured to gather and store data representing body language and/or speech patterns of every user, as well as other data for use in performing data analytics. Unlike IVR systems, which typically use specialized equipment such as headsets and noise cancelling headphones, NIVR systems set forth herein can be implemented using only a web camera, a microphone, and a display monitor (each operably coupled to a processor, e.g., of a compute device such as a laptop computer, tablet, desktop computer, or smartphone). In other words, according to some implementations, NIVR environments of the present disclosure are generated and shown/displayed to users without the users wearing VR headsets. The encoding, decoding, and/or transcoding of audio data and video data can be carried out using hardware-accelerated methods and/or via cloud computing on a cloud server (e.g., a Kickback Space™ Cloud Server(s)). As used herein, cloud computing refers to the on-demand availability of computer system resources, such as data storage and processing power, without direct active management by the user(s) and/or without being hosted at the client device(s). Resources within a cloud computing environment can be referred to as being "in the cloud."

In some embodiments, an NIVR system uses one or more graphics processing units (GPUs) in the cloud. In some such implementations, the cloud can include one or more datacenters (e.g., from Google Cloud Platform (GCP), Amazon Web Services (AWS), Oracle, Microsoft® Azure, etc., or a rented civilian compute device provisioned via a decentralized compute network such as Salad.com and https://golem.network). Alternatively or in addition, the cloud can include or communicate with one or more decentralized networks, e.g., to achieve high-performance computing on the edge, to reduce latency, and/or to increase availability of the NIVR system/associated services globally. Additionally, in some embodiments, the NIVR system, during operation, does not transmit volumetric video, thereby substantially reducing bandwidth usage as contrasted with some known videoconferencing techniques. Additionally, in some embodiments, all engineered media processed by the NIVR system can be processed via hardware accelerated methods, with the exception of operations that take place on the compute device(s) of the users. NIVR systems set forth herein can generate and provide/display multiple unique perspectives of each user/participant to each other user/participant by feeding their real-time video (i.e., live data), previously captured images from different angles, and/or positional data into a deep learning model.

Unlike known IVR systems, which include specialized hardware needed for the generation and operation of their VR associated environments, NIVR systems set forth herein can leverage multiple GPUs (e.g., including third-party GPUs) to achieve the functionality to service at scale (e.g., thousands of users in one space), with dynamic adjustments to the resolution, bitrate, and/or frame rate (frames per second, FPS) of engineered user media such that users who are closer in proximity to a given user receive higher quality video, and users who are further away from the given user may receive a lower quality version of the video. In some implementations, a first set of dedicated GPUs may be used for real-time video processing, while a second set of dedicated GPUs may be used for other tasks such as environmental processing. The outputs of the video processing GPUs can be encoded and transmitted to the environmental processing GPUs, thereby forming a unique architecture. Moreover, for deployments "to the edge" (i.e., the deployment of computing and/or storage resources at the location where data is produced) via decentralized compute networks, a video processing GPU and an environment processing GPU may be dedicated/assigned to each user from a group of users, and a set of GPUs nearest to each user may be identified and used, depending on the application.

Some embodiments of the present disclosure relate to virtual meetings (e.g., in a non-immersive virtual environment). The virtual meetings can be held within a virtual environment, where the virtual environment can resemble a three-dimensional physical space (e.g., a classroom, a concert venue, a conference room, a retail store, an art gallery, etc.). Virtual representations of real-life users (also referred to herein as "users") can be located/presented/displayed within the virtual environment. The virtual environment can include multiple such virtual representations, where each virtual representation is associated with a different real-life user from a group of real-life users. Each of the virtual representations can "mirror" their associated user by changing as the associated user changes (e.g., such that a facial expression of a virtual representation is the same as or similar to a facial expression of the associated user, a body movement of the virtual representation is the same as or similar to a body movement of the associated user, etc.). The changing, or "minoring," can be performed in real-time, substantially in real-time, or with an associated time delay (e.g., a pre-defined time delay automatically set by the system or specified by one or more of the users). As used herein, "substantially in real-time" refers to the property of an action occurring simultaneously with or immediately after a triggering action, except for processing and/or transmission delays.

Virtual representations of a user can be stored and/or presented as one or more (e.g., a set of multiple different) "video planes," and the one or more video planes can be overlaid within a virtual environment. As used herein, a "video plane" refers to a dynamic two-dimensional dataset including image data such as pixel values and/or frames (e.g., video frames, which may include a subset of video frames captured using one or more cameras associated with a user). Different users can be presented with/shown different sets of one or multiple frames at a single video plane (e.g., different sizes, different perspective views, etc.) of a single virtual representation of other users, for example depending on the location and/or field of view of the virtual representation of the viewing user. Stated differently, a single virtual representation of a single user can be viewed by one or more other users, where each user from the one or more other users can see a different set of one or multiple frames within the video plane of that single virtual representation, depending on the number of other virtual representations (or the one or more other users) in the virtual environment, the field of view of each virtual representation, and the location of each virtual representation.

FIG. 1A shows an example of a video plane showing five different frames 1000, 1001, 1002, 1003, 1004, each associated with a different perspective view of a user (referred to as "Andrew") for a virtual representation of Andrew. In some implementations, each of the five different frames 1000, 1001, 1002, 1003, 1004 is associated with a different video plane from a set of video planes (e.g., for five different users each viewing a virtual representation of Andrew at a single point in time). In other implementations, the five different frames 1000, 1001, 1002, 1003, 1004 are associated with a single video plane (e.g., for one user viewing a virtual representation associated with Andrew across a period of time during with the perspective of the user relative to Andrew may change). In other words, a video plane may be capable of showing multiple (e.g., five or more) different perspective views of Andrew, and the video plane may be assigned to (or "anchored" to) a single unique viewing perspective (e.g., a point-of-view of another user who is viewing Andrew) at a given time. In still other implementations, the five different frames 1000, 1001, 1002, 1003, 1004 are associated with at least two different video planes. The contents of a video plane can depend on a computed angle request, discussed further herein. The frames 1000, 1001, 1002, 1003, 1004 of the video plane associated with Andrew's virtual representation mirror (at least a portion of) a real-life user named Andrew. Each of the five frames 1000, 1001, 1002, 1003, 1004 shows Andrew's virtual representation from a unique (i.e., different) perspective view. In some implementations, a "perspective view" refers to an angle/side that is shown of the associated real-life user in a video plane. For example, a first perspective view of a virtual representation could show the front of a real-life human's face and/or torso in the video plane (e.g., seen by one user), while a second perspective view (different than the first perspective view) of the same virtual representation could show a left side of that real-life human's face and/or torso in different video plane (e.g., seen by a different user). As seen in FIG. 1A, frame 1000 shows a right side perspective view of the virtual representation, frame 1001 shows a front left perspective view of the virtual representation, frame 1002 shows a front center perspective view of the virtual representation, frame 1003 shows a front right perspective view of the virtual representation, and frame 1004 shows a left side perspective view of the virtual representation.

Figure 1B:
FIG. 1B shows a screenshot of a virtual environment from a user's perspective, according to an embodiment.

A virtual environment can include multiple (i.e., a plurality of) virtual representations. Furthermore, each user can see other virtual representations in the virtual environment from a unique perspective view, where each user can see a virtual representation via a video plane. Said similarly, for each virtual representation in a virtual environment, each user can see a different set of frames for a single video plane of that virtual representation. Thus, where N virtual representations exist in a virtual environment, (N)×(N−1) video planes can exist within that virtual environment, and each video plane from the (N)×(N−1) video planes can be associated with (e.g., show, display) a unique (i.e., different) set of frames. FIG. 1B shows an example a screen that may be shown on the display of a user (i.e., a real-life human; referred to in this example as "Rocco") giving a presentation. In this example, FIG. 1B shows the virtual environment from the first-person point of view of a presenter in a classroom. Rocco may see a video 1005 of himself as he's speaking in his real-life environment (e.g., his bedroom, his living room, his home office, etc.), a panel 1013 displaying various video settings (e.g., hide webcam, mute, end show, notifications, viewer count, meeting title, notifications, other settings, etc.), a current slide 1007 that is being displayed on a virtual projection screen "behind" the virtual representation of that user, and a dashboard 1006 showing the current slide 1006, a previous slide, and a future slide.

Furthermore, at a given time, Rocco may see video planes 1008, 1009, 1010, 1011, 1012 of virtual representations within the virtual environment (i.e., virtual classroom), where the virtual representations are associated with (e.g., are controlled by and/or mirror) real-life humans Robert, Nivea, Tata, Riana, and Andrew, respectively. If, for example, Robert was to turn his head downward at a later time, Rocco would see Robert's head turn downward via new frames at the video plane 1008. If, as another example, Robert was to change from smiling to frowning, Rocco would see Robert change from smiling to frowning via new frames at the video plane 1008. If, as another example, the presenter, Rocco, was to input a command (e.g., via his keyboard or mouse) to move their virtual representation to slightly forward and to the right, (1) the video planes 1008, 1009, 1010, 1011, 1012 could increase in size (to indicate a closer relative distance), and (2) the video planes 1008, 1009, 1010, 1011, and 1012 could show a different perspective view of Robert, Nivea, Tata, Riana, and Andrew, respectively (by showing updated frames).

FIG. 1C shows an example of a screen that may be shown on the display of a user (i.e., Andrew) viewing a presentation given by the presenter (i.e., Rocco). Andrew may see video 1015 of himself as he's viewing a presentation given by Rocco, as well as a panel 1015 displaying various video settings (e.g., meeting title, download request, question request, other setting, time and/or duration, notifications, etc.). Furthermore, FIG. 1C shows a video plane 1014 of the virtual representation of Rocco from Andrew's first person perspective, as well as the video planes 1008, 1009, 1010, and 1011 Robert, Nivea, Tata, and Riana, respectively, at a given point in time. Note that the frames for the video planes 1008, 1009, 1010, 1011 are different in FIG. 1C compare to the frames for the video planes 1008, 1009, 1010, 1011 in FIG. 1B.

Because Andrew is at a different location in the virtual environment than Rocco, Andrew can see different frames representing the virtual representations of Robert, Nivea, Tata, and Riana compared to Rocco. For example, note that the video planes 1008, 1009, 1010, 1011 show different frames (i.e., are more translucent) in FIG. 1C relative to the frames from FIG. 1B, which can serve to indicate to Andrew that a back portion of the virtual representations are facing the virtual representation of Andrew. Also note that the frame for the video plane 1014 of Rocco is less translucent (i.e., not translucent), which can serve to indicate that a front portion of Rocco's virtual representation is facing Andrew's virtual representation. Alternatively, although not shown in FIG. 1C, Andrew can see frames showing the actual back portions of Robert, Nivea, Tata, and/or Riana (rather than seeing front portions of semi-translucent virtual representations) at video planes 1008, 1009, 1010, and/or 1011 (respectively).

Furthermore, as was the case for Rocco, if, for example, Robert was to turn his head downward at a later time, Andrew would see Robert's head turn downward via new frames for the video plane 1008. If, as another example, Robert was to change from smiling to frowning, Andrew would see Robert change from smiling to frowning via new frames for the video plane 1008B. If, as another example, Andrew was to input a command (e.g., via their keyboard or mouse) to move their virtual representation to slightly backwards and to the left, (1) the video planes 1008, 1009, 1010, 1011, 1014 could decrease in size (to indicate a farther relative distance), and (2) the video planes 1008, 1009, 1010, 1011, and 1014 could show a different perspective view of Robert, Nivea, Tata, Riana, and Rocco, respectively (by showing updated frames).

Figure 2:
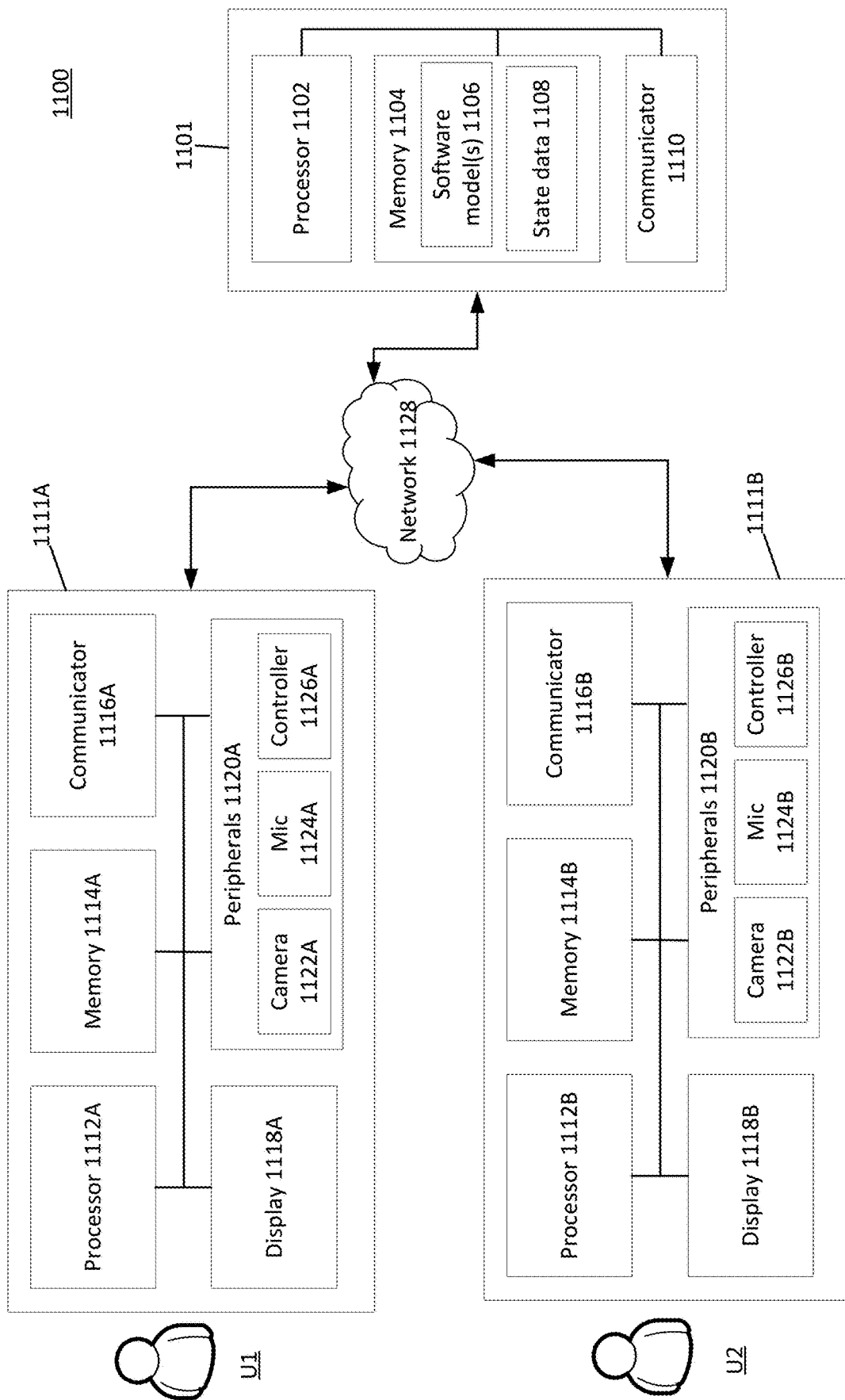
FIG. 2 shows a system block diagram for having a communication session in a virtual environment, according to an embodiment.

FIG. 2 shows a block diagram of a system 1100 (e.g., an NIVR system) for generating a virtual environment (e.g., a quasi-3D space) for hosting communications among multiple different users, according to an embodiment. FIG. 2 includes a first compute device 1111A associated with (e.g., accessible by, owned by, operated by, used by, controlled by, etc.) a first user U1, a second compute device 1111B associated with (e.g., accessible by, owned by, operated by, used by, controlled by, etc.) a second user U2, and a third compute device 1101, each of which can be operatively coupled to one another via a network 1128. In some implementations, the compute devices 1111A, 1111B, 1101 can be a phone, laptop, desktop, server, and/or the like.

In some implementations, the network 1128 can be any suitable communications network for transferring data, operating over public and/or private networks. For example, the network 1128 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 1128 can be a wireless network such as, for example, a Wi-Fi or wireless local area network ("WLAN"), a wireless wide area network ("WWAN"), and/or a cellular network. In other instances, the communication network 108 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network 1128 can be encrypted or unencrypted. In some instances, the communication network 1128 can include multiple networks or subnetworks operatively coupled to one another by, for example, network bridges, routers, switches, gateways and/or the like (not shown).

Each of the compute devices 1111A and 1111B can include a processor 1112A and 1112B (respectively), memory 1114A and 1114B (respectively), peripheral(s) 1120A and 1120B (respectively), display 1118A and 1118B (respectively), and communicator 1116A and 1116B (respectively), each operatively coupled to one another (e.g., via a system bus). Compute device 1101 can include a processor 1102, memory 1104, and communicator 1110 operatively coupled to one another (e.g., via a system bus). The memory 1104 of compute device 1100 can also include a software model(s) 1106 and state data 1108, which will be discussed additionally further below.

The processors 1102, 1112A, 1112B can be, for example, a hardware based integrated circuit (IC) or any other suitable processing device configured to run and/or execute a set of instructions or code. For example, the processors 1102, 1112A, 1112B can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processors 1102, 1112A, 1112B can be configured to run any of the methods and/or portions of methods discussed herein.

The memories 1104, 1114A, 1114B can be, for example, a random-access memory (RAM), a memory buffer, a hard drive, a read-only memory (ROM), an erasable programmable read-only memory (EPROM), and/or the like. The memories 1104, 1114A, and 1114B can be configured to store data used by the processors 1102, 1112A, and 1112B (respectively) to perform the techniques discussed herein. In some instances, the memories 1104, 1114A, and 1114B can store, for example, one or more software programs and/or code that can include instructions to cause the processors 1102, 1112A, and 1112B (respectively) to perform one or more processes, functions, and/or the like. In some implementations, the memories 1104, 1114A, 1114B can include extendible storage units that can be added and used incrementally. In some implementations, the memories 1104, 1114A, 1114B can be a portable memory (for example, a flash drive, a portable hard disk, and/or the like) that can be operatively coupled to the processors 1102, 1112A, and 1112B (respectively). In some instances, the memories 1104, 1114A, 1114B can be remotely operatively coupled with a compute device (not shown in FIG. 1).

The peripherals 1116A, 1116B can include any type of peripheral. In some implementations, as shown in FIG. 2, peripherals 1120A includes a camera 1122A, microphone (mic) 1124A, and controller 1126A (e.g., mouse, keyboard, game controller, touch screen, etc.), and peripherals 1120B incudes camera 1122B, microphone (mic) 1124B, and controller 1126B (e.g., mouse, keyboard, game controller, touch screen, etc.). It can be appreciated that peripherals 1120A, 1120B can each include other peripherals not shown in FIG. 2, such as, for example, a speaker, scanner, headset, printer, and/or the like. In some instances, the peripherals 1120A and 1120B can be configured to capture input from users U1 and U2 (respectively) that are to be conveyed in a virtual meeting environment (e.g., face, torso, hands, movements, typed chat, spoken audio, facial expressions, user selections, virtual representation movements, etc.). For example, camera 1120A can be used to capture images/video of user U1, camera 1122B can be used to capture images/video of user U2, mic 1124A can be used to capture audio from user U1, mic 1124B can be used to capture audio from user U2, controller 1126A can be used to capture inputs from user U1 via a keyboard, mouse, game controller, touch screen, and/or the like, and controller 1126B can be used to capture inputs from user U2 via a keyboard, mouse, game controller, touch screen, and/or the like. The camera 1120A can be, for example, an external web camera or a camera housed within a smartphone or table.

The displays 1118A and 1118B can any type of display, such as a CRT (Cathode Ray tube) display, LCD (Liquid Crystal Display) display, LED (Liquid Emitting Diode) display, OLED (Organic Light Emitting Diode) display, and/or the like. The displays 1118A and 1118B can be used for visually displaying information (e.g., data) to users U1 and U2, respectively. For example, display 1118A can display a virtual representation of user U2 in a virtual environment to the user U1, and display 1118B can display a virtual representation of user U1 in the virtual environment to user U2. An example of an output that can be displayed by displays 1118A and/or 1118B is shown in FIGS. 1B and/or 1C.

The communicators 1110, 1116A, 1116B can facilitate receiving and/or transmitting data or files through network 1128. The communicators 1110, 1116A, 1116B can be, for example, a network interface card (NIC), a Wi-Fi™ module, a Bluetooth® module and/or any other suitable wired and/or wireless communication device. Furthermore, the communicators 1110, 1116A, 1116B can include a switch, a router, a hub and/or any other network device.

The memory 1104 of the compute device 1101 can include (e.g., store) a software model(s) 1106 and state data 1108. The software model(s) 1106 can be used (e.g., by processor 1102) to host a virtual session within the virtual environment for users U1, U2. The software model(s) 1106 can be, for example, a machine learning model, an artificial intelligence model, an analytical model, a mathematical model, a combination thereof, etc. The software model(s) 1106 can include one or more generative adversarial networks (GANs), where each GAN can (1) receive video of a user U1 or U2, (2) receive an image of that user U1 or U2 from a perspective view, and (3) output a transformed video (i.e., transformed set of frames) of that user U1 or U2 from the perspective view.

Attributes associated with each virtual representation in the virtual environment at a given point in time, for a range of different times (e.g., the duration of a meeting in the virtual environment), can be represented by the state data 1108, including an absolute and/or relative location of each virtual representation, as well as a field of view of each virtual representation. The software model(s) 1106 can use the state data 1108 to create the video plane for each virtual representation, as well as update frames for the video plane (e.g., as a virtual representation "moves" within the virtual environment, as a virtual representation changes their field of view, as the user changes their body orientation, as the body changes their facial expression, etc.).

In some implementations, the software model(s) 1106 include one or more engines (e.g., rendering engine) to manage (e.g., generate or modify) the state data 1108, such as a gaming engine (e.g., Unreal Engine™ or Unity™) or any other type of 3D virtual environment rendering engine (e.g., NVIDIA Omniverse™). The software model(s) 1106/engine can receive specific inputs from user U1 and/or U2 (e.g., via controller 1126A and/or 1126B) that makes the associated virtual representation of the user U1 and/or U2 move throughout the virtual environment and/or change their field of view vector (i.e., perspective of the environment). As the engine receives inputs to modify the field of view vector(s) and/or location(s), the state data 1108 can be maintained accordingly.

In some implementations, the one or more engines can receive one or more sets of frames, decode the one or more sets of frames, and cause the decoded one or more sets of frames to be associated with (e.g., displayed) to respective video planes. Thereafter, the one one or more sets of frames can be rendered and encoded (e.g., for perspective(s) based on the state data 1108). Thereafter, respective streams can be sent (e.g., via communicator 1110) to respective compute devices. For example, a first stream can be sent to compute device 1111A, and a second stream can be sent to compute device 1111B.

In some implementations, the users U1, U2 may request to create and/or join a virtual environment. For example, the users U1, U2 may use their respective controllers 1126A, 1120B and/or displays 1118A, 1118B to navigate to an application, website, link, software, file, and/or the like to indicate a request to create and/or join a common virtual environment. In such a scenario, compute devices 1111A, 1111B may send a signal(s) indicating the request to the compute device 1101.

Image Capturing Process

To create frames for a video plane of a virtual representation associated with (e.g., mirroring) user U1, the processor 1112A may use the camera 1122A to capture multiple images of user U1, each image of the user U1 taken at an associated angle from a plurality of at different angles. Thus, images of the user U1 can include a front perspective view of the user U1, a left perspective view of the user U1, a right perspective view of the user U1, a front left perspective view of the user U1, a front right perspective view of the user U1, etc. In some implementations, the images include a back perspective view of the user U1 (e.g., the back of the user's U1 head). In some implementations, the images do not include a back perspective view of the user U1. In some implementations, the multiple images of user U1 can be taken in response to the user U1 being prompted (e.g., via display 1118A) to reposition himself/herself before each image is taken by the camera 1122A. In other implementations, the multiple images of user U1 can be taken by the camera 1122A via manual and/or automatic repositioning of the camera, such that the user U1 does not reposition himself/herself before each image is taken. In some implementations, if an image of the user U1 at one or more desired perspective views are missing (e.g., have not be captured, became corrupted, etc.), omnisization (i.e., on-demand generation of perspective views as two-dimensional pixel data and not 3D volumetric data) can be performed to generate new images of user U1 that are at the one or more desired perspective view.

In some implementations, the user U1 is instructed (e.g., via display 1118A and/or audio output via a speaker) to adjust (e.g., incrementally) a roll, pitch, and/or yaw of their head and/or upper body. As user U1 adjusts a roll, pitch, and/or yaw of their head and/or upper body, and/or in response to detecting that the user U1 has adjusted a roll, pitch, and/or yaw of their head and/or upper body, the camera 1122A can capture images and/or video of the user U1. The images and/or video captured by the camera 1122A can then be sent to the compute device 1101 (e.g., using the communicator 1116A).

In some implementations, the software model(s) 1106 can be used to preprocess the images of user U1. Preprocessing can include decoding the images of user U1, compressing the images of the user U1, transforming the images of the user U1, and/or editing the background portion of the decoded images such that each image has a standard format (e.g., such that each image has a green background, no background, etc.).

A procedure similar to the foregoing can be used to generate a virtual representation associated with (e.g., mirroring) user U2.

Hosting a virtual session within the virtual environment

The software model(s) 1106 (e.g., engine) can generate a virtual environment resembling a three-dimensional space, such as a classroom or conference room, using the state data 1108, which can include data representing attributes associated with that three-dimensional space, such as the location, relative size, color, shape, etc. of various objects located within (or to be shown as being located within) that virtual environment (e.g., chairs, tables, windows, ceiling, floor, etc.).

The state data 1108 can also include data indicating a location and field of view of the virtual representation mirroring user U1 at a given time in the virtual environment, as well as the location and field of view of the virtual representation mirroring user U2 at that same time in the virtual environment. For example, the virtual representation mirroring user U1 may be at a front portion of the virtual environment facing a back portion of the virtual environment, and the virtual representation mirroring user U2 may be at a back portion of the virtual environment facing a front portion of the virtual environment.

Video of user U1 captured by the camera 1122A (e.g., during a meeting in the virtual environment) can be sent to compute device 1101. Similarly, video of user U2 captured by the camera 1122B (e.g., during the meeting in the virtual environment) can be sent to compute device 1101. In some implementations, video frames of video captured by camera 1122A of user U1 are preprocessed (e.g., by software model(s) 1106). Similarly, video frames of video captured by camera 1122B of user U2 can be preprocessed (e.g., by software model(s) 1106). Preprocessing can include decoding each video frame of users U1 and/or U2, compressing that video frame, transforming that video frame, and/or editing the background portion of the decoded video frame such that each video frame has a standard format (e.g., a green background, no background, etc.).

The software model(s) 1106 can generate two video planes (e.g., one video plane associated with user U1 and a different video plane associated with user U2). In some implementations, for each virtual representation that joins a virtual environment, a single video plane for that virtual representation is generated.

Using the state data 1108, the preprocessed images of users U1 and U2, and a set of video frames (i.e., videos) of the users U1 and U2 captured from cameras 1122A and 1122B and received in substantially real-time (e.g., at machine speed), the software model(s) 1106 can use one or more GANs to create/generate frames for the video planes of the virtual representations of the users U1 and U2 to be included within the virtual environment. In some implementations, a "video frame" refers to a frame of video captured by the camera 1122A and/or 1122B of the users U1 and/or U2, while a "frame" refers to a frame generated by the one or more GANs. Said similarly, a "video frame" is captured by an image capturing device (e.g., camera), while a "frame" is not captured by an image capturing device. Said similarly, a "frame" is generated by one or more GANs, while a "video frame" is not generated by one or more GANs.

Each frame for the video plane of user U1 generated by a GAN(s) can show (e.g., to user U2) the user U1 at a perspective view based on the location and field of view of the virtual representations of users U1 and U2. Similarly, each frame for the video plane of user U2 generated by a GAN(s) can show (e.g., to user U1) the user U2 at a perspective view based on the location and field of view of the virtual representations of users U1 and U2. In some implementations, omnisization (defined herein as on-demand generation of perspective views as two-dimensional pixel data and not 3D volumetric data) can be used to generate the frames for the video planes using the processed images of users U1 and U2, as well as preprocessed (e.g., standardized) video frames of users U1 and U2; for example, a generative adversarial network (GAN) pipeline can be used to reconstruct sparse spatial facial topography data to a sparse point could, and a GAN pipeline can be used to density the facial topography data using an upsampling GAN architecture. Over a period of time (e.g., duration of a meeting), frames can be repeatedly (e.g., continuously) generated to account for changes in location and/or field of view of one or more virtual representations, thereby creating a video plane that can be dynamically updated and/or dynamically generated, in real-time, to include a representation of attributes such as a facial expression, a voice, and/or a torso movement of a user associated with each of the one or more virtual representations. Furthermore, a size of the video plane/frames themselves can be modified over time to give other users an impression of relative distance. Furthermore, a perspective view of the video plane/frames can be modified over time to give other users an impression of field of view (i.e., viewing direction).

The frames for the video planes of the virtual representations of the users U1 and U2 can be generated/shown such that user U1 views (e.g. on display 1118A) the virtual representation of user U2 as if user U1 was in a real-life room resembling the virtual environment from the perspective of the virtual representation representing user U1, and user U2 views (e.g. on display 1118B) the virtual representation of user U1 as if user U2 was in the real-life room resembling the virtual environment from the perspective of the virtual representation representing user U2. Thus, from the user's U1 perspective of the virtual environment (e.g., at the front of a room facing the back of the room), the video plane of the virtual representation of user U2 can be placed (e.g., overlayed) in the virtual environment to show the virtual representation of user U2 at the location and field of view indicated in the state data 1108. From the user's U2 perspective of the virtual environment (e.g., at the back of a room facing the front of the room), the video plane of the virtual representation of user U1 can be placed (e.g., overlayed) in the virtual environment to show the virtual representation of user U1 at the location and field of view indicated in the state data 1108.

In parallel, audio provided by users U1 and/or U2 (i.e., audio captured by mic 1124A and/or 1124B) can be synched and communicated with the virtual representations.

Thus, while the user U1 sees a video plane of the virtual representation of user U2, user U1 can also hear audio provided by the user U2 in synch with video of the user U2. Similarly, while the user U2 sees a video plane of the virtual representation of user U1, user U2 can also hear audio provided by user U1 in synch with video of the user U1. In some implementations, this can look like (1) the compute device 1101 receiving video and audio of user U1 from compute device 1111A, ensuring that the video and audio are in synch, and causing the synched audio and video to be displayed at the compute device 1111B (e.g., via generating at least one stream using at least one rendering engine, and sending the at least one stream to the compute device 1111B), and/or (2) the compute device 1101 receiving video and audio of user U2 from compute device 1111B, ensuring that the video and audio are in synch, and causing the synched audio and video to be displayed at the compute device 1111A (e.g., via generating at least one stream using at least one rendering engine, and sending the at least one stream to the compute device 1111A).

In some implementations, after the sets of frames associated with user U1 have been generated, the sets of frames can be encoded and sent to compute device 1111B. The compute device 1111B can decode the sets of frames, and display the decoded sets of frames at a video plane.

Similarly, after the sets of frames associated with user U2 have been generated, the sets of frames can be encoded and sent to compute device 1111A. The compute device 1111A can decode the sets of frames, and display the decoded sets of frames at a video plane.

Note that, although FIG. 2 showed two users U1, U2 and two compute devices 1111A, 1111B sending signals to compute device 1101 for creating and/or joining a virtual environment, in some implementations, more than two users and/or compute devices can be used. For example, the compute device 1101 can create a virtual environment that can host a communication session among three or more users using three or more compute devices. In such a scenario, the compute device 1101 can generate more than two sets of frames for more than two video planes (e.g., 6 unique/different sets of frames for 6 video planes for a virtual environment having 3 virtual representations, 12 unique/different sets of frames for 12 video planes for a virtual environment having 4 virtual representations, 20 unique/different sets of frames for 20 video planes for a virtual environment having 5 virtual representations, etc.).

FIGS. 3A-3B show a flowchart of a method 3000 for hosting a meeting between/among multiple users in a virtual environment (e.g., of a NIVR system), according to an embodiment. In some implementations, method 3000 can be performed by the processor 1102 of compute device 1101.

At 3001, a first plurality of images is received, via a processor and from a first user compute device (e.g., compute device 1111A) associated with a first user (e.g., user U1). Each image from the first plurality of images is an image of the first user taken at an associated angle from a plurality of different angles. In some implementations, each image from the first plurality of images can be taken by a camera (e.g., camera 1122A) as the first user is instructed (e.g., via display 1118A) to swivel their head and/or torso from left to right and/or right to left. In some implementations, each image from the first plurality of images has a first common background. In some implementations, each image from the first plurality of images has a different associated angle than each other image from the first plurality of images. In other implementations, the first plurality of images includes two or more images for each individual angle from the plurality of angles. In some implementations, if the plurality of different angles is missing a predetermined and/or desirable angle, omnisization can be performed to generate new images having the predetermined and/or desirable angle.

At 3002, a second plurality of images is received, via the processor and from a second user compute device (e.g., compute device 1111B) associated with a second user (e.g., user U2). Each image from the second plurality of images is an image of the second user taken at an associated angle from the plurality of different angles. In some implementations, each image from the second plurality of images can be taken by a camera (e.g., camera 1122B) as the second user is instructed (e.g., via display 1118B) to swivel their head and/or torso from left to right and/or right to left. In some implementations, each image from the second plurality of images has a second common background (that may be the same or different as the first common background from 3001). In some implementations, each image from the second plurality of images has a different associated angle than each other image from the second plurality of images. In other implementations, the second plurality of images includes two or more images for each individual angle from the plurality of angles. In some implementations, if the plurality of different angles is missing a predetermined and/or desirable angle, omnisization can be performed to generate new images having the predetermined and/or desirable angle.

At 3003, a first video of the first user is received via the processor and from the first user compute device. The first video can be captured by a camera and/or webcam (e.g., camera 1122A). The first video can be, for example, of the first user as the first user is viewing the virtual environment (e.g., during a virtual meeting). The first video can include video frames.

At 3004, the first video is processed, via the processor, to generate a first processed video. In some implementations, processing can include decoding each video frame of the first video. In some implementations, processing can include editing (e.g., after decoding) the background portion of each video frame of video to a standard background.

At 3005, a second video of the second user is received via the processor and from the second user compute device. The second video can be captured by a camera and/or webcam (e.g., camera 1122B). The second video can be, for example, of the second user as the second user is viewing the virtual environment (e.g., during the same virtual meeting as the first user). The second video can include video frames.

At 3006, the second video is processed, via the processor, to generate a second processed video. In some implementations, processing can include decoding each video frame of the second video. In some implementations, processing can include editing (e.g., after decoding) the background portion of each video frame of video to a standard background.

At 3007, the following are determined, via the processor and for a first virtual representation mirroring the first user: (1) a first location of the first virtual representation in a virtual environment, and (2) a first field of view of the first virtual representation in the virtual environment. The processor can use state data/information (e.g., state information 1108) to perform 3005. In some implementations, the virtual environment is an emulation of a virtual three-dimensional space.

At 3008, the following are determined, via the processor and for a second virtual representation mirroring the second user: (1) a second location of the second virtual representation in the virtual environment, and (2) a second field of view of the second virtual representation in the virtual environment. The processor can use state information (e.g., state information 1108) to perform 3005.

At 3009, a at least one first frame for a first video plane is generated, via the processor, for the first virtual representation based on the first processed video, at least one image from the first plurality of images, the first location, the second location, the first field of view, and the second field of view. In some implementations, 3007 can include (1) receiving video of user U1 captured by camera 1122A from compute device 1111A, and (2) modifying the video using the first plurality of processed images, the first location, the second location, the first field of view, and the second field of view. In some implementations, generating the at least one first frame for the first video plane can involve generating, for each time for a plurality of times, a frame to be included in the first video plane, where that frame is generated based on at least one video frame from the first processed video, at least one processed image from the first plurality of processed images, the first location, the second location, the first field of view, and the second field of view at that time.

At 3010, at least one second frame for a second video plane is generated, via the processor, for the second virtual representation based on the second processed video, at least one image from the second plurality of images, the first location, the second location, the first field of view, and the second field of view. In some implementations, 3008 can include (1) receiving video of user U2 captured by camera 1122B from compute device 1111B, and (2) modifying video frames of the video using a GAN(s), the second plurality of processed images, the first location, the second location, the first field of view, and the second field of view. In some implementations, generating the at least one second frame for the second video plane can involve generating, for each time for a plurality of times, a frame included to be included in the second video plane, where that frame is generated by a GAN(s) based on at least one video frame from the second processed video, at least one processed image from the second plurality of processed images, the first location, the second location, the first field of view, and the second field of view at that time.

At 3011, at least one first signal representing the at least one first frame for the first video plane is sent, via the processor, to at least one engine (e.g., a rendering engine; an engine included in software model(s) 1106), to cause display, at the second user compute device, of the at least one first frame for the first video plane in the virtual environment to the second user. In some implementations, the second user compute device (e.g., compute device 1111B) receives the at least one first signal, and a processor (e.g., 1112B) sends another signal to a display (e.g., display 1118B) and/or speaker (e.g., included in peripherals 1120B, but not shown in FIG. 2) of the second user compute device. In some implementations, output from the at least one engine is used to generate a stream that can be displayed at the second user compute device (e.g., over the web). From the second user's perspective, they see a video plane of the first user's virtual representation showing the at least one first frame.

At 3012, at least one second signal representing the at least one second frame for the second video plane is sent, via the processor, to the at least one engine, to cause display, at the first user compute device, of the at least one second frame for the second video plane in the virtual environment to the first user. In some implementations, the first user compute device (e.g., compute device 1111A) receives the at least one first signal, and a processor (e.g., 1112A) sends another signal to a display (e.g., display 1118A) and/or speaker (e.g., included in peripherals 1120A, but not shown in FIG. 2) of the first user compute device. In some implementations, output from the at least one engine is used to generate a stream that can be displayed at the first user compute device. From the first user's perspective, they see a video plane of the second user's virtual representation showing the at least one second frame.

In some implementations of method 3000, the first video plane is dynamically updated with at least one third frame, in real-time, to include a representation of at least one of a facial expression of the first user, a voice of the first user, or a torso movement of the first user. In some implementations, the at least one third frame can replace the at least one first frame. In some implementations of method 3000, the second video plane is dynamically updated with at least one fourth frame, in real-time, to include a representation of at least one of a facial expression of the second user, a voice of the second user, or a torso movement of the second user. In some implementations, the at least one fourth frame can replace the at least one second frame. Dynamically updating can include generating frames for all video planes or for a subset of video planes (e.g., generating frames for the first video plane and/or generating frames for the second video plane).

In some implementations of method 3000, each video frame from the first video has a first common background (e.g., bedroom), each video frame from the second video has a second common background (e.g., office space) different than the first common background, each frame from the first processed video has a third common background (e.g., green screen), and each frame from the second processed video has the third common background.

In some implementations of method 3000, the generating of the at least one first frame for the first video plane and the generating of the at least one second frame for the second video plane are performed substantially in parallel (i.e., not in series), and/or the sending of the first signal and the sending of the second signal are performed substantially in parallel (i.e., not in series). In some implementations, actions performed substantially in parallel can occur simultaneously except for processor/transmission delays. In some implementations, the generating of the first video plane and/or the second video plane is performed only once, and frames for each of the first video plane and/or second video plane are dynamically generated and/or updated (e.g., to show changes in expression, movements, etc.).

Some implementations of method 3000 can further include receiving, via the processor and from the first user compute device, a first request to join the virtual environment. Some implementations of method 3000 can further include receiving, via the processor and from the second user compute device, a second request to join the virtual environment. Some implementations of method 3000 can further include at least one of: (1) sending, via the processor, at least one third signal to the first user compute device requesting the first plurality of images in response to determining that the first plurality of images has not been received; or (2) sending, via the processor, at least one fourth signal to the second user compute device requesting the second plurality of images in response to determining that the second plurality of images has not been received.

FIGS. 4A-4B show a flowchart of a method 4000 for hosting a meeting between multiple users in a virtual environment (e.g., of an NIVR system), according to an embodiment. In some implementations, method 4000 can be performed by the processor 1102 of compute device 1101.

At 4001, a plurality of images of a first user is received, via a processor and from a first user compute device (e.g., compute device 1111A) associated with the first user (e.g., user U1). Each image from the plurality of images is an image of the first user taken at an associated angle from a plurality of different angles. At 4002, the plurality of images is processed, via the processor, to generate a plurality of processed images. In some implementations, 4002 can be performed automatically in response to receiving the plurality of images of the first user and without requiring human input. At 4001, first state information (e.g., included in state data 1108) is received via a processor of a non-immersive virtual reality system, the first state information indicating (1) a first location of a first virtual representation of a first user (e.g., user U1) in a virtual environment, (2) a second location of a second virtual representation of a second user (e.g., user U2) in the virtual environment, (3) a first field of view of the first virtual representation of the first user in the virtual environment, and (4) a second field of view of the second virtual representation of the second user in the virtual environment.

At 4002, a plurality of images of the first user are received via the processor and from a first user compute device (e.g., compute device 1111A) associated with the first user, each image from the plurality of images being an image of the first user taken at an associated angle from a plurality of different angles. In some implementations, if the plurality of different angles is missing a predetermined and/or desirable angle, omnisization can be performed to generate new images having the predetermined and/or desirable angle.

At 4003, a first set of video frames (e.g., one, two, three, etc.) of the first user is received via the processor. The first set of video frames can be captured by a camera (e.g., camera 1122A) as the camera is capturing video of the first user.

At 4004, a first set of frames (e.g., one, two, three, etc.) for a video plane of the first virtual representation is generated, via the processor, based on the first set of video frames, at least one image from the plurality of images, the first location, the second location, the first field of view, and the second field of view. In some implementations, the first set of frames is generated using one or more GANs. Note that, in some implementations, the first set of video frames was captured by the first user device, and the first set of frames include frames for the video plane that can be generated based on the first set of video frames (e.g., by a GAN).

At 4005, a first signal representing the first set of frames is sent, via the processor, to at least one engine (e.g., rendering engine; engine included in software model(s) 1106). A second user compute device associated with the second user can display the first set of frames in the virtual environment to the second user. In some implementations, the second user compute device (e.g., compute device 1111B) receives the first signal, and a processor (e.g., 1112B) sends another signal to a display (e.g., display 1118B) and/or speaker (e.g., included in peripherals 1120B, but not shown in FIG. 2) of the second user compute device. In some implementations, output from the at least one engine is used to generate a stream that can be display at the second user compute device. From the second user's perspective, they see the first frame within the virtual environment. In some implementations, the first set of frames are received/consumed by an engine (e.g., 3D virtual engine), implemented in software and/or hardware (e.g., including a camera), and the engine decodes the first set of frames prior to the first set of frames being displayed. In some implementations, the first set of frames (or pixels thereof) may be streamed to the second user compute device, for example over the Internet.

At 4006, second state information (e.g., included in state data 1108) is received via the processor. The second state information includes information/data indicating (1) a third location of the first virtual representation in the virtual environment different than the first location, (2) the second location of the second virtual representation in the virtual environment, (3) a third field of view of the first virtual representation in the virtual environment different than the first field of view, and (4) the second field of view of the second virtual representation in the virtual environment. In some implementations, the second state information indicates that the first virtual representations has moved and changed an associated field of view (e.g., via input by the first user at the first user compute device).

At 4007, a second set of video frames of the first user is received via the processor and from the first user compute device. The second set of video frames can be captured by a camera (e.g., camera 1122B) as the camera is capturing video of the second user (e.g., at substantially the same time video of the first user is being captured by camera 1122A).

At 4008, a second set of frames for the video plane of the second virtual representation is generated via the processor. The second set of frames is (1) different than the first set of frames and (2) generated based on the second set of video frames, at least one image from the plurality of images, the third location, the second location, the third field of view, and the second field of view. The second set of frames can be, represent, and/or or include an image.

At 4009, a second signal representing the second set of frames is sent, via the processor, to the at least one rendering engine. In some implementations, the second user compute device (e.g., compute device 1111B) receives the second signal, and a processor (e.g., 1112B) sends another signal to a display (e.g., display 1118B) and/or speaker (e.g., included in peripherals 1120B, but not shown in FIG. 1) of the second user compute device. In some implementations, output from the at least one engine is used to generate a stream that can be display at the second user compute device. From the second user's perspective, they see the second set of frames within the virtual environment.

In some implementation of method 4000, the first set of frames shows at least one first perspective view of the first virtual representation of the first user, and the second set of frames shows at least one second perspective view of the first virtual representation of the first user different than the at least one first perspective view.

Some implementations of method 4000 further include receiving, via the processor and at a third time after the first time and the second time, third state information indicating (1) a fourth location of the first virtual representation in the virtual environment different than the first location and the third location, (2) the second location of the second virtual representation in the virtual environment, (3) a fourth field of view of the first virtual representation in the virtual environment different than the first field of view and the third field of view, and (4) the second field of view of the second virtual representation in the virtual environment. The third state information can indicate that the first virtual representation has moved and changed the field of view. Some implementations can further include receiving, via the processor and from the first user compute device, a third set of video frames of the first user. Some implementations can further include generating, via the processor, a third set of frames for the video plane of the first virtual representation based on the third set of video frames, at least one image from the plurality of images, the fourth location, the second location, the fourth field of view, and the second field of view. Some implementations can further include sending, via the processor, a third signal representing the third set of frames to the at least one engine (e.g., to cause the first user compute device to display the third set of frames within the virtual environment).

Some implementations of method 4000 further include receiving, via the processor and at a second time after the first time, third state information indicating (1) the third location of the first virtual representation in the virtual environment, (2) a fourth location of the second virtual representation in the virtual environment different than the second location, (3) the first field of view of the first virtual representation in the virtual environment, and (4) a third field of view of the first virtual representation in the virtual environment different than the second field of view. The third state information can indicate that the second user has moved and changed the field of view. Some implementations can further include receiving, via the processor and from the first user compute device, a third set of video frames of the first user. Some implementations can further include generating, via the processor, a third set of frames for the video plane of the first virtual representation based on the third set of video frames, at least one image from the plurality of images, the third location, the fourth location, the first field of view, and the third field of view. Some implementations can further include sending, via the processor, a third signal representing the third set of frames to the at least one engine.

Some implementations of method 4000 further include receiving, via the processor and at a third time after the first time and the second time, third state information indicating (1) a fourth location of the first virtual representation in the virtual environment different than the first location and the third location, (2) a fifth location of the second virtual representation in the virtual environment different than the second location, (3) a fourth field of view of the first virtual representation in the virtual environment different than the first field of view and the third field of view, and (4) a fifth field of view of the second virtual representation in the virtual environment different than the second field of view. The third state information can indicate that the first and second virtual representations have both changed their location and field of view. Some implementations can further include receiving, via the processor and from the first user compute device, a third video frame of the first user. Some implementations can further include generating, via the processor, a third set of frames for the video plane of the first virtual representation based on the third set of video frames, at least one image from the plurality of images, the fourth location, the fifth location, the fourth field of view, and the fifth field of view. Some implementations can further include sending, via the processor, a third signal representing the third set of frames to the at least one engine.

Some implementations of method 4000 further include receiving, via the processor and at a third time after the first time and the second time, third state information indicating (1) a fourth location of the first virtual representation in the virtual environment different than the first location and the third location, (2) the second location of the second virtual representation in the virtual environment, (3) a fourth field of view of the first virtual representation in the virtual environment different than the first field of view and the third field of view, and (4) the second field of view of the second virtual representation in the virtual environment. The third state information can indicate that the first virtual representation has moved and changed the field of view. Some implementations further include determining that the first virtual representation is not in the second field of view of the second virtual representation based on the fourth location, the second location, and the fourth field of view. Said similarly, the first virtual representation is out of the second virtual representation's field of view. Some implementations further include refraining from generating a third set of frames of the first virtual representation.

In some implementations of method 4000, the video plane is dynamically updated, in real-time, to include a representation of at least one of a facial expression of the first user, a voice of the first user, or a torso movement of the first user (e.g., via one or more frames).

FIG. 5 shows a flowchart of a method 5000 for hosting a meeting between multiple users in a virtual environment (e.g., of an NIVR system), according to an embodiment. In some implementations, method 5000 can be performed by the processor 1102 of compute device 1101.

At 5001, a plurality of sets of images is received, via a processor and from N compute devices associated with N users. Each set of images from the plurality of sets of images is associated with one user from the N users and includes images of that user taken at different angles. In some implementations, N is at least two. N can be, for example, 3, 4, 5, 6, etc. In some implementations, if the plurality of different angles is missing a predetermined and/or desirable angle, omnisization can be performed to generate new images having the predetermined and/or desirable angle.

At 5002, the N videos are received via the processor and from the N compute devices, each video from the N videos associated with a unique user from the N users. In some implementations, the N videos were captured of the N users and at substantially the same time (e.g., accounting for varying processing speeds) as the N users are meeting virtually.

At 5003, each frame from the N videos is processed, via the processor, to generate N processed videos. In some implementations, the processing of the N videos can include decoding each frame of each video from the N videos to generate a plurality of decoded frames, and editing, for each background portion of the plurality of decoded frames, that background portion to a standard format. In some implementations, 5003 can be performed automatically in response to receiving the N videos and not in response to human input.

At 5004, state information is received via the processor for each time from a plurality of times. The state information can include information/data indicating, for each virtual representation of N virtual representations, where that virtual representation is associated with a user from the N users, a location for that virtual representation in a virtual environment at that time, and a viewing direction for that virtual representation in the virtual environment at that time.

At 5005, (N)×(N−1) unique sets of frames for (N)×(N−1) video planes are generated, via the processor and for each time from the plurality of times, based on the state information, the N processed videos, and the plurality of sets of images, each set of frames from the (N)×(N−1) unique sets of frames associated with (1) one virtual representation from the N virtual representations, and (2) one video plane from the (N)×(N−1) video planes. In some implementations, the processor uses at least one GAN (e.g., one GAN or a plurality of GANs) to generate the (N)×(N−1) unique sets of frames.

At 5006, (N−1) unique sets of frames from the (N)×(N−1) unique sets of frames are caused to be sent (e.g., after encoding for efficient transmission via the Internet and decoding; as one or more streams), via the processor and using at least one engine, to at least one compute device (e.g., one, two, three, all, each, etc.) from the N compute devices. In some implementations, each set of frames from the (N−1) unique sets of frames associated with (1) one virtual representation from the N virtual representations, and (2) (N−1) video planes from the (N)×(N−1) video planes. In some implementations, (N−1) video planes are shown by each compute device from the N compute devices, where each video plane from the (N−1) video planes can show a unique set of frames from the (N−1) unique sets of frames (e.g., at substantially the same time, where (N−1) users from the N users each see a unique set of frames from the (N−1) unique sets of frames). In some implementations, when the (N−1) unique sets of frames are received by the at least one engine (e.g., included in software model(s) 1106), the (N−1) unique sets of frames can be encoded and decoded via the at least one engine; thereafter, streams can be sent to the N compute devices.

In some implementations of method 5000, each video plane from the (N)×(N−1) video planes is dynamically updated, in real-time, to include a representation of at least one of a facial expression of one user from the N users, a voice of the one user, or a torso movement of one user. In some implementations, dynamically updating can include updating frames of the video plane(s) for a given virtual representation based on the facial expression, the voice, and/or the torso movement of an associated user.

In some embodiments, a video teleconferencing method includes processing and delivering, in real-time, augmented communication media for consumption by a plurality of users in a three-dimensional non-immersive virtual reality (NIVR) environment. In some such implementations, the video teleconferencing method includes the dynamic generation of an evolving NIVR-based communication space. The NIVR-based communication space can be a multi-user communication space facilitating multi/mutable audio/video communications with hyper-realistic 2D—yet perceived to be in 3D—representations of the participants/users presented to a conversing participant/user. The video teleconferencing method can include performing continuous online machine learning (ML) to improve the representations of human participants. For example, sub-systems may be deployed that are configured to perform preferential and reference learning to improve the accuracy and/or applicability of the ML algorithms to given scenarios. Additionally, hierarchic clustering models can be repeatedly (e.g., continuously) fed unique data to reduce the computing load at each epoch of a set of epochs for one or more specialized ML models. In some embodiments, the present disclosure relates to systems and methods configured to facilitate interactive virtual communications within in non-immersive virtual reality environments for two or more users.

Video Planes and Their Relationships

Figure 6A:
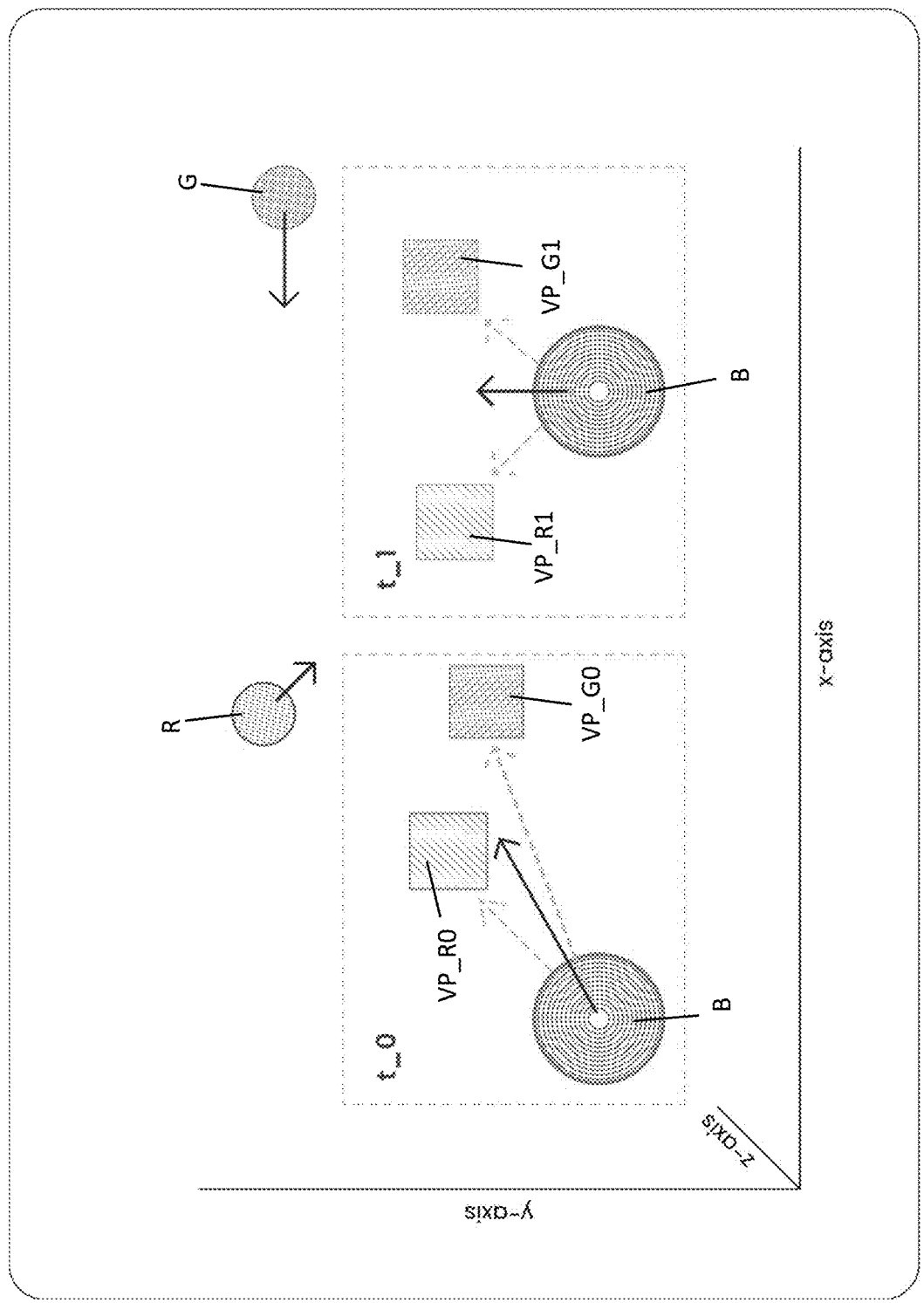
FIG. 6A illustrates virtual representations and video planes in a first virtual environment for one user, where the video planes stay at equilibrium as the one user moves, according to an embodiment.

Referring now to FIG. 6A, a quasi-3D virtual space (i.e., a virtual space having a 3D appearance, despite being displayed in two dimensions) for a "chat room" is shown. The circles B, R, G can represent virtual representations VR1, VR2, VR3 (i.e., participants, and the solid arrows/vectors extending from the circles B, R, G represent the field of view for that participant. The dashed arrows/vectors extending from circle B at time t_0 represents the direction where the video plane VP_R0 (associated with circle R) and video plane VP_G0 (associated with circle G) can be at time t_0. As can be seen in FIG. 6A, at time t_0, the video planes VP_R0, VP_G0 are exactly between R and G, so as to allow a user associated with circle B to interpret the position of circles R and G in the virtual environment. As can be seen in FIG. 6A, at time t_1, circle B moves, and the field of view for circle B changes, where the field of view can dictate the position of video planes VP_R1 and VP_G1 at time t_1. FIG. 6A shows the relative translation and dynamic equilibrium between client-specific video planes which maintain the spatial orientation of the various chat participants in a conference room or other quasi-3D space. The quasi-3D virtual space in an NIVR system can be emulated by a one-to-one correspondence between real world coordinates and coordinates of the virtual world. The relative spatial data of the quasi-3D virtual space can be collected/generated (e.g., based on camera data) and processed for display to a set of users. Although shown and described as circles, with reference to FIG. 6A, in some implementations, a rendering engine stores and tracks user location data in the form of a definition of a sphere, based on user input(s).

In some implementations, systems/techniques discussed herein are related to streamed virtual 3D environments that may each exist, from a given perspective, only as far as the given participant/user is concerned. For example, the virtual 3D environment can be a personal virtual space provided to a user "on demand," and may be perceived by the participant as being in 3D, while in reality implemented using 2D video planes. Despite the fact that each participant/user from a group of participants/users in a conference room may be facing their associated camera directly, the angular perceptions for a given participant (e.g., Andrew) of each other participant may be different from those of the other participants. This can be due to the fact that Andrew is getting the video data of user Y from a different angle than user X. The video planes of user Y in the 180 degree angular space can exist simultaneously, and the video plane for user Y that is selected to be seen by Andrew may differ from the video plane for user Y that is selected to be seen by use X. By reducing these video broadcast problem from a super high-dimensional one to a reduced-dimensional but realistic one, computational efficiency and intelligent sharing of network bandwidth can be achieved.

Personal Visual Perception

Figure 6B:
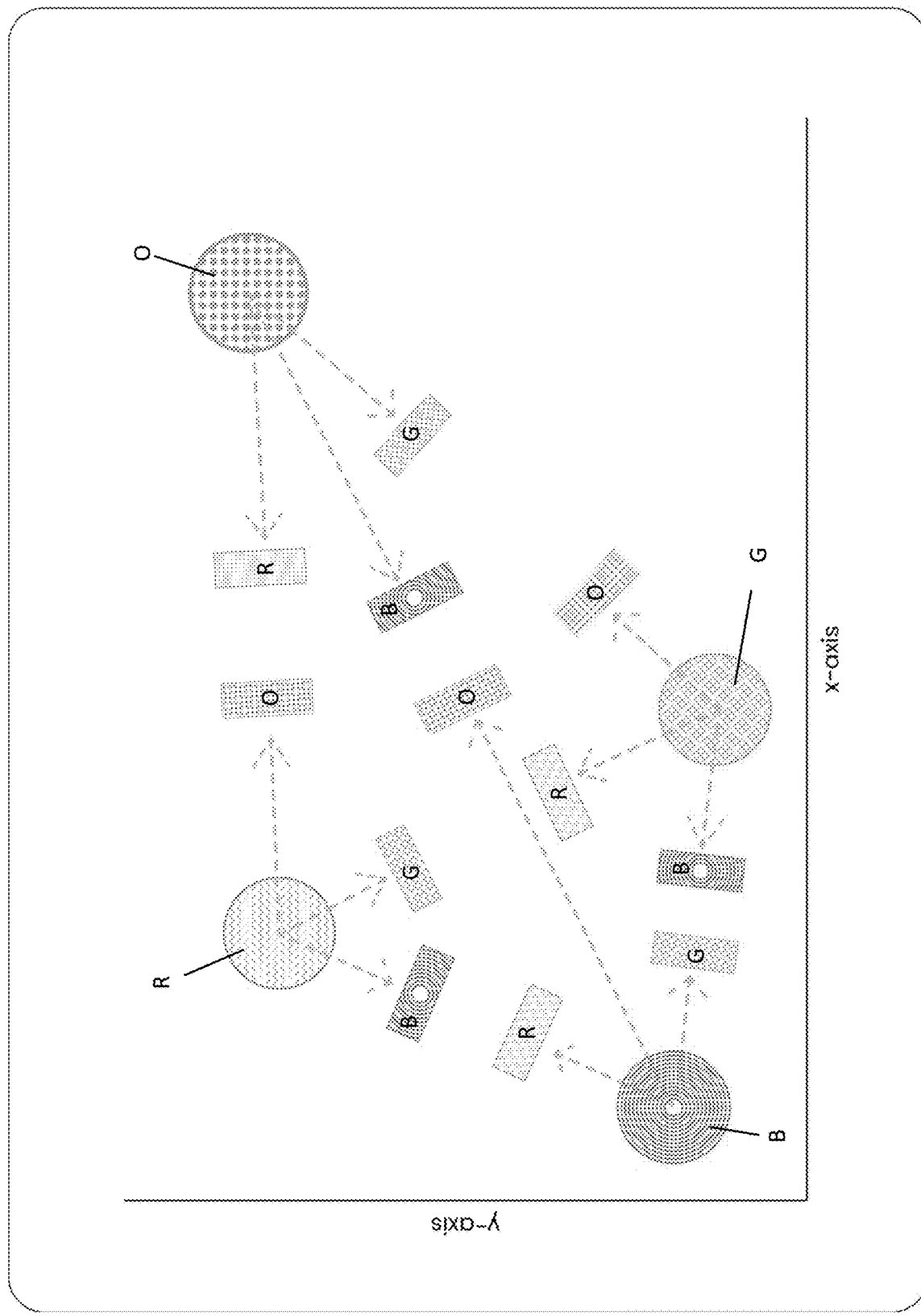
FIG. 6B illustrates virtual representations and video planes in a second virtual environment for all users, according to an embodiment.

The circles B, R, G, O in FIG. 6B can illustrate locations of fourth different participants in a virtual environment. The dashed arrows/vectors extending from circle B represents the direction where the video planes associated with circles R, G, and O can be at a given time, the dashed arrows/vectors extending from circle R represents the direction where the video planes associated with circles B, G, and O can be at a given time, the dashed arrows/vectors extending from circle G represents the direction where the video planes associated with circle B, R, and O can be at a given time, and the dashed arrows/vectors extending from circle O represents the direction where the video planes associated with circle B, R, and G can be at a given time. Because the virtual environment shown in FIG. 6B has four circles B, R, G, and O, each user can see three video planes of other video representations. FIG. 6B shows the simultaneous existence of the geometric perspectives of the various participants, thus catering to and preserving the translational and rotational equilibrium of the respective video plane projections in the quasi-3D space. To illustrate, consider a target user at location "B" in FIG. 6B. The video plane labeled "B" for a viewing user at location "R" may receive a set of frames from an angle similar to the viewing angle shown at 1004 of FIG. 1A, while the video plane labeled "B" for a viewing user at location "G" in FIG. 6B may receive a set of frames from an angle similar to the viewing angle shown at 1003 of FIG. 1A.

As shown in the quasi-3D space of FIG. 6B, preserving the orientation of participants/users can be desirable in some implementations. In some known chat rooms, only planar projections are shown of other participants via a given participant's display screen, e.g., showing only depth of the participant in their own space. By contrast, and according to methods set forth herein, when a chat participant is emulated in a quasi-3D space, the relative orientation of the chat participant can be considered, and one or more configurations may be dynamically generated and displayed, as discussed herein. These dynamic operations can keep the video planes for each chat participant in a dynamic equilibrium with respect to the location of the other participants. By applying optical operations described herein, a participant can be assured of continual on-demand viewing of a selected other participant, at an angle that accurately reflects a current relative positioning of that other participant via their relevant/applicable contemporaneous video plane position.

The law of dynamic equilibrium can be applied to normal vectors of each video plane involved. N-vectors are at equilibrium when the resultant of those N vectors is a Null vector, i.e., it has no magnitude and direction $\Sigma \vec{V}_i \to 0$. Each video plane can adjusted infinitesimally and continually in response to a participant's motion, in such a way that the vector resultant is maintained at near zero substantially continually (e.g., at least 80% of the time, at least 90% of the time, at least 95% of the time, at least 99% of the time, etc.).

3D Video Frame Generation and Delivery

Figure 7B:
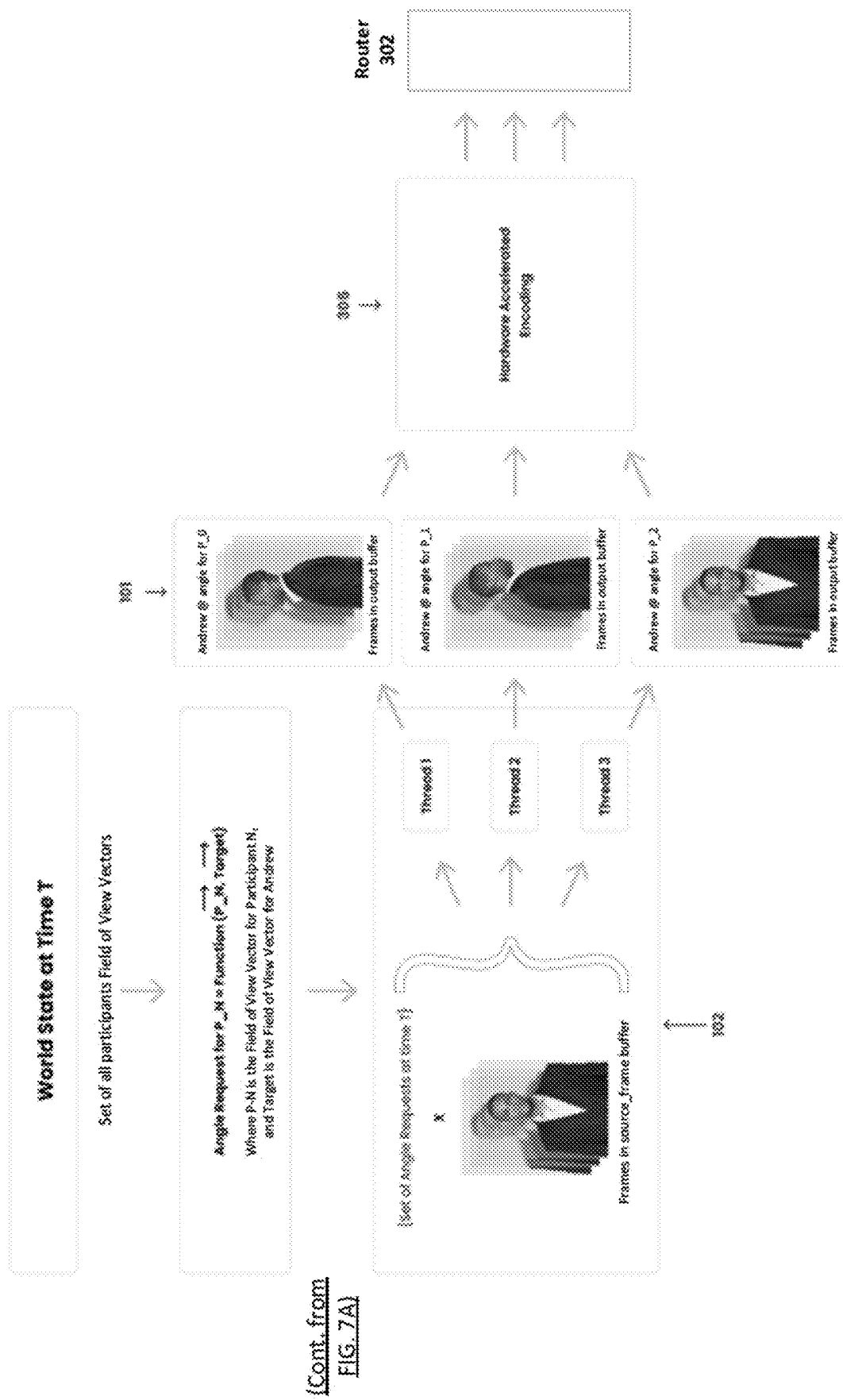
FIG. 7B illustrates multiple threads generating processed frames based on world state information at a given time, according to an embodiment.
Figure 7C:
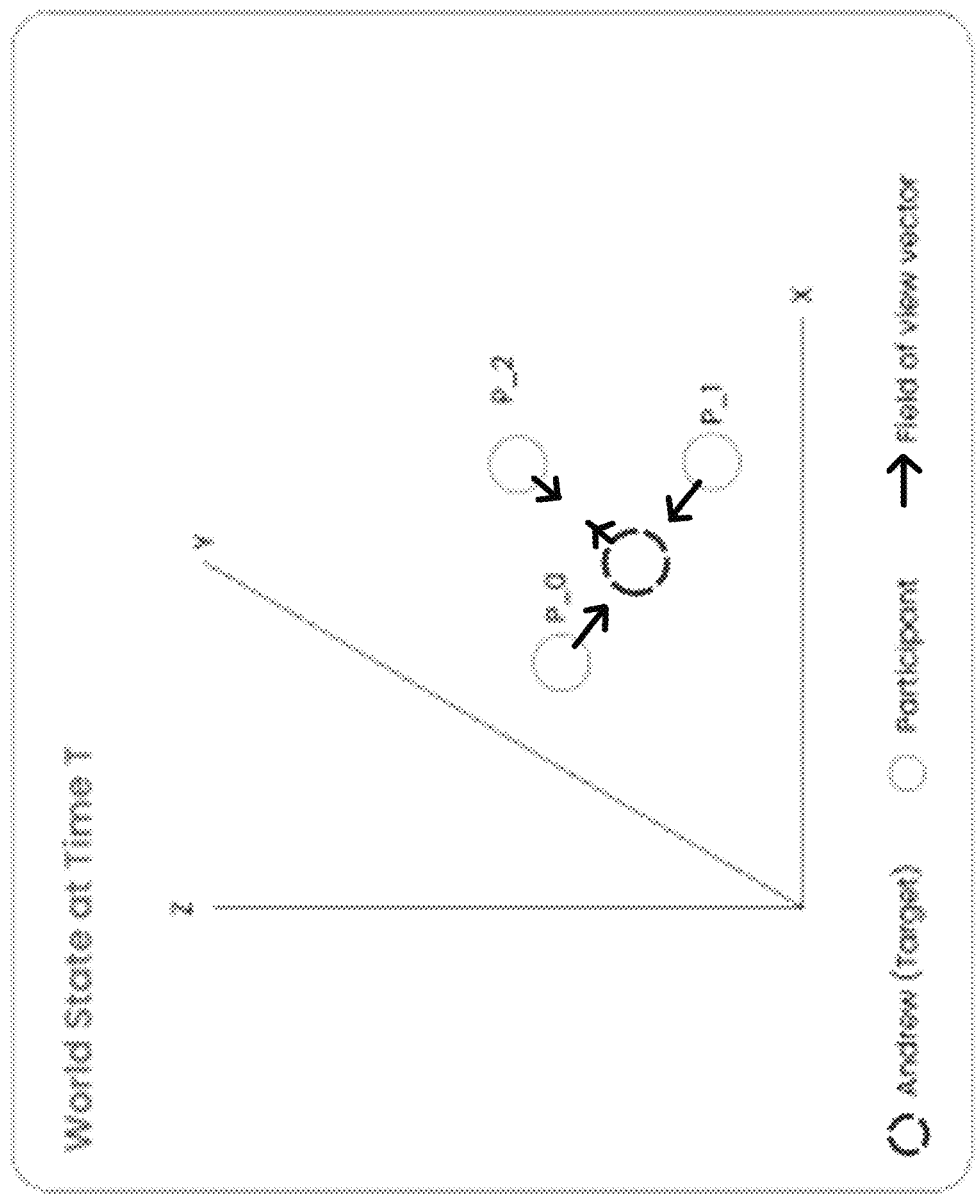
FIG. 7C illustrates the world state information at the given time, according to an embodiment.

Turning now to FIGS. 7A-7C, consider a first user/participant "Andrew" who logs in, at 106, to a chat portal (e.g., using compute device 1111A or 1111B) and (optionally) takes snapshots or a photo burst of himself with a web or mobile camera by swiveling his head 180 degrees a few times. After Andrew enters a session (e.g., a virtual meeting), the compute device of the user may automatically begin to transmit encoded video data to another "host" compute device (e.g., compute device 1101) hosting the Kickback Space™ Cloud (e.g., as shown and described with reference to FIG. 9A, discussed below). The encoded video data enters a processing channel where the packets are decoded, optionally with hardware acceleration (at 303) (e.g., offloading certain tasks, for example to one or more GPUs), to produce decoded video data. At 304, the background is separated from the video data (e.g., using software model(s) 1106). Next, the processed video frames from the user are fed into a multi-threaded application (e.g., included in software model(s) 1106) where each thread reads from a source-frame buffer, and is assigned to generate a unique perspective of the source client (e.g., by software model(s) 1106). The threads (Thread 1 through Thread 3 in FIG. 7B) can be processed using independent ML pipelines (e.g., included in software model(s) 1106) to generate multiple perspective views/frames of Andrew in parallel, and each thread is subject to change based on perspective requested by another user and/or based on a change in the positional relationship of the another user with Andrew (102). The set of buffers to which the multi-threaded application writes can undergo a hardware accelerating encoding process to compress the newly generated frames (at 305) (e.g., using software model(s) 1106). Finally, the encoded video is routed to a rendering engine (e.g., included in software model(s) 1106) that requested a particular perspective of Andrew (302).

In some implementations, in response to an initial login of a given user, the foregoing process may be performed, however in subsequent uses, such information (e.g., images of Andrew) can be readily available/retrievable from storage (e.g., memory 1104). Attributes such as the skin, texture, head morphology and lip sync of a selected user (e.g., Andrew) can then be replicated with respect to the audio produced by that user talking.

When Andrew speaks, his speech can be presented to the other chat participants in an authentic manner, in that the digital avatar of Andrew may be indifferentiable from (i.e., mirrors) the real Andrew whom the participants know, despite the data having been engineered/digitally generated.

The quasi-3D space can be defined as including the representations (301) of Andrew as well as representations of his fellow participants (P_1, P_2, P_3, etc.—see FIG. 7C) in the chat room, where each participant can have a field of vision of his/her own limited by the human eye's visual perceptive range and defined by the field of view vector. Thus, in some implementations, the angular perception, $\Theta_i$, of a certain participant i in the quasi-3D world state at time t, is a function of two entities viz., $P_i$, the field of view vector of participant i and the target normal vector, which is the counterpart of Andrew which can be symbolically represented by:

$$\Theta_i = f(P_i, \overrightarrow{\text{Andrew}})$$

Thus, the various views (102) generated for the participants i=1, 2, 3 . . . N−1 can be collected via threads as different frames in the output buffer (101), encoded via hardware acceleration (305), and delivered via a router (302).

Peer-to-peer Communications

Figure 8:
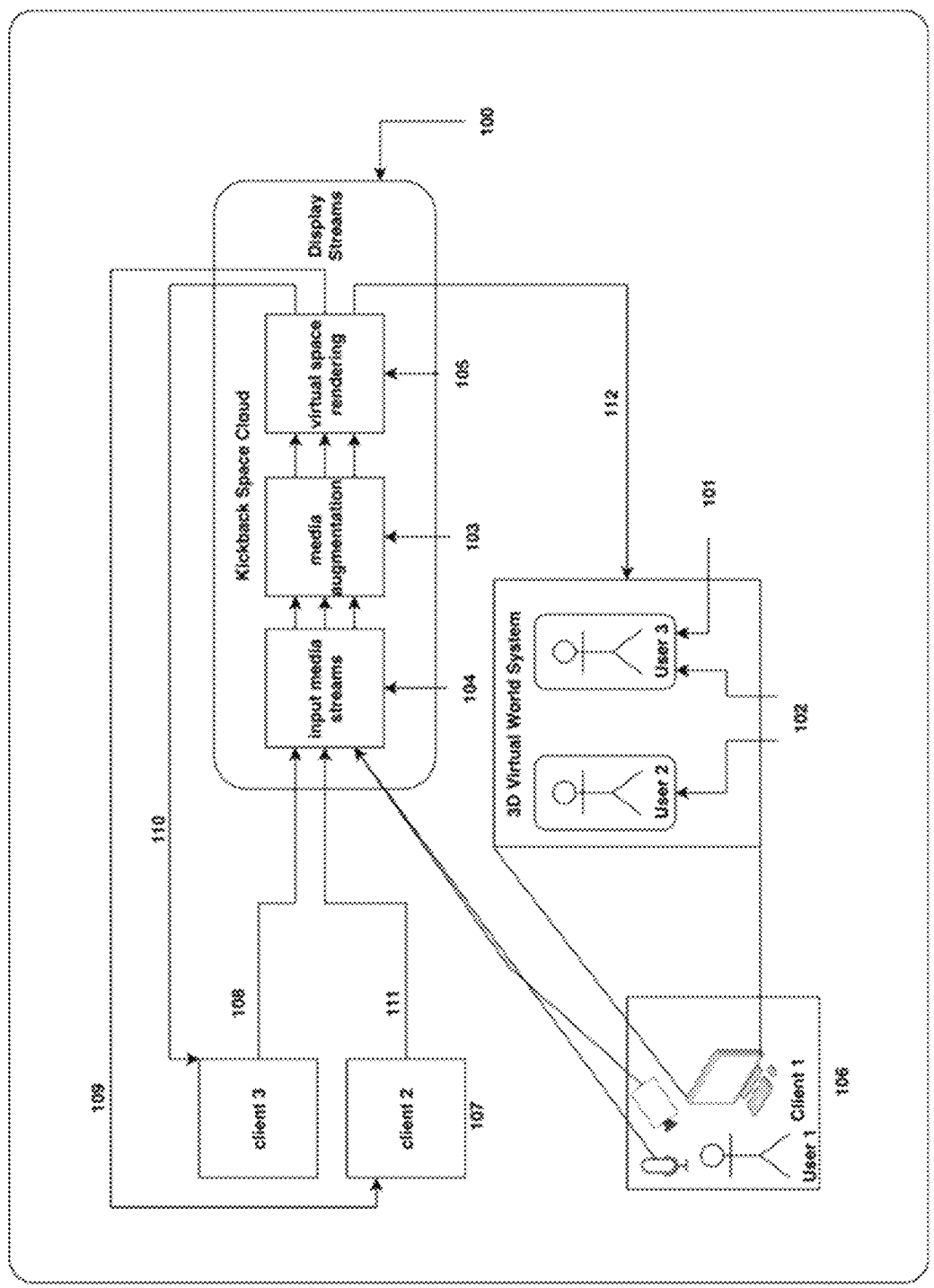
FIG. 8 shows a system block diagram for having a communication session in a virtual environment, according to an embodiment.

Turning now to FIG. 8, the set of labels {100, 101, 102, 103, 104, 105, 106, 107, 108, 109, 110, 111, 112} represent the following entities/processes:
- 109, 110: Outbound streams
- 108, 111: Inbound streams
- 100: Kickback Space™ Cloud Processes
- 103: Media augmentation
- 104: media ingestion/collection
- 105: Server-side virtual space rendering
- 101: 1 Virtual representation of user 3
- 102: A collection of virtual representations of other participants
- 106: client end (user(s))

The pipeline for the video data broadcast (108, 109, 110, 111) can service a network of multiple users 106 within 101 each with their own channels sending/receiving (108, 109) inter-connecting with one another but through a cloud server performing media ingestion (100), augmentation, and transmission of augmented media to a virtual space renderer. Each of 101 and 102 can include or comprise the virtual 3D data obtained, for example, from application programming interface (API) requests appropriate for/compatible with a given client 106, and the cloud server can interact with several clients 106 within the quasi-3D space 101 while handling multiple user specifications real-time and in parallel.

The video data (and, optionally, audio data) generated by users (e.g., users U1, U2) can be transmitted to a 3D perceptive corpus (e.g., analysis discussed with respect to FIG. 12 that outputs label 208), and the data coupled/transformed from the API data can be transported to the cloud server. In some circumstances, the video data is not yet to be seen by the users, and the 3D virtual system configurations may be stored in client-side caches where permissible (or re-generated when needed, if not). In some implementations, the compute device 1101 from FIG. 2 can host the cloud server, and the software model(s) 1106 are configured to perform the functionalities of the cloud server.

Media Pipeline

Figure 9B:
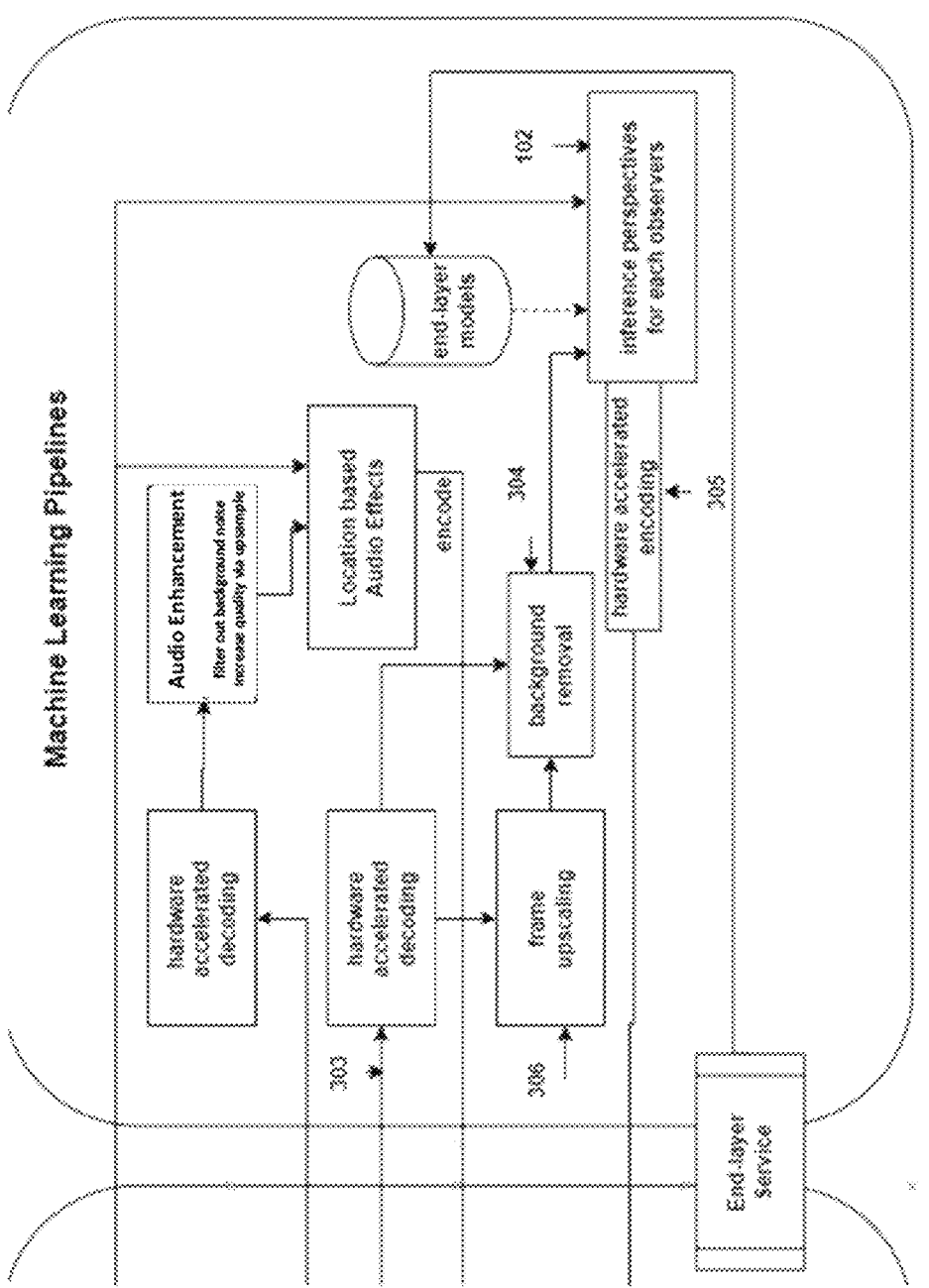

FIGS. 9A-9B show a sub-architecture/subsystem of a learning system along with data processing software components (e.g., for software model(s) 1106). 104 is a collection of parallel inbound streams including multimedia data as well as physical location data of participants in the quasi-virtual 3D world, as discussed herein. Video frames 300 can include video frames that have been improved (e.g., optimized) for texture, color, depth and/or perception, where some frames that best represent given subjects can be collected by automated mechanisms and stored in a sample sink 200. In some implementation, the sample sink 200 refers to sampling (i.e., copying) data (e.g., incoming frames) for analysis, where the data is not transmitted outside a given network (i.e., the data reaches a final destination inside the given network). The channelized multimedia can be transferred to ML sub-zones of the architecture/system where they can be processed for continuous and transfer learning. The remaining features of this zone of the architecture are explained in the subsequent two subsections with respect to labels 104, 300, 200, 302, 105, and 103.

Media Ingress/Egress

FIGS. 9A and 9B together show a sub-architecture for receiving and using input streams of media, according to an embodiment. FIG. 9A shows internals of the cloud server (e.g., a Kickback Space™ Cloud) and can be implemented, for example, as software model(s) 1106, according to an embodiment. The cloud server can receive the various data streams from the participants/users and process them to generate one or more forms of delivery content, as represented by the following labels:
- 300: Encoded video streams
- 104: Collection of inducted streams
- 301: Quasi-3D locales and audio data
- 200: Sample sink to collect data for statistical machine learning
- 302: Data transcoding engine
- 105: Server-side virtual space rendering The inbound streams 104 cache can receive a constant live stream of encoded video frames 300, and can receive data 301 pertaining to the quasi-virtual location of, and the raw audio data of, all participants/users involved. In some implementations, video frames that satisfy/pass a predefined quality threshold can be stored in the sample sink 200, which can be used for samples storage and used for data analytics, future usage, transfer learning, buffer make-up data, and/or the like. Participant location information, proximity based audio, and/or perspective video can be sent to a data transcoding engine 302. A rendering engine can receive multiple data streams, which can include output from the data transcoding engine 203 and server-side virtual space rendering 105.

API

Figure 10:
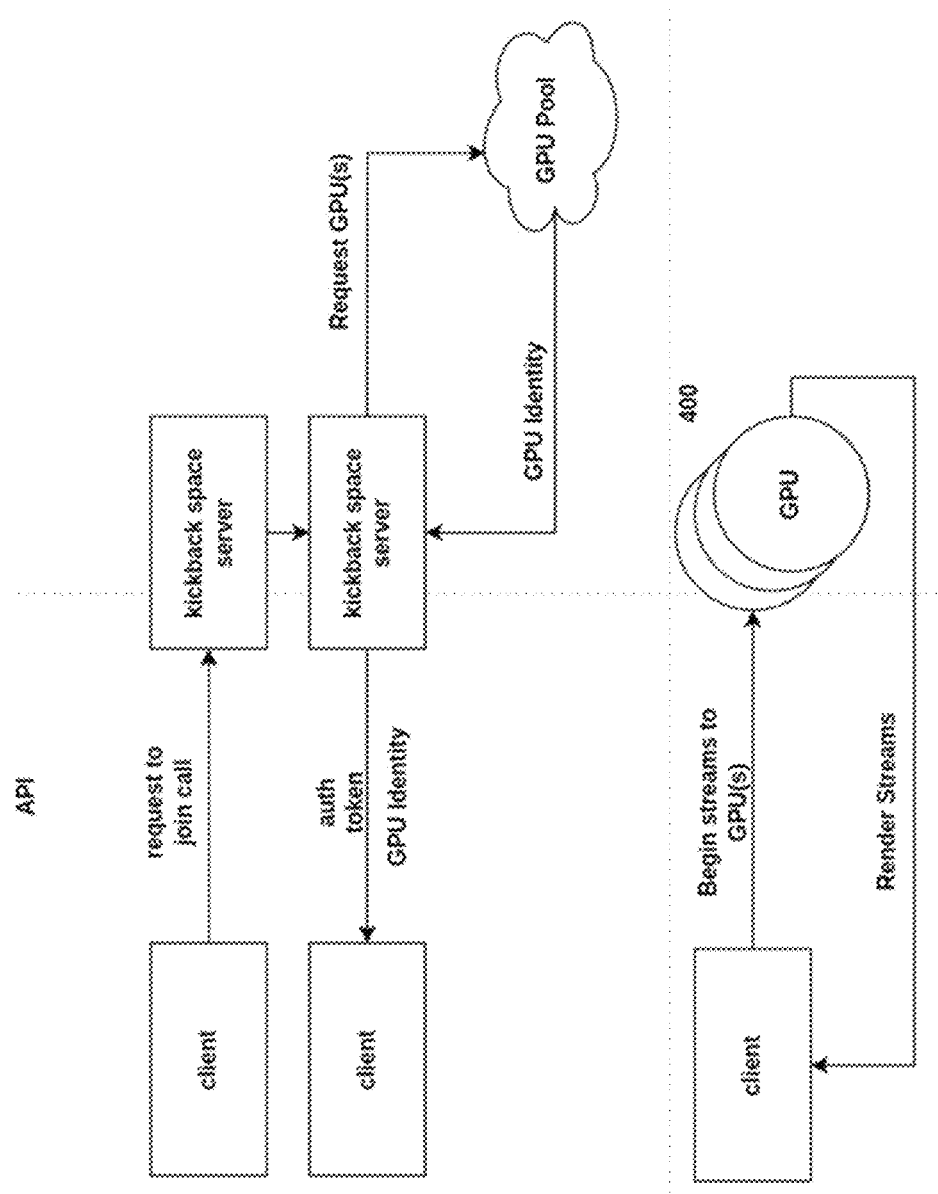
FIG. 10 shows an overview of the API operations, according to an embodiment.

FIG. 10 shows an overview of API operations (e.g., that can be performed by processor 1102 using software model(s) 1106), according to an embodiment. More specifically, FIG. 10 shows authorization protocols involving authentication of a user, determining the computing load his request(s) warrant, and auto-configuring the media delivery and quality, in accordance with that user's profile parameters. A user (or "client"), when logging in, can request access to cloud server services. In response to the request for access, the cloud server services can perform an audit of the graphics processing unit (GPU) services available to the user's account, identify an appropriate GPU cluster, and allot the service(s) to the user. Upon access to the services (e.g., Kickback Space™ Services) enhanced by GPU acceleration (i.e., hardware acceleration; e.g., offloading some tasks), the client can access/use a high quality (e.g., high definition (HD)) quasi-virtual environment in which the user can interact in spatial circumstances with other users. In some implementations, a user may opt out of GPU services while still being able to enjoy the 3D spatial environment, albeit at a lower quality.

Machine Learning Pipelines

Referring to FIG. 9B, note the following labels:
- 303: hardware encoded data pipes
- 306: raw video frames
- 304: background removal software component
- 305: hardware-accelerated encoder FIG. 9B shows the various ML-based manipulations the raw data 303 can be subjected to (e.g., by software model(s) 1106). Several options 306 can exist in the backend to upgrade the raw video frames to enhance quality, neutralize the background 304 if desired, and/or upscale and encode (305) the video frames after etching with the respective customary perspective of the Users (i.e., omnisization). A GPU can be used on the cloud to execute this operation in an unstaggered manner, avoiding any jitters in the data post-processing stages. This sub-zone can also cater to the audio enhancement of the data including noise-filtering and location-specific audio adjustments. All the multimedia data here, along with positional data, can be encoded in order to be consumed by the end layers shown in the diagram.

System Processes

Figure 11:
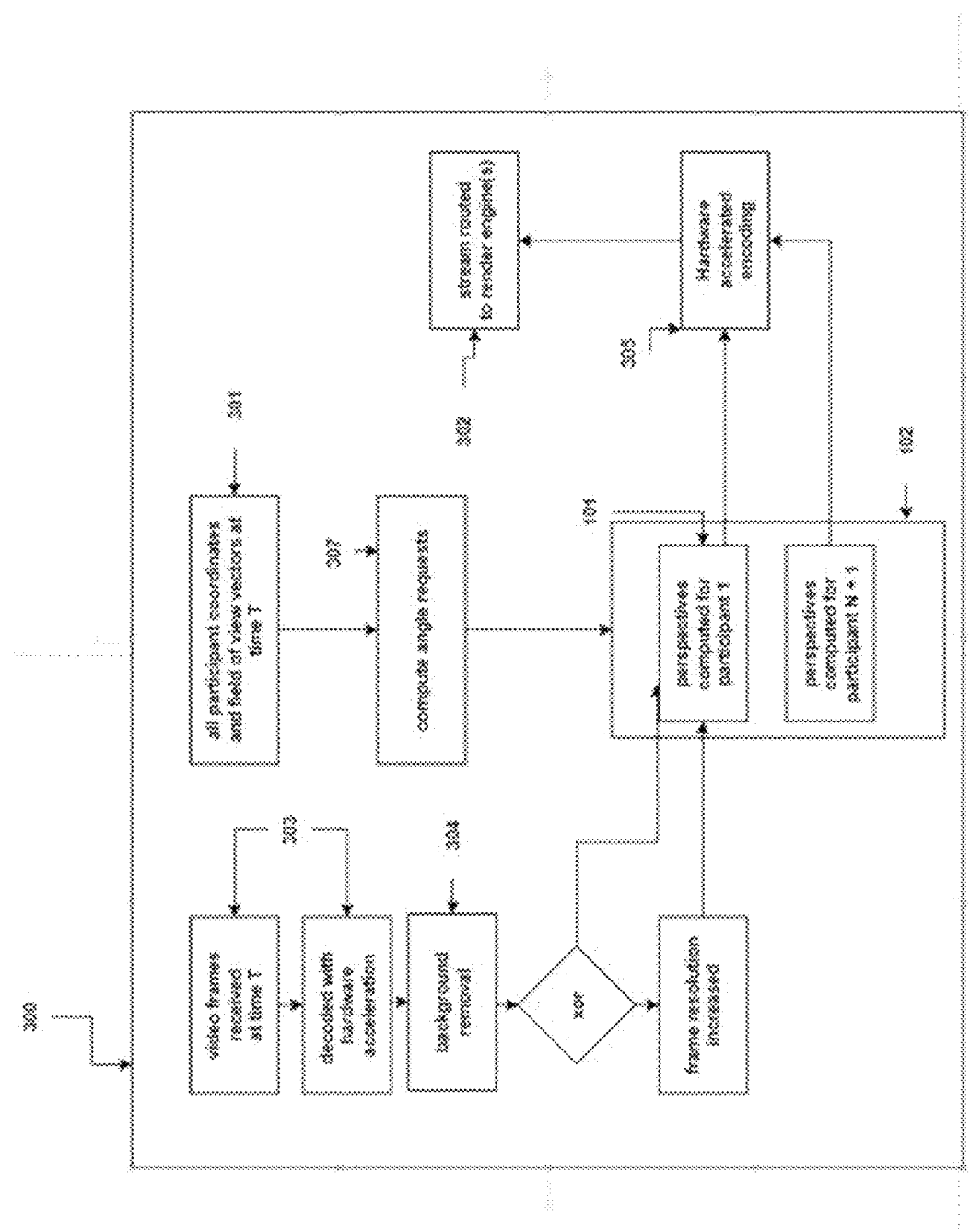
FIG. 11 shows manipulation of the video frames with respect to the angular orientation of a virtual representation (s), according to an embodiment.

Referring now to FIG. 11, this figure shows time-bound operations involving the use-specific media delivery, controlled by the peer-to-peer spatio-temporal equilibrium in the quasi-3D space and operating on the angular parameters of the respective video frames. FIG. 11 includes the following labels:

- 101: Engineered Media
- 102: Chat participants
- 301: Transient Tensor data component with chat participant vectors and field of view vectors
- 302: Stream routed to render engines
- 303: Decoded frames
- 304: Background removal software component
- 305: Hardware-accelerated encoding
- 307: Angular vectors computation & requests FIG. 11 shows the generation of the frames in response to requests made on behalf of a set of users with respect to the angular orientations of one or more counterpart/collaborating users. The demand control 307 can indicate results of angle requests that impact the perspectives to be generated, and can be performed with the front-end geometrically-aware user [101] interface. The frames [303] created at a certain angle and quality pertaining to a given client [102] can be encoded by the GPU [305] and sent to the rendering engine [302], where the rendering engine [302] which can be capable of transporting the delivery to the demanding client.

The sub-module can include a background matting [304] software component, which intelligently cut out the background upon request and replace the background with a green matte, a background of choice, transparent pixels, etc. The matting can be performed in real-time on the GPU [304].

Transfer Learning Sub-Modules

Figure 12:
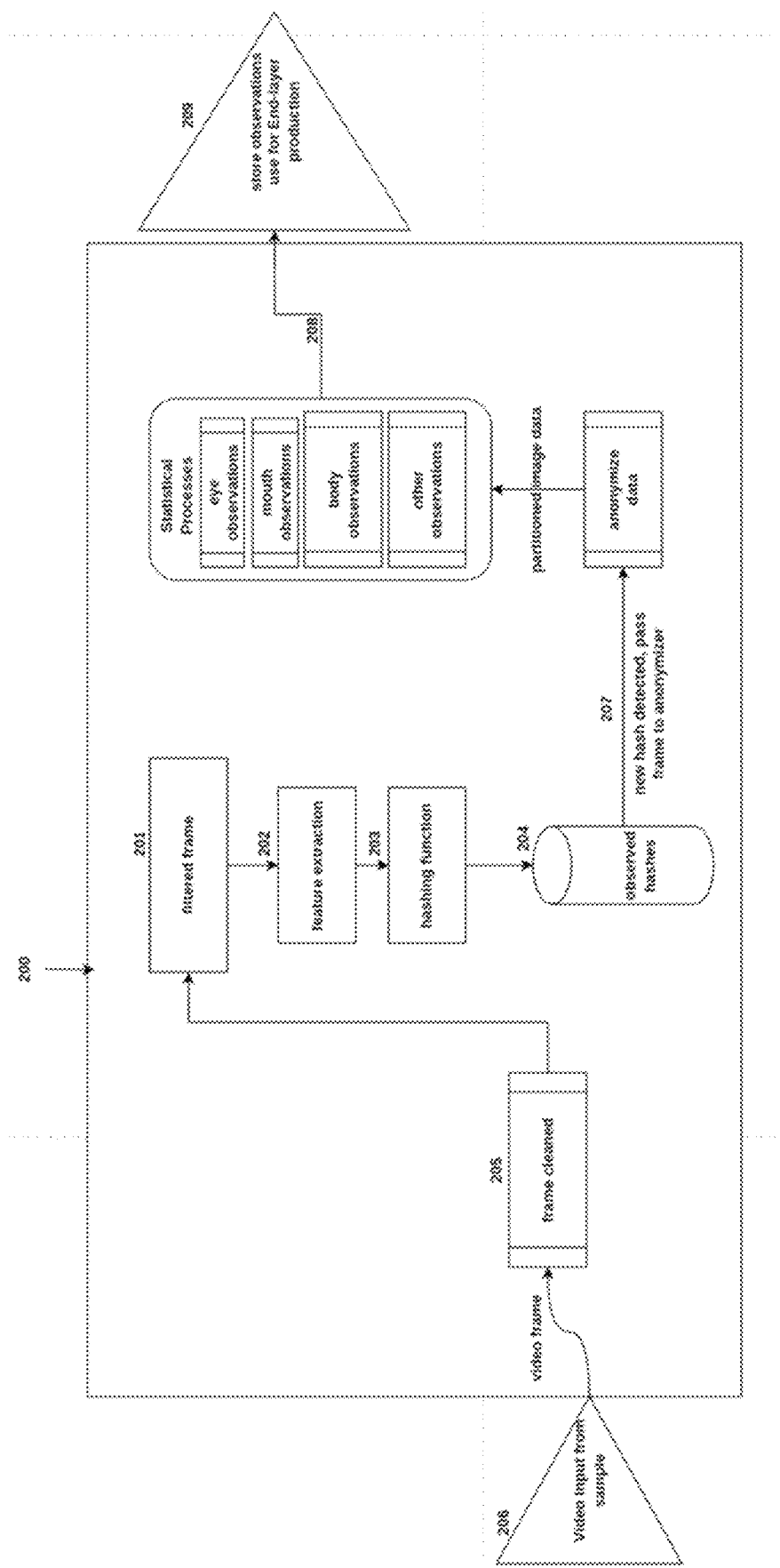
FIG. 12 shows a hybrid transfer and continual learning protocols that can be applied to the video data, according to an embodiment.

Referring now to FIG. 12, this figure outlines a process involving acquiring idiosyncratic elements and storing them as cleaned meta-heuristic and statistical data for use in continuous and transfer learning of one or more ML systems. FIG. 12 includes the following labels:

- 206: Video inputs from samples
- 205: Image processing routines
- 200: Machine Learning sub-module
- 201: Filtered frame
- 202: Feature extractor
- 203: Hashing routine
- 204: Hash storage
- 207: Hash to anonymizer pipeline
- 208: Statistical processes
- 209: Observations storage FIG. 12 shows hybrid transfer and continual learning protocols 200 that can be applied to the video data 206 (e.g., by software model(s) 1106). Raw video data can be collected/received, e.g., in the form of sequential video frames 206, cleaned via the image processing routine 205, and analyzed and stored in a hash storage sub-zone 204. Feature extraction 202 of each video frame (e.g., to extract features such as changes in dynamic facial features, expressions, special contortions peculiar to individual faces and/or marks) can be segmented and hashed by anonymous functions, and stored as encrypted data (e.g., using hashing routine 203 and hash storage 204). These qualitatively segmented and classified data can be statistically segmented (e.g., using statistical processes 208) into torso peculiarities, mouth observations, eye observations, etc., and stored for future usage. If a user opts for higher computing power, the video frames (e.g., in observations storage 209) that the user receives and sends can be based on enhanced and thresholded data, which can ensure superior chat quality and hyper-reality experiences during the login and/or videoconferencing session.

Additional Embodiments

Architecture

Figure 13:
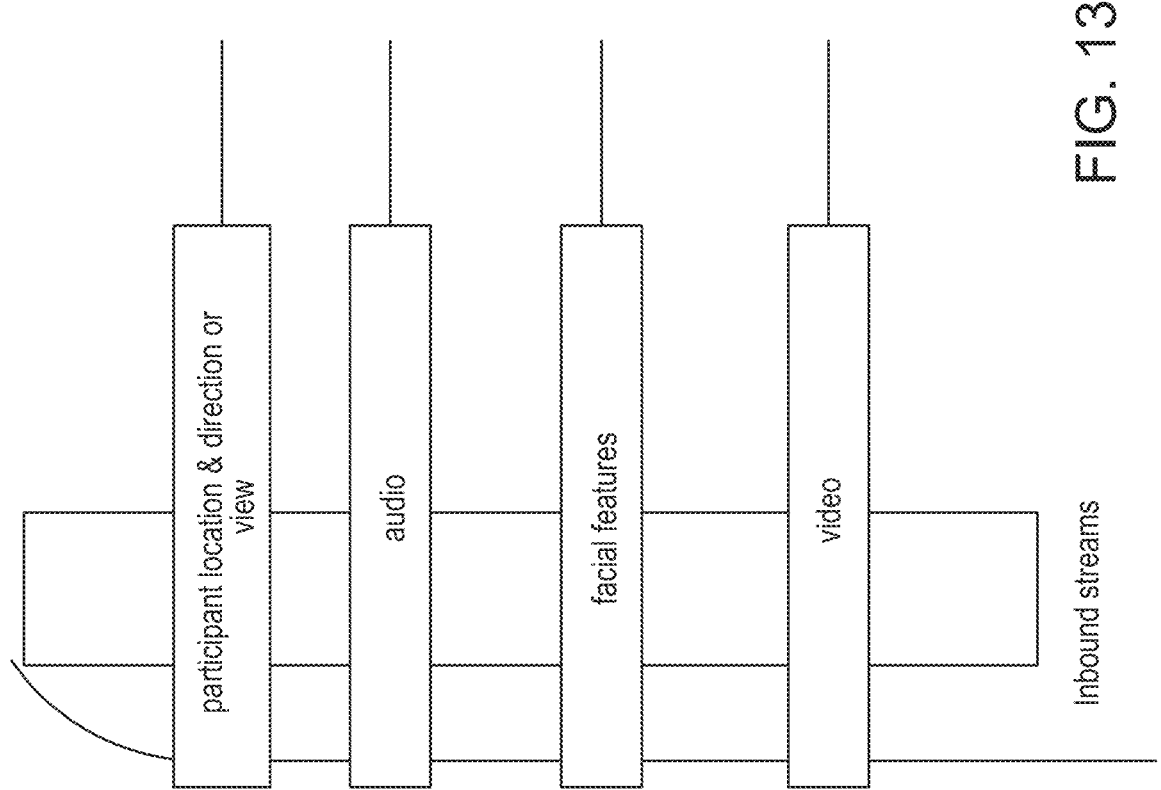
FIG. 13 shows inbound streams of participant location and field of vision, audio, facial features, and video, according to an embodiment.
Figure 14:
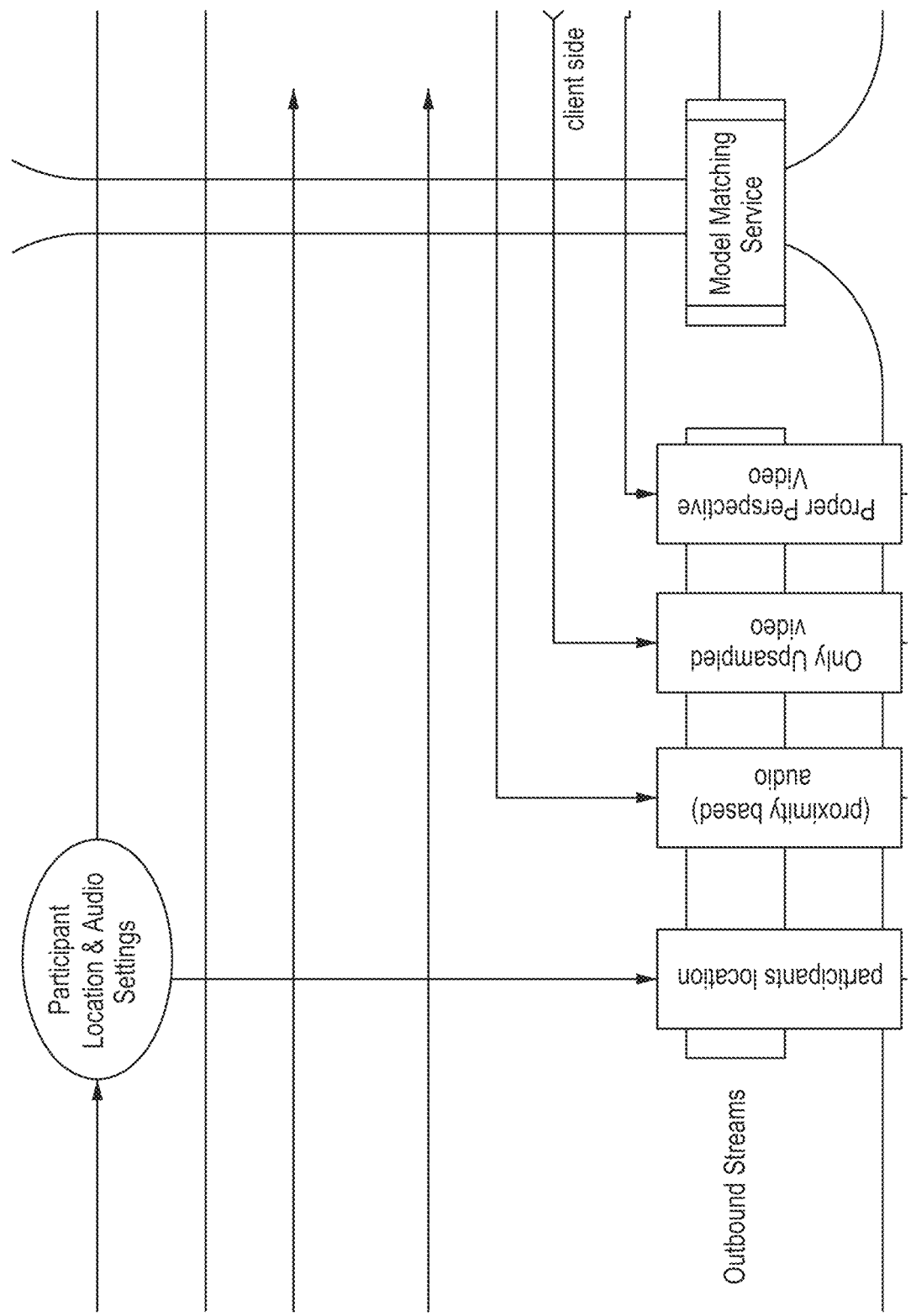
FIG. 14 shows managing outbound streams from FIG. 13, according to an embodiment.

In some embodiments, the architecture of an NIVR video teleconferencing system (e.g., compute device 1101) can include a plurality of networked sub-systems that facilitate continuous acquisition, generation, synthesis, maintenance, reproduction and presentation of data to the end-points (i.e., user compute devise). Where a cloud deployment is implemented, a REST API(s) can be used to handle asynchronous data flow regimes through the system. Data acquisition can be performed using hardware and/or software, and one or more modalities can be applied to the data and deliver three dimensional human representations in such a way that a state-of-the-art mixed reality-based experience can be presented to the room occupants (see, e.g., (1) "Adrian Kaehler and Gary Bradski. *Learning OpenCV 3: Computer vision in C++ with the OpenCV library*. O'Reilly Media: 2017, ISBN 10: 1491937998.", the contents of which are incorporated by reference herein in its entirety, or (2) "John Russ and F. Neal. *The Image Processing Handbook, Seventh Edition II—Correlation, Classification, Identification, and Matching*. O'Reilly Media: 2015", the contents of each of which are incorporated by reference herein in their entireties). Though not explicitly drawn in the Figures, the ecosystem (e.g., software model(s) 1106) can be segmented into the following sub-systems:

1. Client side—developer components that control and stream virtual experiences (see, e.g., (1) William R. Nugent. *Virtual reality: Advanced imaging special effects let you roam in cyberspace. Journal of the American Society for Information Science and Technology*: 1991, and (2) Fabio Bruno, Stefano Bruno, Giovanna De Sensi, Maria-Laura Luchi, Stefania Mancuso and Maurizio Muzzupappa. *From 3D reconstruction to virtual reality: A complete methodology for digital archaeological exhibition. Journal of Cultural Heritage*: 2010, the contents of each of which are incorporated by reference herein in their entireties)
2. Network and Data Pipeline System Integration—channels feed to communicate and store heuristic/deterministic data for online evolutionary ML improvement
3. Kickback Space™ Network—live media distribution processor with an embedded hybrid ML pipeline to perform object transformations
4. Data processing & storage pipeline—intelligent data storage
5. Cluster manager and sub-clusters—supports evolving hybrid ML models The architecture (e.g., software model(s) 1106) can be capable of performing one or more the following functions:

1. Stream inbound audio streams (see, e.g., FIG. 13) and to
   (a) enhance the audio sub-streams
   (b) group the audio effects
   (c) convert the audio to proximity-based and/or include 3D effect 2. Stream inbound video streams (see, e.g., FIG. 13) and to
    (d) enhance video sub-streams
    (e) real-time 2D to 3D human video transformations (additional details can be found at "Fabio Bruno, Stefano Bruno, Giovanna De Sensi, Maria-Laura Luchi, Stefania Mancuso and Maurizio Muzzupappa. *From 3D reconstruction to virtual reality: A complete methodology for digital archaeological exhibition*. Journal of Cultural Heritage: 2010.", the contents of which are incorporated by reference in its entirety herein.
3. Stream the facial features of the participants to support ML models and offer low data streaming modes
4. Stream the participant's location and perspective
5. Capability of stand-alone generation of models with end-layers based on inputs from 2, 3 and 4, using ML
6. Capability of maintaining an engine whose function is to receive, ratify and aggregate the processed streams from 1-5, along with the data from the heuristic perspective computed at the client side, managing it as outbound streams (FIG. 14) and presenting it as a limited real-time 3D world of the other participants to the client.

The details of the various sub-systems are presented in the following paragraphs.

Client Side

Figure 15:
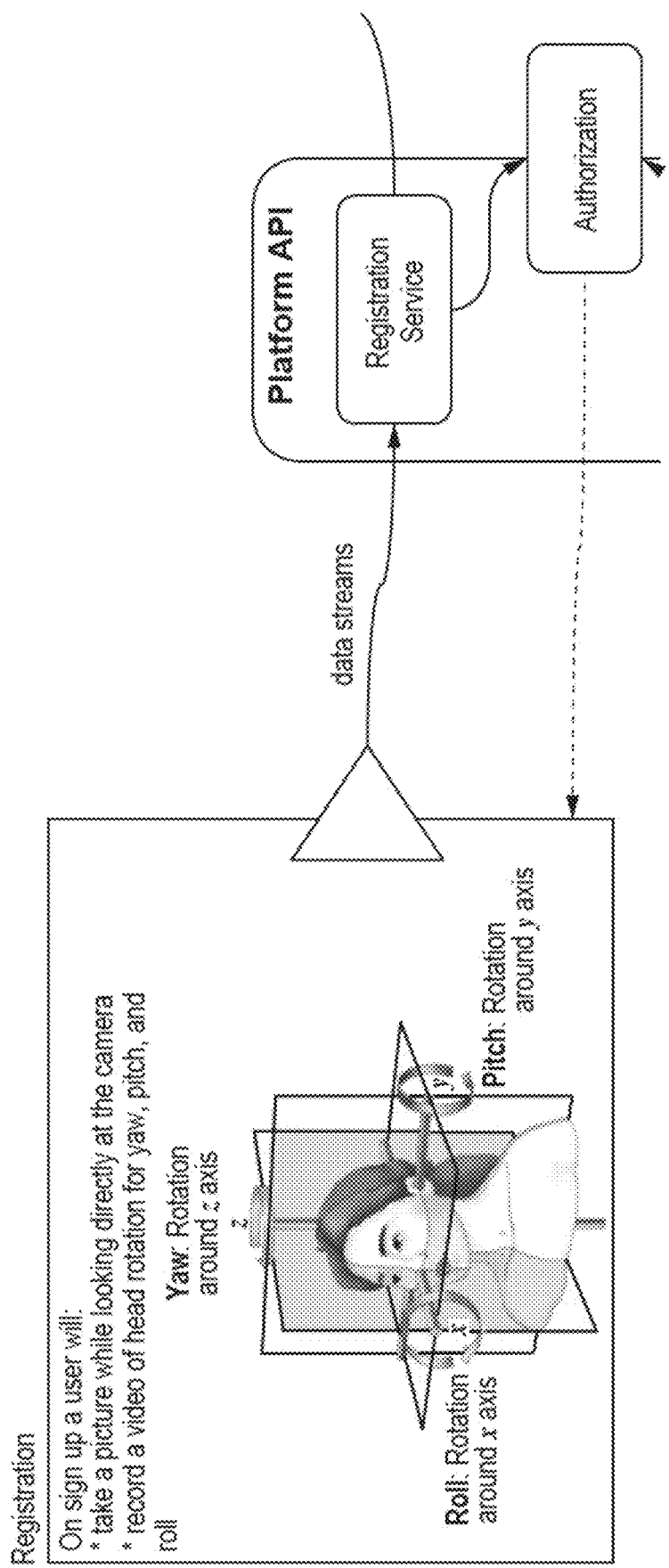
FIG. 15 shows an image capturing process, according to an embodiment.

In some embodiments, a participant/user, upon registration (see, e.g., FIG. 15), and in addition to sign-up protocols, can to take a photo facing the camera and a video by rotating her head along the three axes to traverse the yaw, the pitch and the roll angles.

In some implementations, yaw (rotation about the vertical central axis of the head), pitch (rotation about the horizontal axis passing through the ears) and roll is the rotation about the axis passing through the nose and the back of the head).

Figure 16:
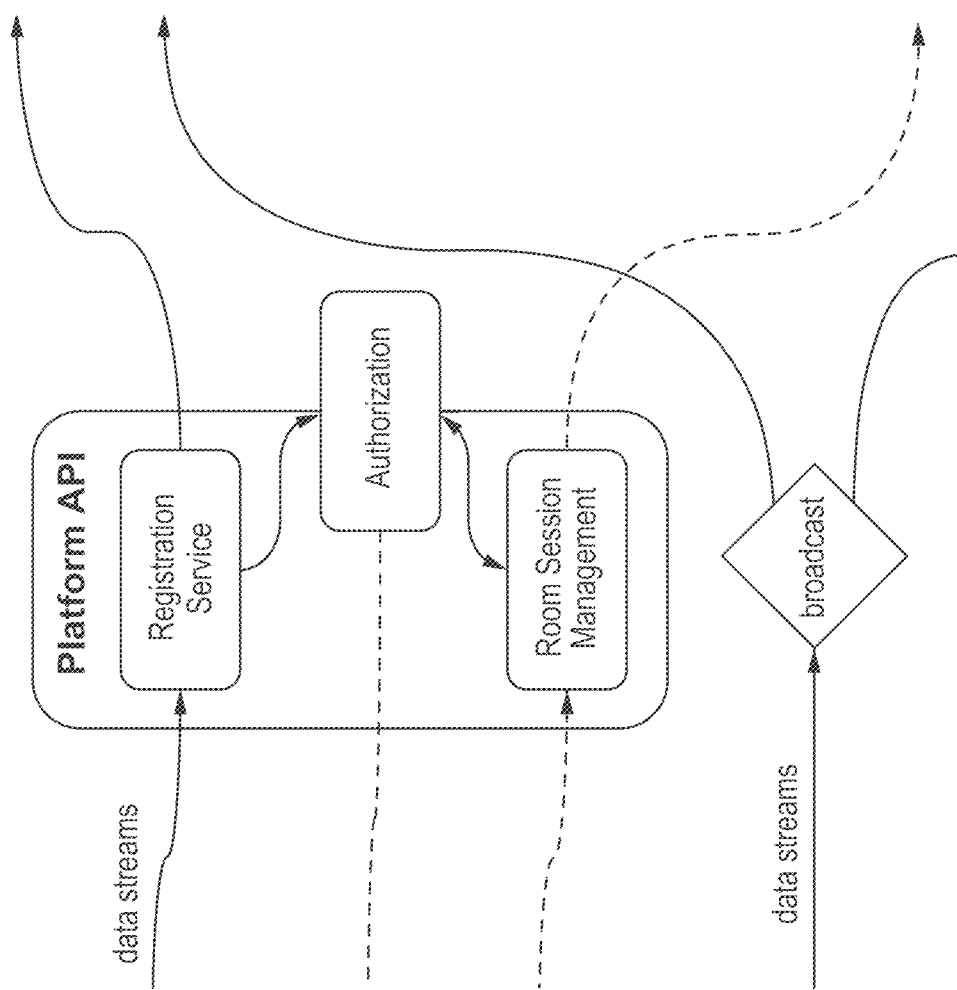
FIG. 16 shows a structure for a platform API, according to an embodiment.

In case of a new user, the data streams (FIG. 16) propagated from the client side can reach the Platform API for completion of the registration procedure, authorization and customizing the room session. If the access for any reason is denied, a caution can be issued to the client and further attempts can be advised and/or curtailed with secure authentication such as JWT or 2FA; additional details can be found at "Zafar Gilani, Abdul Salam and Salman U1 Haq. *Deploying and Managing a Cloud Infrastructure*. Wiley: 2015, ISBN 13: 978111887510.", the contents of which are incorporated by reference herein in its entirety.

Figure 17:
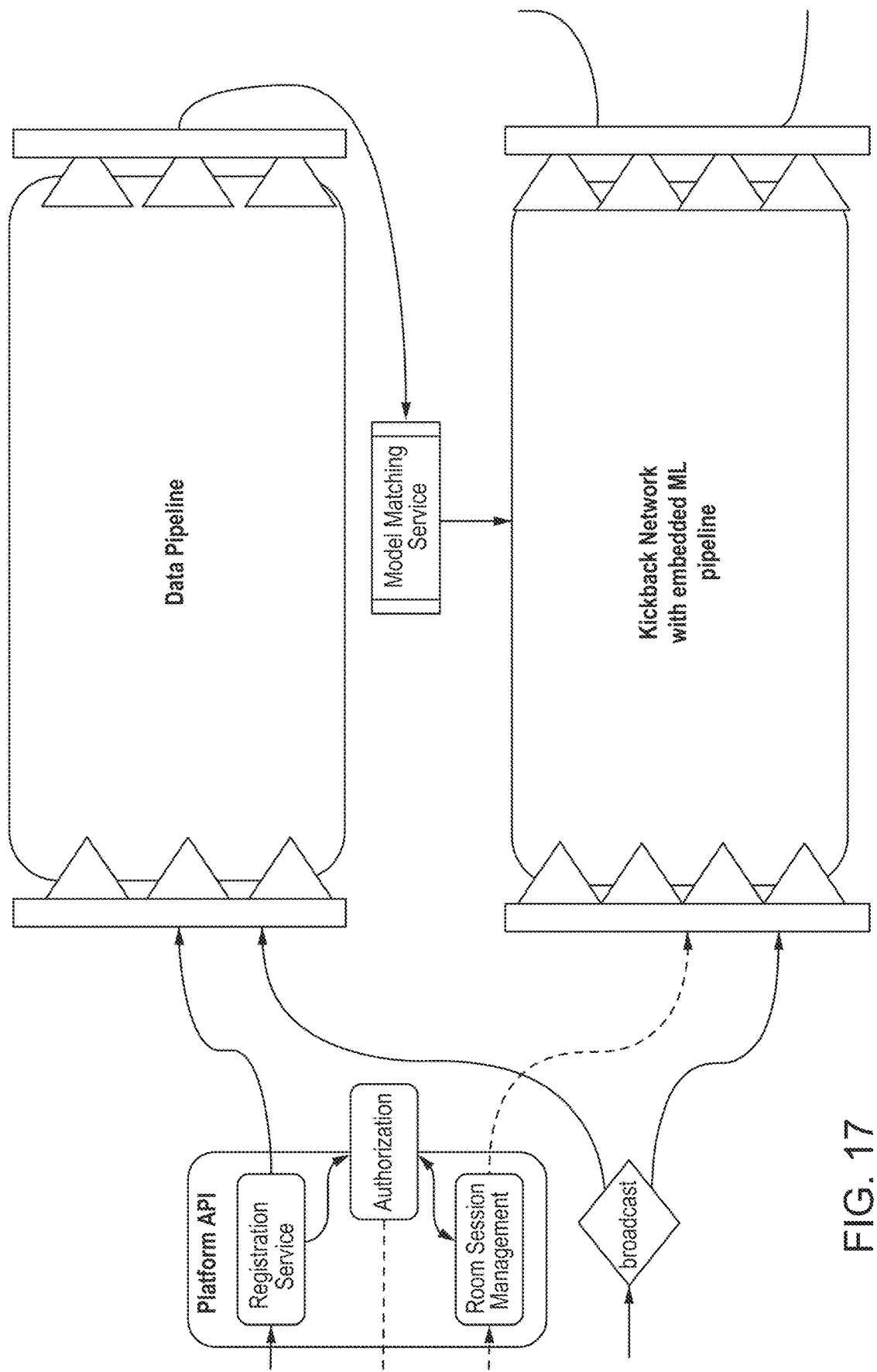
FIG. 17 shows a data pipeline and embedded machine learning pipeline, according to an embodiment.
Figure 18:
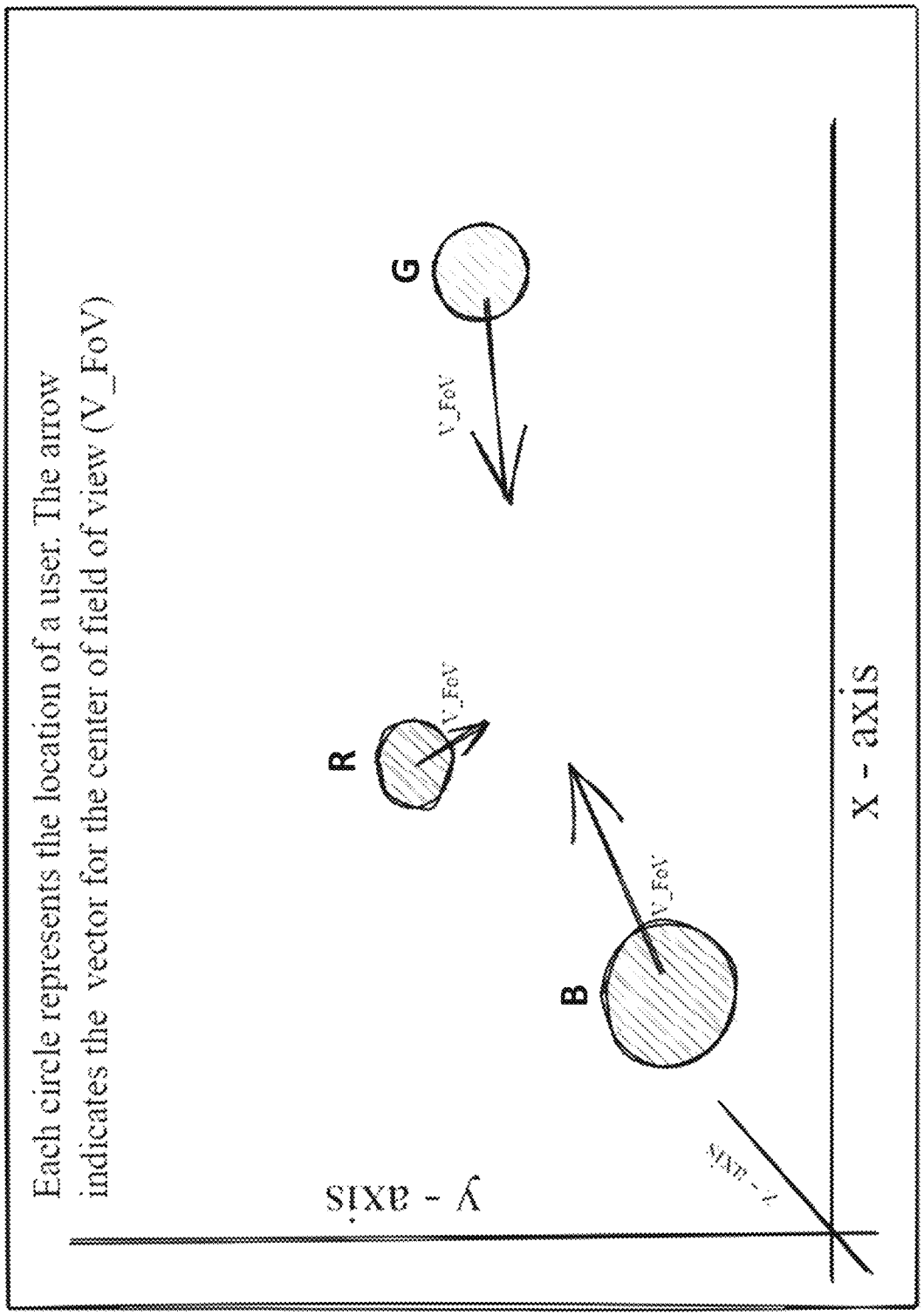
FIG. 18 shows users and field of views of the users in a virtual environment, according to an embodiment.
Figure 19:
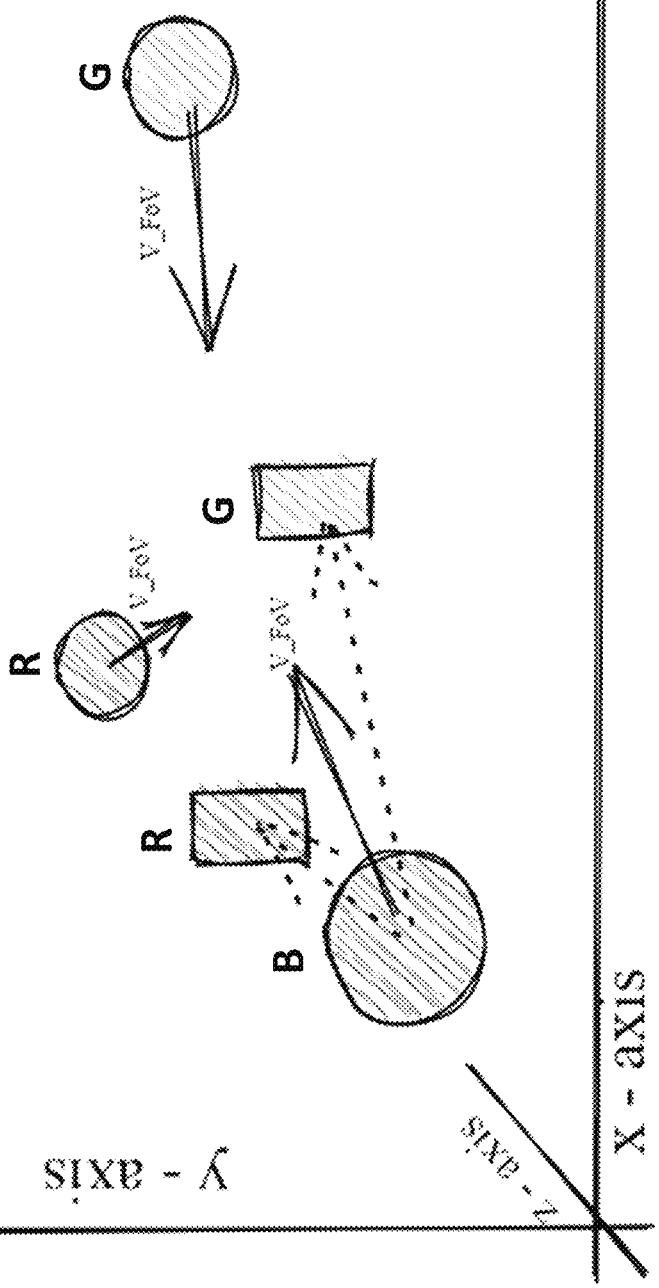
FIG. 19 shows users, field of views of the users in a virtual environment, and video planes associated with two users from the perspective of one user, according to an embodiment.

In case of a registered user, the outbound data streams can be broadcasted with one or more ML-generated aggregate models through the data pipeline as well as the embedded ML pipeline (FIG. 17). The data outflow from the data pipeline can be applied to the model matching service, and hyperparameters for the ML continuous learning can be chosen based on the logical responses. The rendering engine, which can maintain the video schemes for client streaming, can follows the tenets of computer graphics and the rules of relative perspectives (FIG. 18). The three circles in FIG. 18 represents three users B, R, G. Each user will happen to see the video plane of the other two users (FIG. 19) which are parallel to the view vector, a normal of the user's viewpoint. For example, as seen in FIG. 19, user B sees video planes associated with users R and G. Similarly, user G can see video planes associated with users B and R (not shown in FIG. 19), and user R can see video planes associated with users B and G (not shown in FIG. 19). Thus, the movement of the video plane can keep shifting the view vector, in such a way that video plane is always normal to the view vector.

Figure 21:
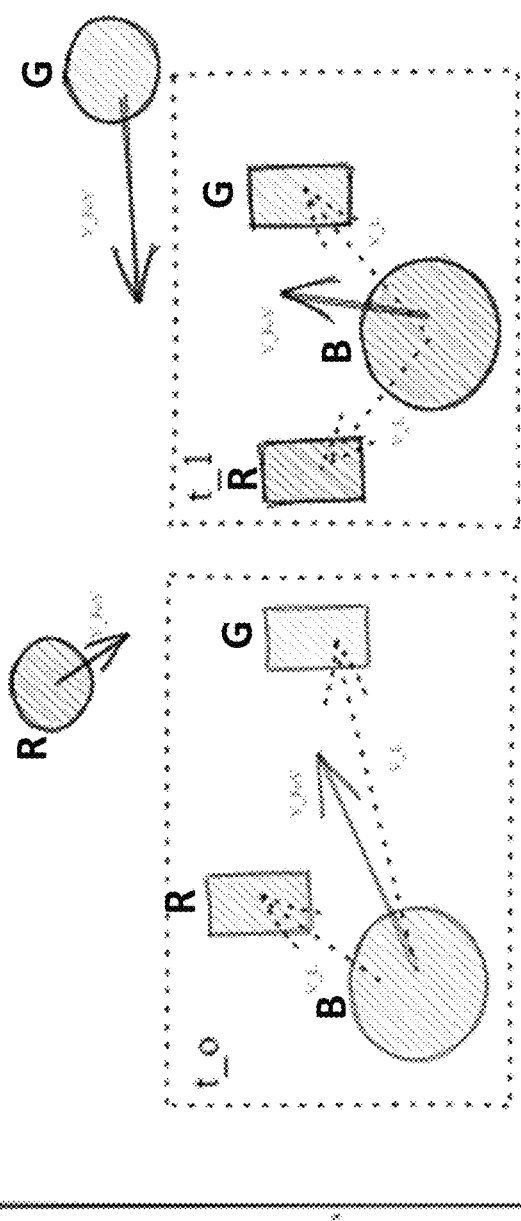
FIG. 21 shows video planes for a user that moves in the virtual environment, according to an embodiment.
Figure 22:
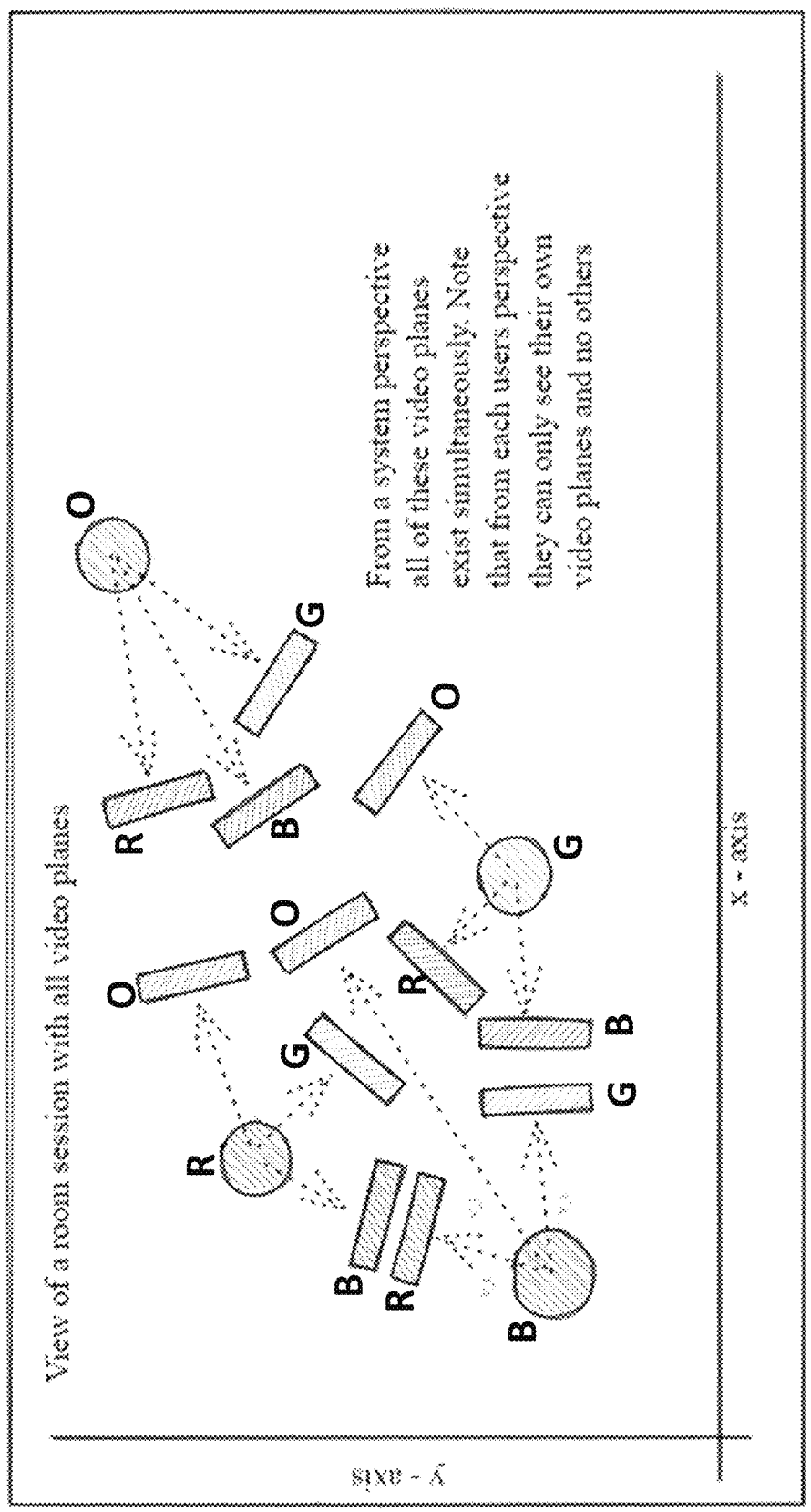
FIG. 22 shows video planes for multiple users, according to an embodiment.

In some implementations, from a system perspective, all of the video planes exist simultaneously, while a particular user will be able to see only what pertains to their interest (e.g., in their field of view). The data streams can be passed through the data pipeline (see, e.g., FIGS. 20A-20D) for processing/filtering and using a model matching service and the embedded ML pipeline of the Kickback Network, other participants can receive the video-audio presentation (see, e.g., FIG. 21) on their screens. The data received by the other users can be in such a way that the data is a heuristic aggregate of the live data and the ML-generated data, which in effect is a substantially seamless animation of the roommate projected to the location of where the participant stands (see, e.g., FIG. 22). Some workflows discussed herein can enable one or more compute devices to generate, maintain, upgrade and learn realistic audio-video-movement-driven facial-torso animations with convolutional neural networks (CNN), recurrent neural networks (RNN) and Generative Adversarial Networks (GAN).

Kickback Space™ Server Side

As discussed herein, the Kickback server (e.g., compute device 1101 and/or software model(s) 1106) can include the following subsystems:

ML Pipeline

In some embodiments, the ML pipeline can integrate weather of the following elements:
1. A facial detection model (e.g., Linzaer) (see, e.g., Lu Jian, Hu Weidong, Sun Yi. *A deep learning method for image super-resolution based on geometric similarity*. Signal Processing: Image Communication: 2018, the contents of which are incorporated by reference herein in their entirety).
2. A facial recognition model (e.g., Face2Vec)
3. A 3D facial reconstruction model (physics-based and/or data-based models can be used depending on the situation. Upon initial registration, the physics-based model may be computed and stored. (see, e.g., (1) Ajay Kumar Boyat and Brijendra Kumar Joshi. *A Review Paper: Noise Models in Digital Image Processing*. Signal Image Processing An International Journal: 2015, and (2) "Bir Bhanu and Ajay Kumar. *DeepGender2: A Generative Approach Toward Occlusion and Low-Resolution Robust Facial Gender Classification via Progressively Trained Attention Shift Convolutional Neural Networks (PTAS-CNN) and Deep Convolutional Generative Adversarial Networks (DCGAN)*. Advances in Computer Vision and Pattern Recognition] Deep Learning for Biometrics II: 2017," the contents of each of which are incorporated by reference herein in their entireties).
4. An upsampling model to densify the facial topography (e.g., densification techniques based on physics and continuous learning can be used to "real-ify" the facial topography) (see, e.g., Tsung-Han Chan,Kui Jia, Shenghua Gao, Jiwen Lu, and Zeng *PCANet: A Simple Deep Learning Baseline for Image Classification*). Signal, Image and Video Processing: 2019, the contents of which are incorporated by reference herein in their entirety).
5. A facial regeneration model based on the above elements (a final facial model as a resultant of the above or a "digital countenance") (see, e.g., (1) Lu Jian, Hu Weidong, Sun Yi. *A deep learning method for image super-resolution based on geometric similarity*. Signal Processing: Image Communication: 2018, and (2) Morteza Zangeneh Soroush, Keivan Maghooli, Seyed Setarehdan, Nasrabadi Kamaledin, and Motie Ali. *A novel EEG-based approach to classify emotions through phase space dynamics*. Signal, Image and Video Processing: 2019, the contents of each of which are incorporated by reference herein in their entireties).

6. A facial image generation based purely off a feature set describing movements of a face based on the above elements (e.g., a sparse face model, containing the facial features set and the Structure from Motion(SfM) data) (see, e.g., (1) Multi View Geometry. https://openmvg.readthedocs.io/en/latest/, (2) MultiView stereo reconstruction. https://github.com/cdcseacave/openMVS, and (3) Yaron Gurovich, Yair Hanani, Omri Bar, Guy Nadav, Nicole Fleischer, Dekel Gelbman, Lina Basel-Salmon, Peter M. Krawitz, Susanne B. Kamphausen, Martin Bird Zenker, Gripp Lynne M., and W. Karen. *Identifying facial phenotypes of genetic disorders using deep learning*. Nature Medicine: 2019," the contents of each of which are incorporated by reference herein in their entireties.

7. Omnisization—an on-demand perspective generator

8. Specialized end-layers that enhance the quality of general omnisization solutions Data Processing & Storage Pipeline The data processing (see, e.g., FIGS. 20A-20D) and heuristic-based pipeline processes data from the input streams such as video, audio and movements data of the user, and maintains data flow to the cluster manager which handles updates of new data to the various sub-clusters.

Video Processing

In some embodiments, the video stream sub-pipeline can handle video data (see, e.g., FIGS. 20A-20B), record changes in the background of the participant, and keep them segmented. Image processing filters such as green filter/anti-alias/image thresholding can be applied over the static background images to isolate them as environmental background in the chat room (see, e.g., Adrian Kaehler and Gary Bradski. *Learning OpenCV 3: Computer vision in C++ with the OpenCV library*. O'Reilly Media: 2017, ISBN 10: 1491937998, the contents of which are incorporated by reference in their entirety herein). If the procured data at a particular point in time is unique from earlier data, and if the procured data passes predetermined quality standards, the procured data can be stored to the user's history of backgrounds.

User Behavior Data Processing

In some implementations, user orientation and pose analysis (see, e.g., FIGS. 20C-20D) can be performed using three separate streams, namely: facial angular orientation (e.g., Yaw, Pitch and Roll), torso analysis (e.g., registering an instance of special orientation) and facial expression analysis (e.g., registering smiles, grimaces, winces, gapes, gawks and other such special facial contortions) (see, e.g., (1) "Sparse Simultaneous Recurrent Deep Learning for Robust Facial Expression Recognition" by M. Alam, et al.,*IEEE Transactions on Neural Networks and Learning Systems* (2013), the contents of which are incorporated by reference herein in their entirety, or (2) Yunfei Li, Zhaoyang Lu, Jing Li and Yanzi Deng. *Improving Deep Learning Feature with Facial Texture Feature for Face Recognition*. Wireless Personal Communications: 2018, the contents of which are incorporated by reference herein in their entirety), stored in the user database as facial-angled data, body language data (see, e.g., (1) Bing-Fei Wu, Chun-Hsien Lin. *Adaptive Feature Mapping for Customizing Deep Learning Based Facial Expression Recognition Model*. IEEE Access: 2018, (2) Qidong Du 3*D point cloud registration denoising method for human motion image using deep learning algorithm*. Multimedia Systems: 2019, and (3) Pichao Wang, Wanqing Li, Philip Ogunbona, Jun Wan, and Sergio Escalera. *RGB-D-based Human Motion Recognition with Deep Learning: A Survey*. Computer Vision and Image Understanding: 2018," the contents of each of which are incorporated by reference herein in their entireties), and expression data, and updated (see, e.g., (1) "Comparison Between Deep Learning Models and Traditional Machine Learning Approaches for Facial Expression Recognition in Ageing Adults. Journal of Computer Science and Technology" by A. Caroppo, et al. (2020) and (2) Meimei Gong and Yiming Shu. *Real-Time Detection and Motion Recognition of Human Moving Objects Based on Deep Learning and Multi-Scale Feature Fusion in Video*. IEEE Access: 2020, the contents of each of which are incorporated by reference herein in their entireties).

Figure 20A:
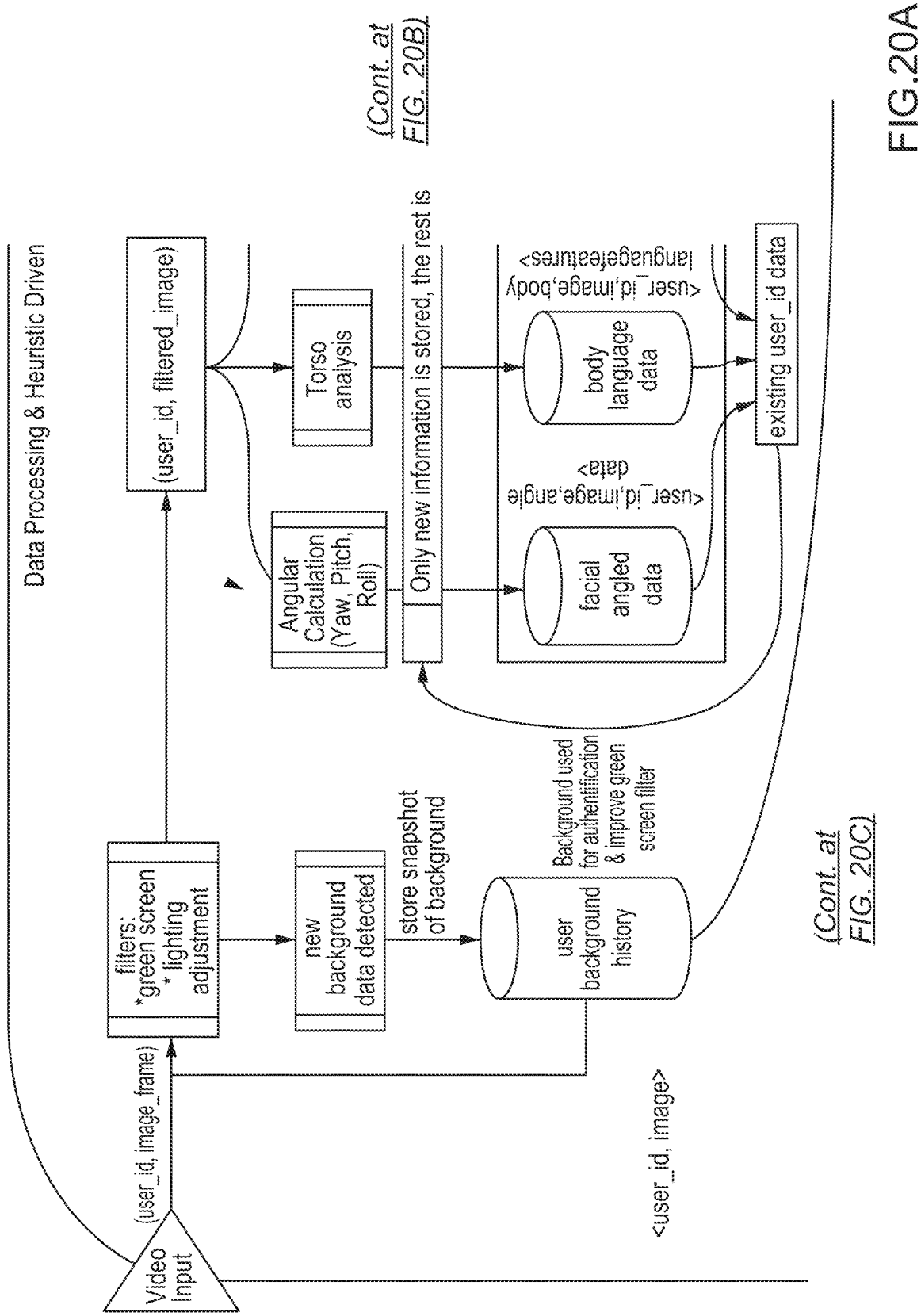
Figure 20B:
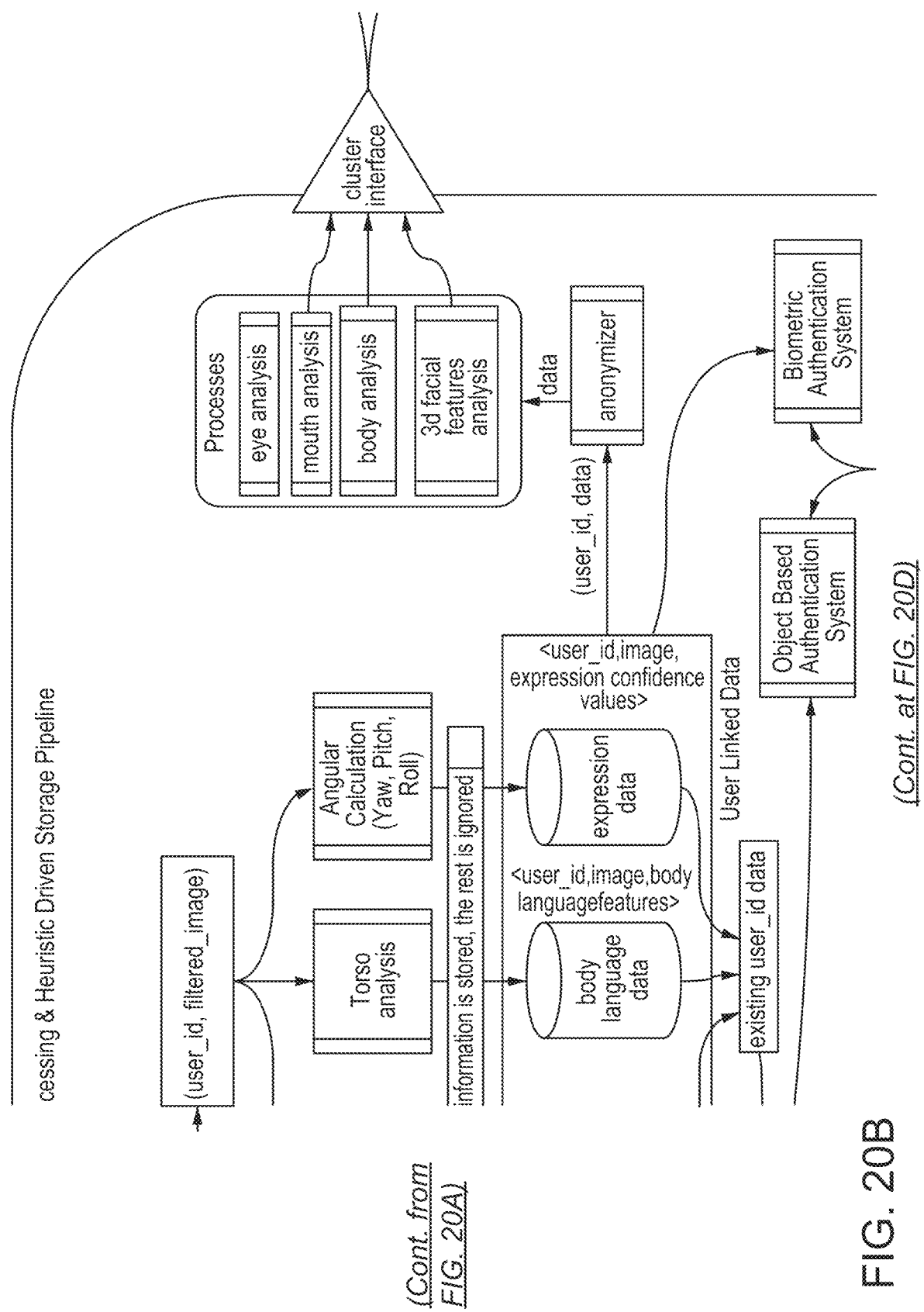
Figure 20C:
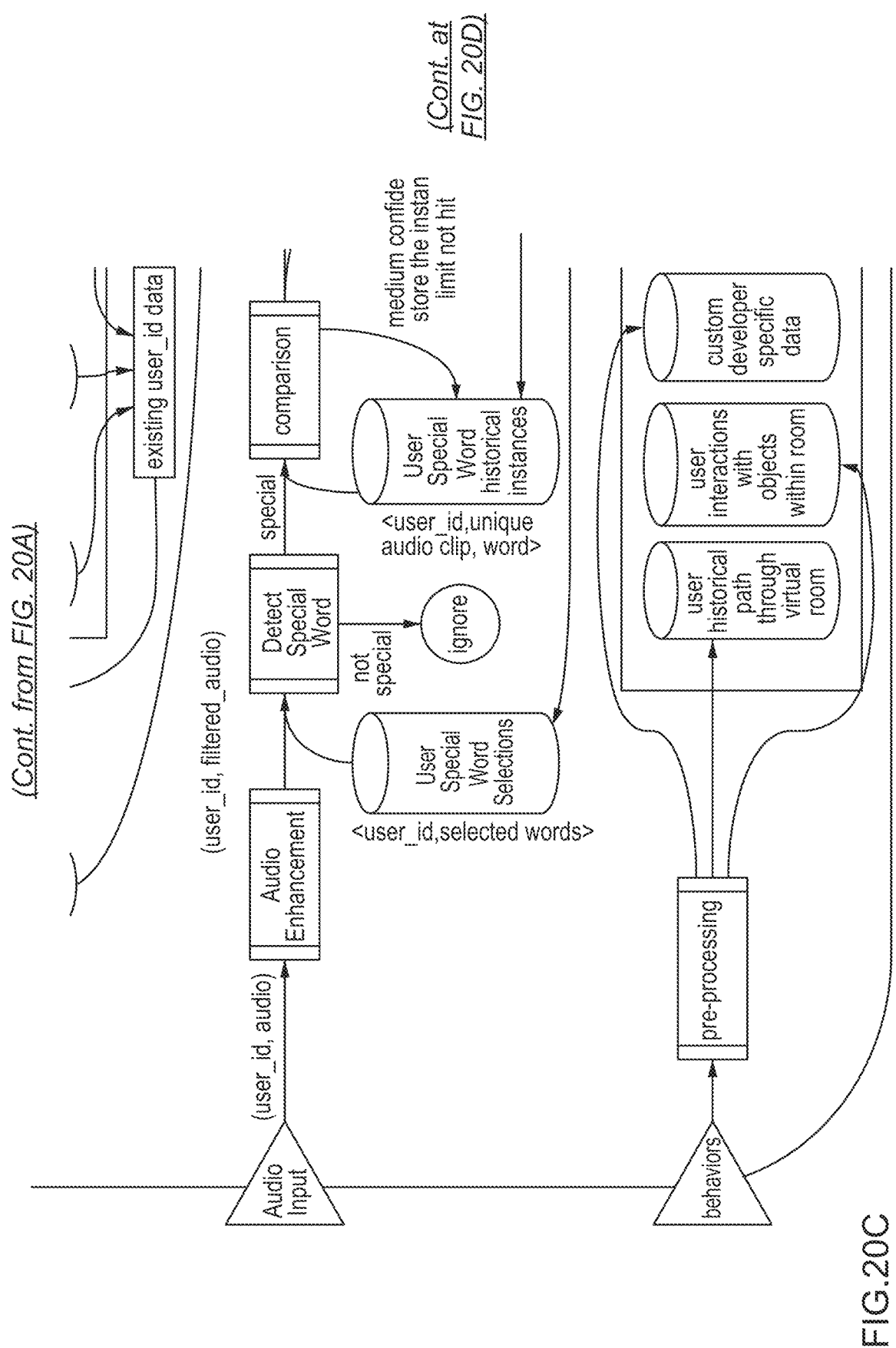

The lower branch of the pipeline shown in FIGS. 20C-20D (from "behavior" in FIG. 20C to "analytics interface" in FIG. 20D) can also pre-process data related to the user movements in the room including, for example, the user's paths, errands, sources and/or destinations with respect to the room-centric co-ordinate systems, and sends the data to the cluster which would later be available for analysts and developers (see, e.g., (1) "Human action recognition in RGB-D videos using motion sequence information and deep learning," by E. P. Ijjina, et al. Pattern Recognition: 2017, and (2) "3D point cloud registration denoising method for human motion image using deep learning algorithm" by Q. Du, *Multimedia Systems* (2019), the contents of each of which are incorporated by reference herein in their entirety).

Audio Processing

In a similar fashion, the audio data can be stored (see, e.g., FIGS. 20C-20D) in the sub-pipeline after filtering the background noise. The speech analysis kernel can applied to assort the user diction in the forms of special word selections and accents (see, e.g., (1) Bing-Fei Wu, Chun-Hsien Lin. *Adaptive Feature Mapping for Customizing Deep Learning Based Facial Expression Recognition Model*. IEEE Access: 2018, (2) Salman Taherizadeh and Marko Grobelnik. *Evaluating deep learning architectures for Speech Emotion Recognition*. Neural Networks: 2017, and (3) Kuniaki Noda, Yuki Yamaguchi, Kazuhiro Nakadai, Okuno Hiroshi G. and Ogata Tetsuya. *Evaluating deep learning architectures for Speech Emotion Recognition*. Applied Intelligence: 2015, the contents of each of which are incorporated by reference herein in their entireties. In some implementations, the user has a provision to set the language level at the initial settings. In some implementations, if a word is found to be peculiar and/or unique to a certain user, the word is updated in the database as a special word which is a user verbal characteristic (see, e.g., Pradeep Kumar Mallick, Valentina Emilia Balas, Bhoi, Akash Kumar, Zobaa and F. Ahmed. *Emotion Speech Recognition Based on Adaptive Fractional Deep Belief Network and Reinforcement Learning*, Advances in Intelligent Systems and Computing, Cognitive Informatics and Soft Computing Volume 768 (Proceedings of CISC 2017) 11, the contents of which are incorporated by reference herein in their entirety).

For example, "Gosh!", "Jeez!", "Oh my God!", "Voila!" can be considered familiar and popular exclamations, but some users may utter different phrases to express the same feelings. For example, expletives specific to certain users can also be updated in this manner and filled with white noise/alternative word later in accordance with the user settings. The NLP module of the audio sub-system can take into account native accents, linguistic variations, connotations, subtle nuances of diction, voice match-up and some other unexplored areas of the domain. Thus, the NLP module can be used for the continuous Transfer learning vein of the architecture.

Cluster Manager

In some embodiments, a function of the cluster manager is to receive information from the data processing pipeline and keep updating the distributed database after automated analysis for duplication and redundancy.

Figure 23A:
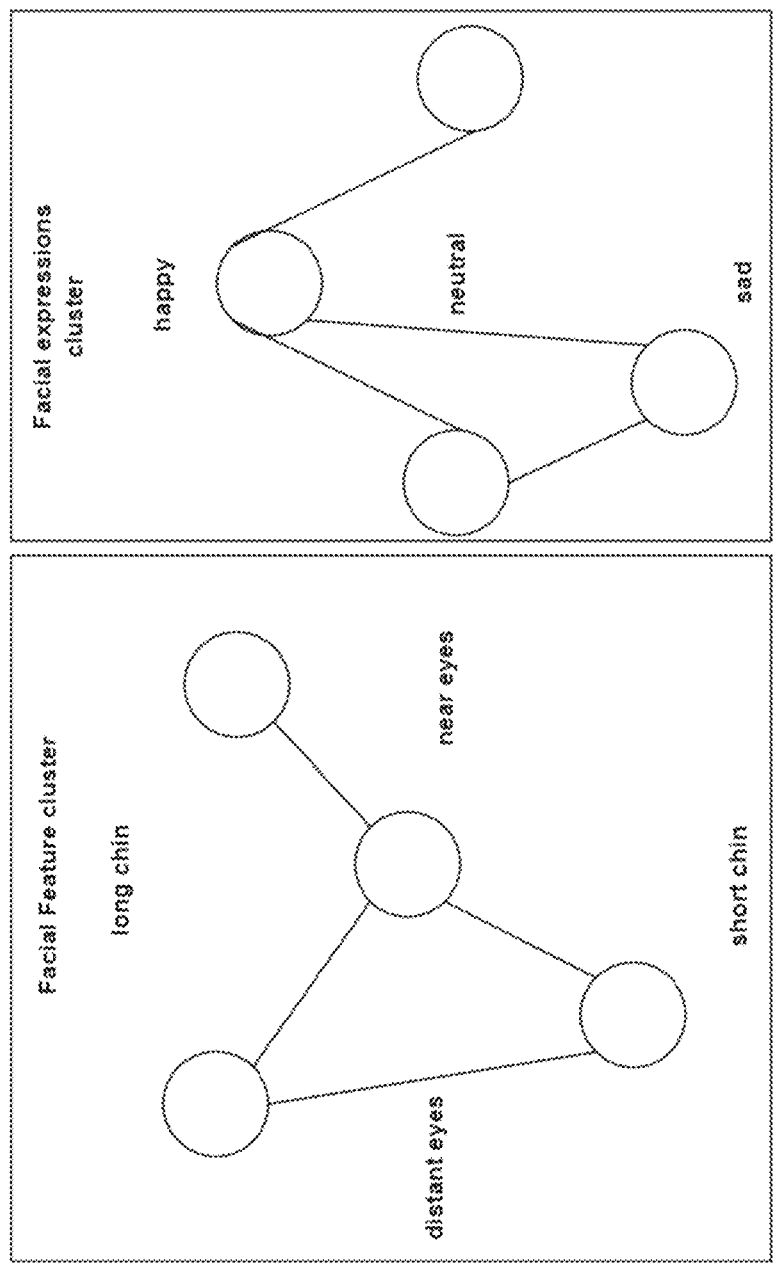
FIGS. 23A and 23B shows clusters for a face, according to an embodiment.
Figure 23B:
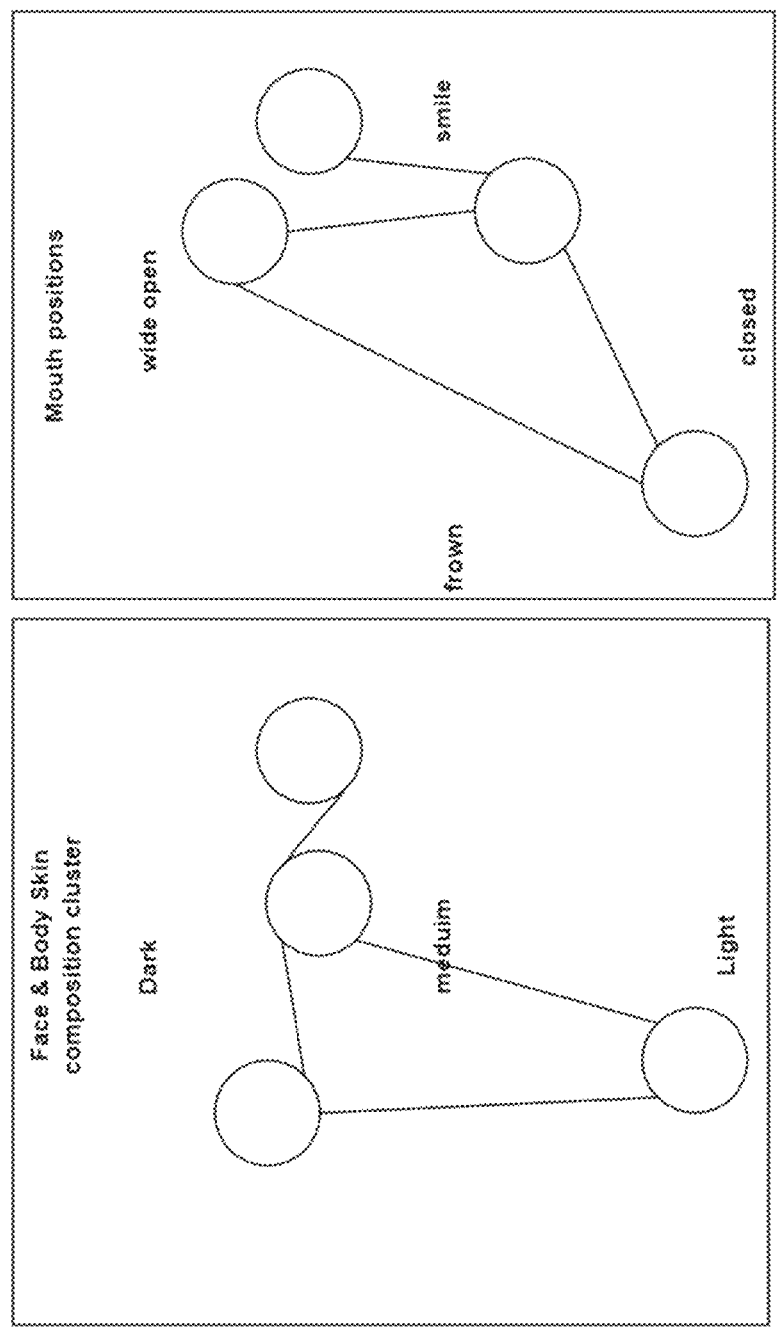

1. Facial Feature cluster (see, e.g., FIGS. 23A-23B), which can discern faces based on gender, symmetry, topography, fiducial similarity, bone structure, chin span, jaw bone, eye placement, eyebrow density, car spread, neck length and/or the like.
2. Facial Expression cluster (see, e.g., FIGS. 23A-23B), which can discern faces based on a range of expressions involving anger, contempt, disgust, fear, joy, sadness, surprise, a combination of the above, and/or the like.
3. Face and body skin composition cluster, which can discern skin color tones such as dark, medium and light, features such as pimples, warts, acne, rosacea, and complexion anomalies such as patches, circles, and shades.
4. Mouth positions cluster, which can discern wide open, closed, smiling, frowning, laughing, grinning, guffawing and other such physiognomic presentations.
5. Torso positions cluster (see, e.g., FIG. 24) which can discern the torso width (broad/medium/petite shoulders), static and dynamic postures hand gesture cluster (at-rest/lowered/raised) and finger gestures(open fist/pointing/waving).

Items 1-5 above are examples of the various morphographic data clusters which can managed by the cluster manager. One sub-modality is discussed with respect to FIGS. 23A-23B, and another sub-modality is discussed with respect to FIG. 24. Any user can be represented by a heuristic combination of all the above sub-modalities, and in some implementations, a hash is generated for each user which corresponds with the user image for identification.

Omnisization

Figure 25A:
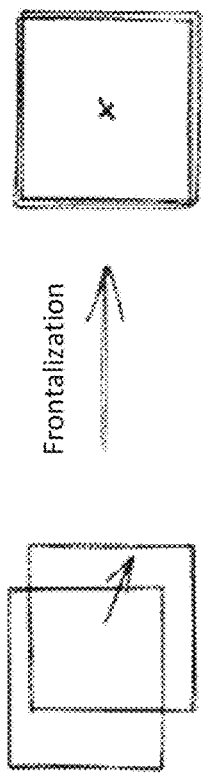
Figure 25B:
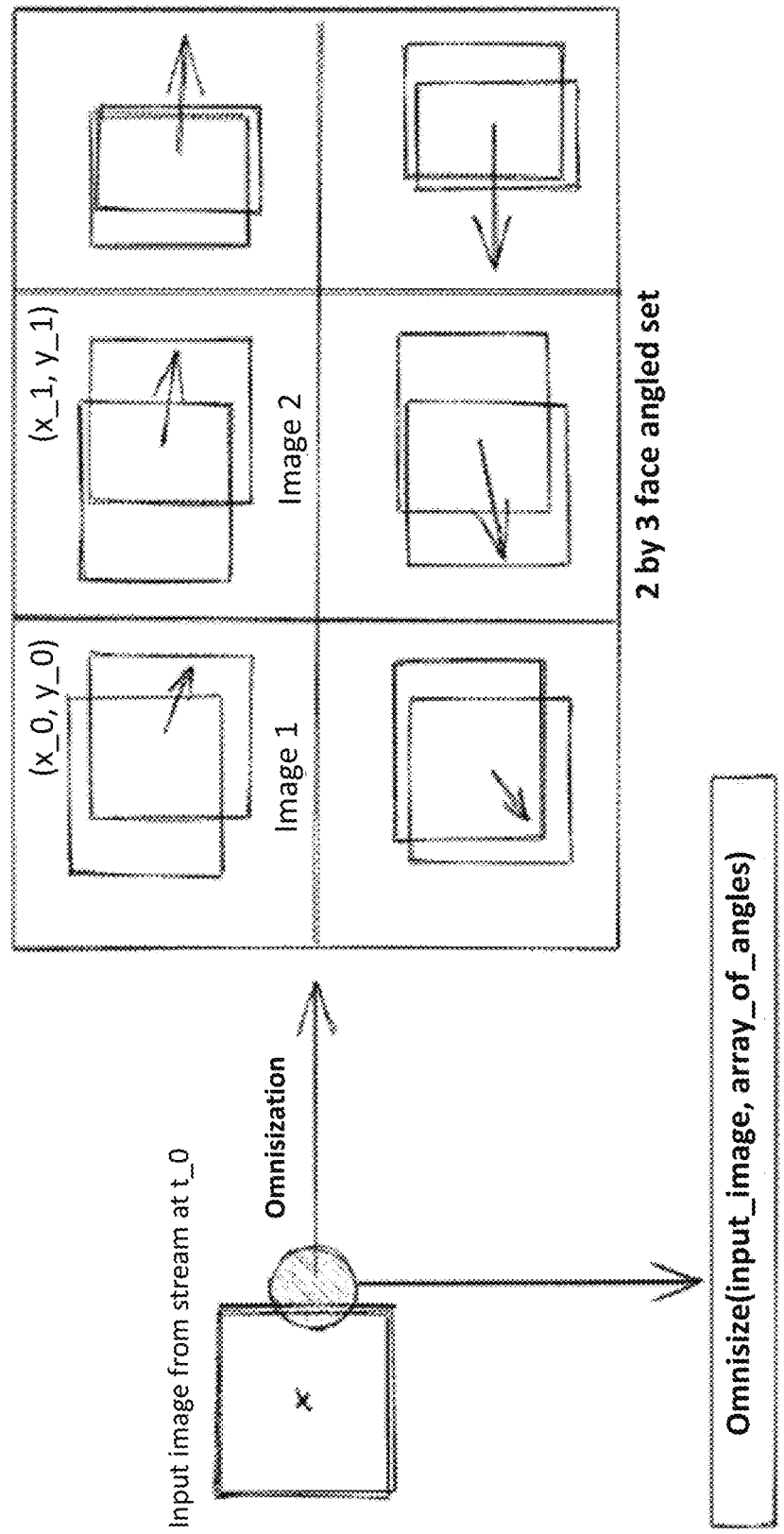

Omnisization can be used (e.g., by software model(s) 1106) to generate 3D geometries of faces from frontal and angular postures. In some implementations of omnisization (see, e.g., FIGS. 25A-25C), the following steps for 3D reconstruction can be performed:

1. Capture photos at various angles of the face, which is available from the inbound streams of video and the login image data.
2. A GAN pipeline to reconstruct sparse spatial facial topography data to a sparse point cloud.
3. A GAN pipeline to densify the facial topography by an upsampling GAN architecture.

Cluster Specific End-Layers

In some embodiments, in addition to an omnisization model, a sub-cluster system can be used in some implementations to create a hybrid ML model which aggregates with the general solution. The various data classified by the cluster manager, such as torso, facial feature, expression and countenance, are streamlined to the sub-cluster for analysis, sorting and batch training.

Figure 26A:
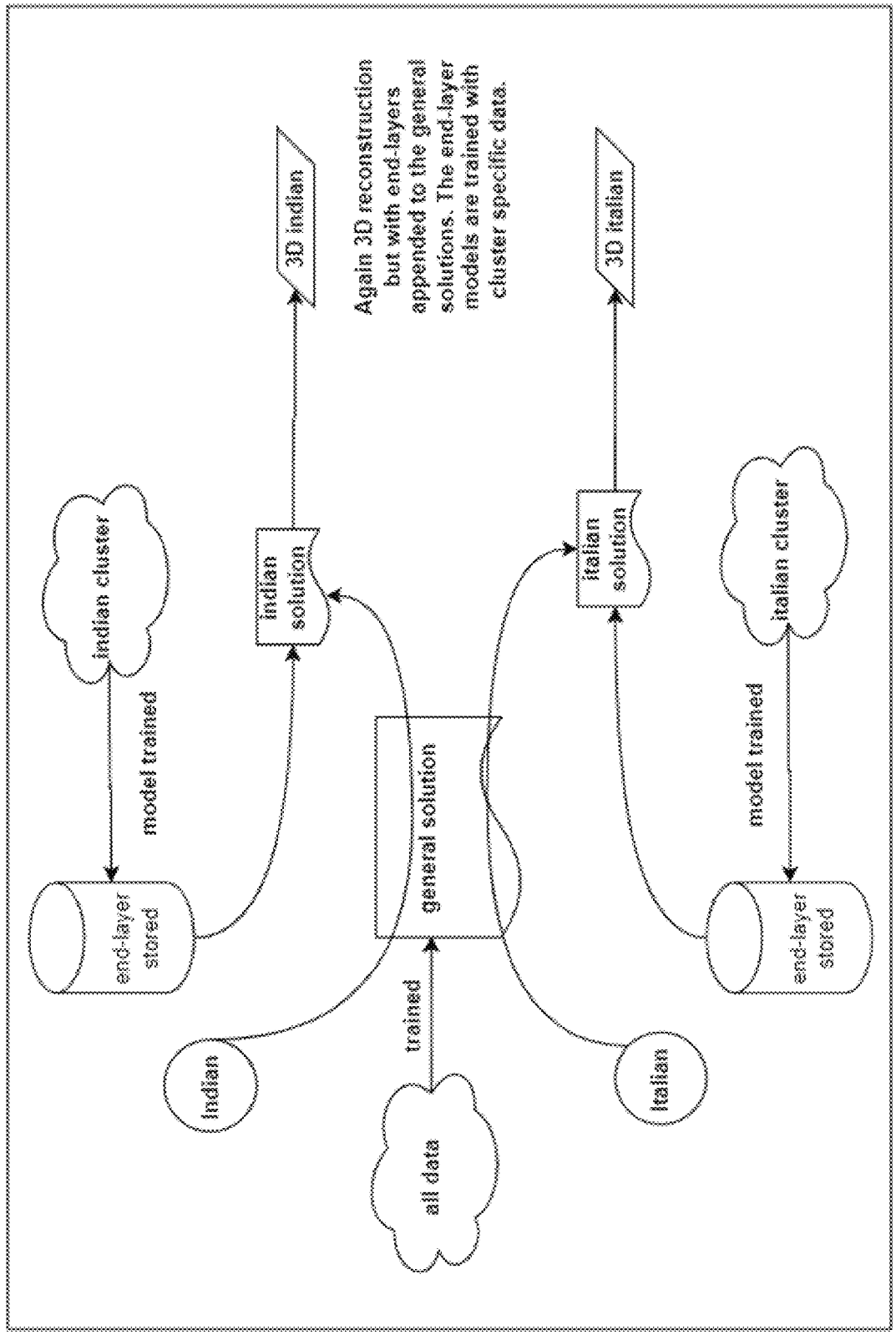
FIGS. 26A-26C illustrates 3D reconstruction based on ethnicity considerations, according to an embodiment.
Figure 26B:
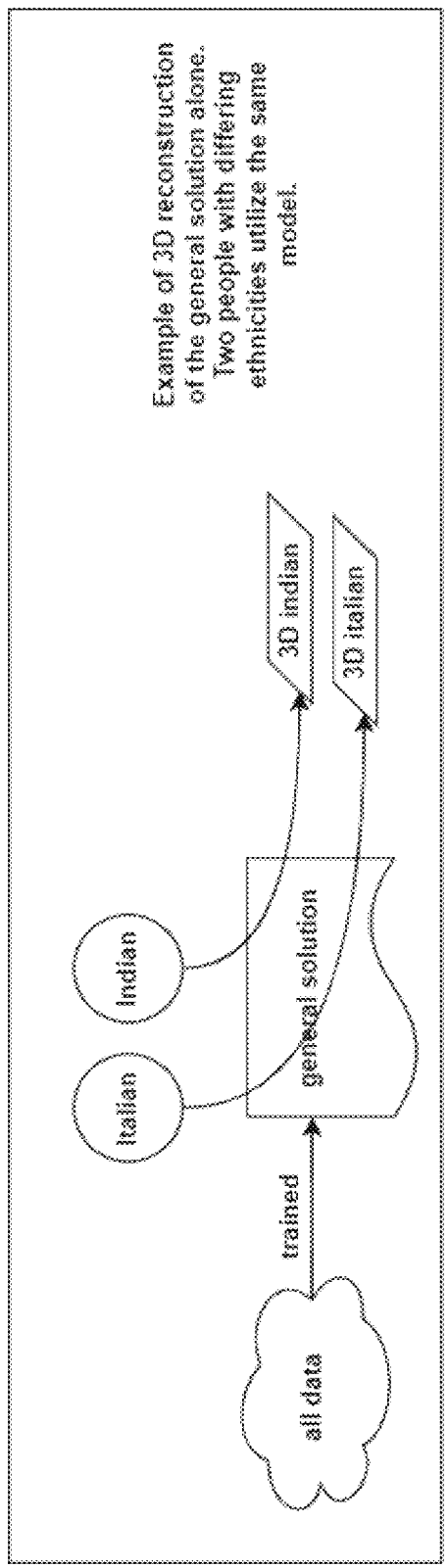

In some implementations, the sub-cluster is a classified feature mechanism of a human which when is found similar with another human who, inducts her into the data domain and trains the model a step ahead. Consider two distinct ethnicities (see, e.g., FIG. 26A) such as Indian and Italian which may also share some features like skin tone and facial geometry. When an Indian human happens to log in for the first time, the model is aligned with the pre-trained Indian model (see, e.g., FIG. 26B) and the 3D representation of hers is augmented with the thus far learnt Indian features. Similar can be the case with an Italian. Simultaneously the respective features sets can be enriched with the common traits of these two faces in question. In some implementations, this augmented classification can be a pre-processing mandate for the 3D reconstruction using CAN in the next step.

Figure 26C:
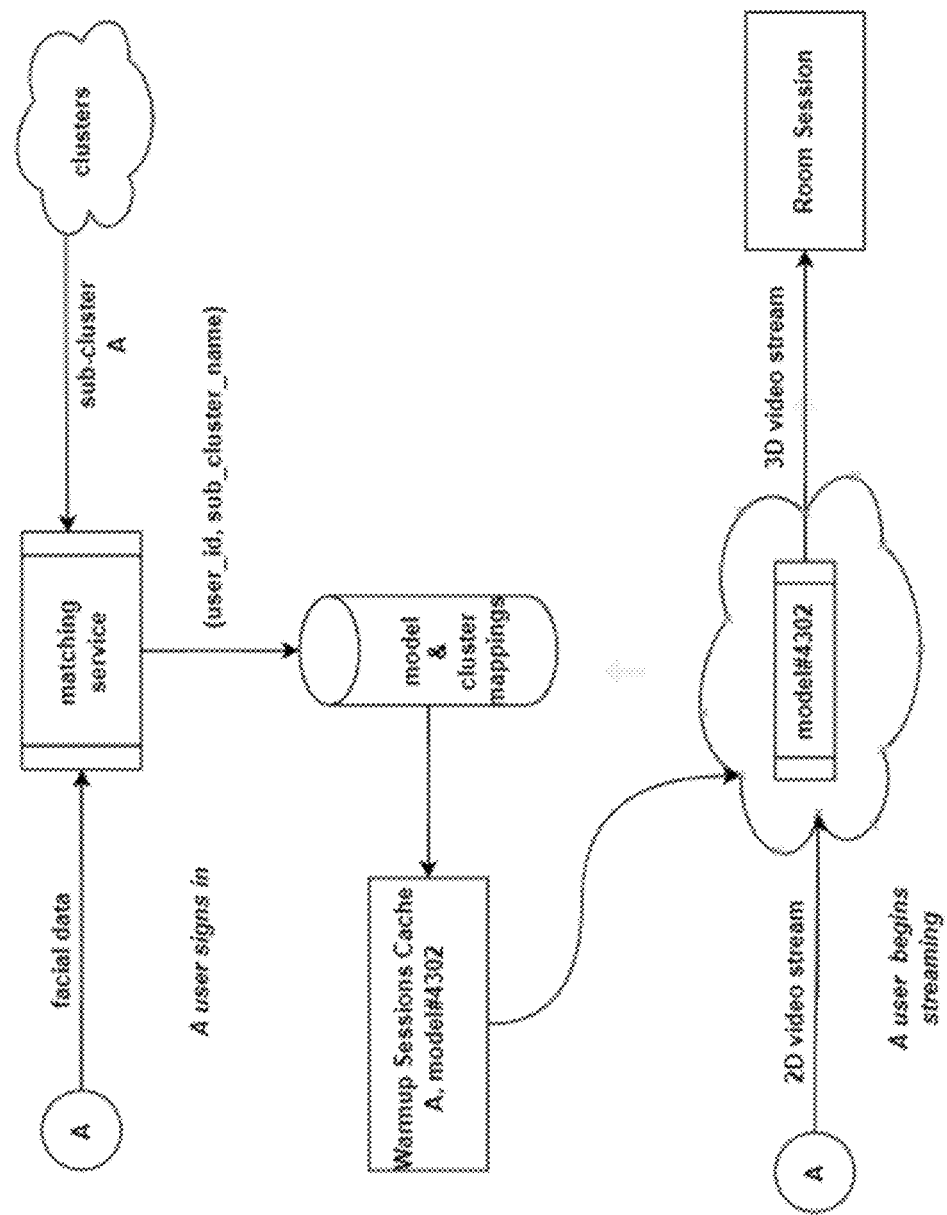

The sub-cluster can also provide a buffer for the data initiation and validation services including facial data matching and the cluster data. The sub-cluster system can map the aggregate data with respect to the participant's identity hashtag (see, e.g., FIG. 26C) and provide a cache for the warm-up sessions during the startup of the chat session. This bare minimal cache mapped on to the 2D video stream of the user data can initiate the 3D video streaming for the room session, which can improve to the expected level of performance with complete capabilities.

In some implementations, concepts discussed herein are related to conceptualizing, designing, implementing and deploying a self-sustaining, updating, maintainable, intelligent, novel and realistic ecosystem for mixed reality-based video chatting. In some implementations, concepts discussed herein are related to:

1. creating virtual spaces with minimalist data obtained from desktop hardware as basis
2. providing the user with the improved sensory cues so as to enhance realistic personal conversational experience.
3. observing idiosyncrasies of a member of the virtual space and thus constantly familiarizing her.
4. intelligently classifying and discerning the user biometrics, behaviour, language, facial expressions, skin tone, temperament, body motion, attitude and/or habits so as to keep the frontiers of the virtual demography safe, secure and trustworthy, adding to the security provided by the authentication protocols and in parallel collecting esoteric data for comprehensive analytics.
5. streamlining and auto-scheduling the various data channels in real-time so as to ensure the upkeep of the sanity, order, and improvement of the system.
6. possessing an adaptive architecture so as to accommodate any structural changes due to modular changes alongside development.

In some embodiments, virtual reality applications can be combined with real-time data streaming to generate collaborative video environments in which users may collaborate or converse. For example, a user can select or change their location via interaction with a 2D map, and based on the location of other participants, the user may begin to receive local participants' video feed(s).

In some embodiments, NIVR video teleconferencing systems of the present disclosure (e.g., system 1100 of FIG. 2) are configured to facilitate the display of users "within" (i.e., participating in) the NIVR environment to each other user, with a 3D-like appearance, and at angles that are dynamic, and thus more natural-seeming than they would otherwise appear when facing a camera directly within a 2D pane. Each user may appear, within a viewing area of an associated display of each other user, in full-body form, or from the torso upward (i.e., showing the head and torso), or from the chest/shoulders up, or from the neck up. Users can talk/converse naturally, gesture, and make eye contact with other users within the NIVR environment. Communications among users can be coordinated via one or more cloud servers. In some implementations, no avatars are shown for any of the users within the NIVR environment. Alternatively or in addition, an NIVR system of the present disclosure may not include a 3D camera, infrared camera, VR headset, and/or other specialized VR equipment. Additional details regarding such embodiments can be found, by way of example, at https://blog.google/technology/research/project-starline/, the content of which is incorporated by reference herein in its entirety.

In some embodiments, NIVR video teleconferencing systems of the present disclosure (e.g., system 1100 of FIG. 2) are configured to host hybrid events. For example, one or more remote presenters or speakers may appear in 3D within the NIVR environment. In some such implementations, the one or more remote presenters may appear as a hologram (optionally generated using a camera booth or other hologram generating equipment). In other such implementations, the one or more remote presenters may not appear as a hologram, and no camera booth is used. Alternatively or in addition, the NIVR system can use 5G technology for its communications. Additional details regarding such embodiments can be found, by way of example, at https://www.wework.com/info/holopresence, the entire content of which is incorporated by reference herein in its entirety.

In some embodiments, NIVR video teleconferencing systems of the present disclosure (e.g., system 1100 of FIG. 2) are configured to generate collaborative virtual environments (CVEs). The CVEs can be joined/attended by users using a processor, camera, and display monitor. The display monitor can include desktop monitors, laptop monitors, tablet display, smartphone displays, tele-cubicles, smart walls, etc. Such CVEs can facilitate, from the standpoint of the user's experience, the appearance of a seamless transition between, for example, a real conference room and a virtual conference room, for example to give the user the impression of an extended perception space. By representing remote conferees as 3D (or pseudo-3D) objects, gestures, eye contact and gaze can appear more natural. In some implementations, the NIVR video teleconferencing system uses the MPEG-4 multimedia standard. Alternatively or in addition, the NIVR video teleconferencing system can be configured to perform gaze estimation and redirection. Additional details regarding such embodiments can be found, by way of example, in "An immersive 3D video-conferencing system using shared virtual team user environments," by O. Schreer, CVE '02: *Proceedings of the 4$^{th}$ International Conference on collaborative Virtual Environments*, September. 2002, pp. 105-112, the entire contents of which are incorporated by reference herein in their entirety.

In some embodiments, NIVR video teleconferencing systems of the present disclosure (e.g., system 1100 of FIG. 2) are configured to facilitate immersive user experiences, for example by simulating scenarios of interactions among users (e.g., as patient and doctor, as athlete and trainer, as tourist and tour guide, etc.). Simulating such scenarios can include—in addition to the generation and presentation of pseudo-3D representations of other users—presenting/causing display of backgrounds, virtual objects, virtual tools, etc. within the same field of view being displayed. Interactions with a virtual object by a first user (performed via a compute device of the first user) may be viewed by a second user via a compute device of the second user, at an appropriate angle of observation given the relative positioning of the first user and the second user within the NIVR environment and/or within a room in which both users are seated. Such simulations can encourage user engagement for a variety of purposes. Additional details regarding such embodiments can be found, by way of example, in "Optimising the learning process with immersive virtual reality and non-immersive virtual reality in an educational environment," by V. Lee, et. Al, *Int. J. Mobiel Learning and Organization*, Vol. 14 (1) 2020, the entire contents of which are incorporated by reference herein in their entirety.

In some embodiments, NIVR video teleconferencing systems of the present disclosure (e.g., system 1100 of FIG. 2) are configured to host virtual exhibitions, relatively quickly and inexpensively. Such virtual exhibitions can include the display, for example, of representations of lost archaeological artifacts, thereby serving as virtual museums. 3D objects (such as archaeological artifacts) can be reproduced (e.g., based on photographs/images, such as RGB-D photographs/iamges) as 3D models and displayed (using solid model/video formats) within the NIVR environment. Additional details regarding such embodiments can be found, by way of example, in "From 3D reconstruction to virtual reality: A complete methodology for digital archaeological exhibition," by F. Bruno et al., *Journal of Cultural Heritage* (2010), the entire contents of which are incorporated by reference herein in their entirety.

In some embodiments, NIVR video teleconferencing systems of the present disclosure (e.g., system 1100 of FIG. 2) are configured to execute an algorithm to improve the computational efficiency of hardware-accelerated compression and encoding of video data without (or with minimal) compromise to video quality. Such algorithms can be implement in the GPU and/or in the cloud, as discussed herein. The algorithm can be used to perform early detection of all-zero blocks in H.264 video encoding. For example, based on the theoretical analyzes for the integer transform and quantization in H.264, a sufficient condition may be derived under which each quantized coefficient becomes zero. A more precise sufficient condition may then be proposed by modifying the calculation order of the sum of absolute difference obtained in the motion estimation. Additional details regarding such embodiments can be found, by way of example, in "An Improved Early Detection Algorithm for All-Zero Blocks in H.264 Video Encoding," by Y. Moon, et al., *IEEE Transactions on Circuits and Systems for Video Technology*, Vol. 15 (8) August 2005, the entire contents of which are incorporated by reference herein in their entirety.

In some embodiments, NIVR video teleconferencing systems of the present disclosure (e.g., system 1100 of FIG. 2) are configured to perform robust, real-time, high-resolution human video matting method (e.g. including the separation of foreground from background), for example with an ability to process 4K at 76 FPS and high definition (HD) at 104 FPS on a GPU (e.g., an Nvidia GTX 1080Ti GPU). A recurrent architecture can be used to leverage temporal information in video, to achieve improved temporal coherence and matting quality as compared with some known matting techniques. In some implementations, the video matting includes detection of a person/user and the segmentation of the data associated with the detected person/user from the image background. A deep learning pipeline can be used to replace the background with, e.g., an artificial intelligence (AI) green matte or a selected image (e.g., with super-high resolution accuracy). A deep learning training methodology can then be applied to one or more selected datasets. Additional details regarding such embodiments can be found, by way of example, at https://github.com/PeterLln/RobustVideoMatting, the entire contents of which are incorporated by reference herein in their entirety.

In some embodiments, NIVR video teleconferencing systems of the present disclosure (e.g., system 1100 of FIG. 2) are configured to perform facial expression recognition, by detecting and interpreting complex and subtle changes in facial muscles (e.g., based on a minimum amount of muscle movement data). Facial expression recognition can be performed, for example, using feed-forward deep neural networks (DNNs), optionally with sparse feature learning. Alternatively or in addition, deep learning-based age estimation can be performed based on facial contours and topography. Alternatively or in addition, facial expression recognition can be performed (e.g., on aging adult faces) and classified using a deep learning pipeline. Additional details regarding such embodiments can be found, by way of example, in "Sparse Simultaneous Recurrent Deep Learning for Robust Facial Expression Recognition" by M. Alam, et al., *IEEE Transactions on Neural Networks and Learning Systems* (2013), and in "Comparison Between Deep Learning Models and Traditional Machine Learning Approaches for Facial Expression Recognition in Ageing Adults. Journal of Computer Science and Technology" by A. Caroppo, et al. (2020), the entire contents of each of which are incorporated by reference herein in their entireties.

Figure 27A:
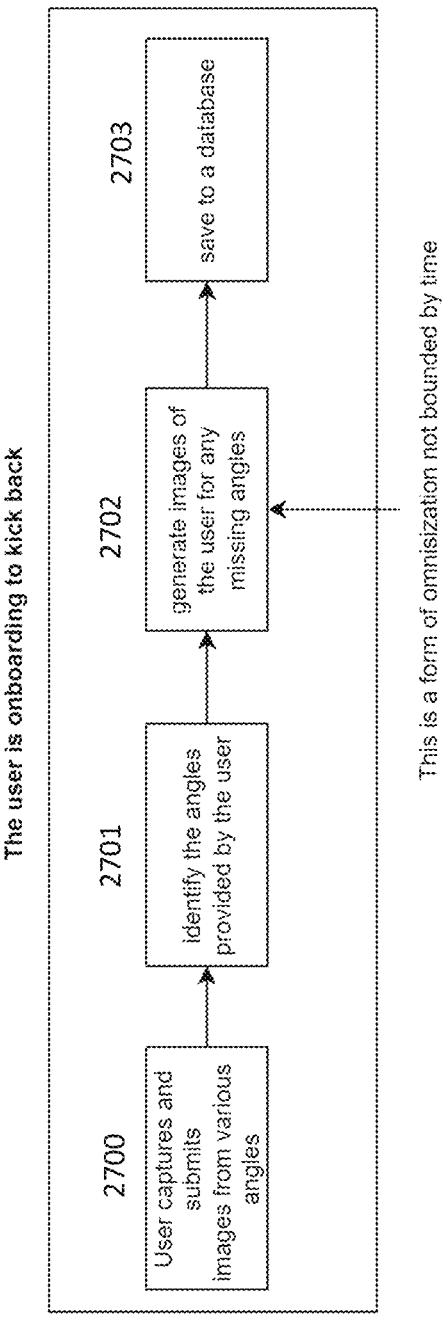
FIG. 27A shows an onboarding process (e.g., to an entity associated with compute device 1101, such as Kickback Space™), according to an embodiment.

FIG. 27A shows an onboarding process (e.g., to an entity associated with compute device 1101, such as Kickback Space™), according to an embodiment. In some implementations, the onboarding process can be performed by a processor (e.g., processor 1102). At 2700, images of a user are captured (e.g., by camera 1122A) at various angles of the user and submitted (e.g., sent to compute device 1101). At 2701, angles (i.e., perspective views) of the user for the images are identified. For example, one image could be of the user directly facing the camera, while another image could be of the user looking 15 degrees to the right of and 30 degrees upward from the camera. At 2702, additional images of the user for angles that have not been captured are generated using omnisization, which is not bound by time in some instances. At 2703, images of the user, which can include the actual images from 2700 and the synthetically generated images from 2702, are saved to a database (e.g., memory 1104).

Figure 27B:
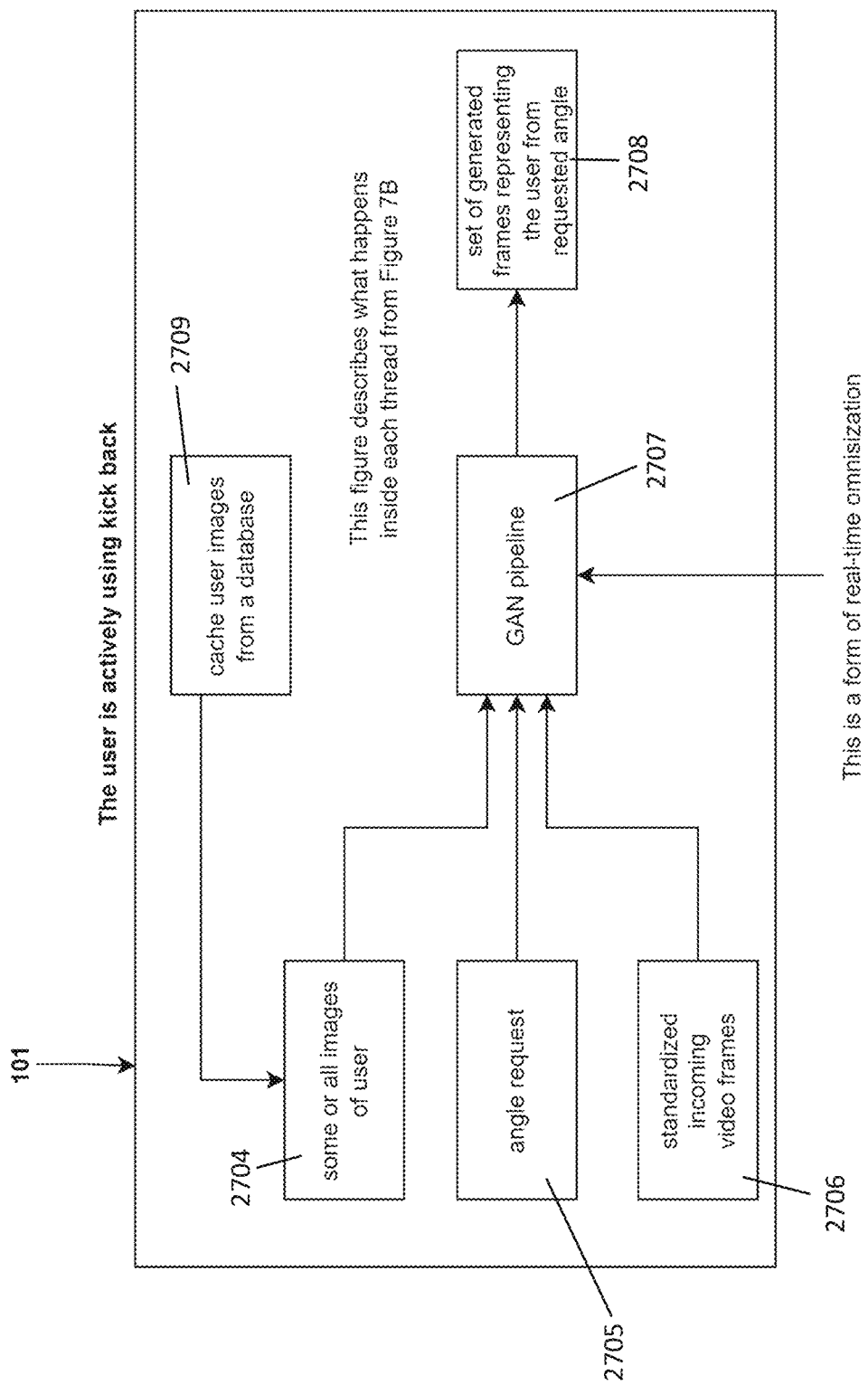
FIG. 27B shows a flowchart of a user actively using a KickBack™ Space server (e.g., hosted on compute device 1101), according to an embodiment.

FIG. 27B shows a flowchart of a user actively using a Kickback Space server (e.g., hosted on compute device 1101), according to an embodiment. In some implementations, the steps discussed with respect to FIG. 27B can be performed by a processor (e.g., processor 1102). The cache user images from a database 2709 can be equivalent to the images saved at step 2703 of FIG. 27A. At 2702, a GAN pipeline receives some or all images of a user 2704, angle request data 2705, and standardized incoming video frames 2706. The angle (i.e., perspective view) request data 2705 can be based on state information (e.g., state information 1108), and indicate a perspective view for which the standardized incoming video frames 2706 should be transformed to. The some or all images of a user 2704 can be selected from the database 2709, and include images of the user having a perspective view/angle as requested by angle request 2705. In turn, the GAN pipeline 2707 can generate a set of generated frames representing the user from the requested angle (i.e., video planes) at 2708.

In some embodiments, a non-immersive virtual reality (NIVR) method includes receiving, via a processor and from a first user compute device of a non-immersive virtual reality system, a first plurality of images of the first user. The first user compute device is associated with a first user. Each image from the first plurality of images is an image of the first user taken at an associated angle from a plurality of different angles. A second plurality of images of a second user associated with a second user compute device of the non-immersive virtual reality system is received, via the processor and from the second user compute device. Each image from the second plurality of images is an image of the second user taken at an associated angle from the plurality of different angles. A first video of the first user is received via the processor and from the first user compute device. The first video is processed via the processor to generate a first processed video. A second video of the second user is received via the processor and from the second user compute device. The second video is processed via the processor to generate a second processed video. The method also includes determining, via the processor and for a first virtual representation of the first user: (1) a first location of the first virtual representation in a virtual environment, and (2) a first field of view of the first virtual representation in the virtual environment. The method also includes determining, via the processor and for a second virtual representation of the second user: (1) a second location of the second virtual representation in the virtual environment, and (2) a second field of view of the second virtual representation in the virtual environment. The method also includes generating, via the processor, at least one first frame for a first video plane of the first virtual representation based on the first processed video, at least one image from the first plurality of images, the first location, the second location, the first field of view, and the second field of view. The method also includes generating, via the processor, at least one second frame for a second video plane of the second virtual representation based on the second processed video, at least one image from the second plurality of images, the first location, the second location, the first field of view, and the second field of view. The method also includes sending, via the processor, at least one first signal representing the at least one first frame for the first video plane to at least one engine, to cause display, at the second user compute device, of the at least one first frame for the first video plane in the virtual environment to the second user. The method also includes sending, via the processor, at least one second signal representing the at least one second frame for the second video plane to the at least one engine, to cause display, at the first user compute device, of the at least one second frame for the second video plane in the virtual environment to the first user.

In some implementations, the first video plane is dynamically updated with at least one third frame, substantially in real-time, to include a representation of at least one of a facial expression of the first user, a voice of the first user, or a torso movement of the first user. The second video plane is dynamically updated with at least one fourth frame, substantially in real-time, to include a representation of at least one of a facial expression of the second user, a voice of the second user, or a torso movement of the second user.

In some implementations, the generating of the at least one first frame for the first video plane and the generating of the at least one second frame for the second video plane are performed substantially in parallel, and the sending of the first signal and the sending of the second signal are performed substantially in parallel.

In some implementations, the virtual environment is an emulation of a virtual three-dimensional space.

In some implementations, each frame from the first video has a first common background, each frame from the second video has a second common background different than the first common background, each frame from the first processed video has a third common background, and each frame from the second processed video has the third common background.

In some implementations, the method also includes receiving, via the processor and from the first user compute device, a first request to join the virtual environment. A second request is received, via the processor and from the second user compute device, to join the virtual environment. The method may also include at least one of: sending, via the processor, at least one third signal to the first user compute device requesting the first plurality of images in response to determining that the first plurality of images has not been received; or sending, via the processor, at least one fourth signal to the second user compute device requesting the second plurality of images in response to determining that the second plurality of images has not been received.

In some implementations, the processing of the first video includes decoding, via the processor, each frame of the first video to generate a first plurality of decoded frames, and editing, via the processor and for each background portion of a frame from the first plurality of decoded frames, that background portion to a standard format. The processing of the second video can also include decoding, via the processor, each frame of the second video to generate a second plurality of decoded frames, and editing, via the processor and for each background portion of a frame from the second plurality of decoded frames, that background portion to the standard format.

In some embodiments, a non-immersive virtual reality (NIVR) method includes receiving, via a processor of a non-immersive virtual reality system, first state information. The first state information indicates (1) a first location of a first virtual representation of a first user in a virtual environment, (2) a second location of a second virtual representation of a second user in the virtual environment, (3) a first field of view of the first virtual representation of the first user in the virtual environment, and (4) a second field of view of the second virtual representation of the second user in the virtual environment. The method also includes receiving, via the processor and from a first user compute device associated with the first user, a plurality of images of the first user, each image from the plurality of images being an image of the first user taken at an associated angle from a plurality of different angles. A first set of video frames of the first user is received via the processor and from the first user compute device. The method also includes generating, via the processor, a first set of frames for a video plane of the first virtual representation based on the first set of video frames, at least one image from the plurality of images, the first location, the second location, the first field of view, and the second field of view. The method also includes sending, via the processor, a first signal representing the first set of frames to at least one engine to cause a second user compute device associated with the second user to display the first set of frames in the virtual environment to the second user. The method also includes receiving, via the processor, second state information indicating (1) a third location of the first virtual representation in the virtual environment different than the first location, (2) the second location of the second virtual representation in the virtual environment, (3) a third field of view of the first virtual representation in the virtual environment different than the first field of view, and (4) the second field of view of the second virtual representation in the virtual environment. The method also includes receiving, via the processor and from the first user compute device, a second set of video frames of the first user. The method also includes generating, via the processor, a second set of frames for the video plane of the first virtual representation (1) different than the first set of frames and (2) based on the second set of video frames, at least one image from the plurality of images, the third location, the second location, the third field of view, and the second field of view. The method also includes sending, via the processor, a second signal representing the second set of frames to the at least one engine.

In some implementations, the first set of frames shows at least one first perspective view of the first virtual representation of the first user, and the second set of frames shows at least one second perspective view of the first virtual representation of the first user different than the at least one first perspective view.

In some implementations, the method also includes receiving, via the processor and at a third time after the first time and the second time, third state information. The third state information indicates (1) a fourth location of the first virtual representation in the virtual environment different than the first location and the third location, (2) the second location of the second virtual representation in the virtual environment, (3) a fourth field of view of the first virtual representation in the virtual environment different than the first field of view and the third field of view, and (4) the second field of view of the second virtual representation in the virtual environment. A third set of video frames of the first user is received, via the processor and from the first user compute device. The method can also include generating, via the processor, a third set of frames for the video plane of the first virtual representation based on the third set of video frames, at least one image from the plurality of images, the fourth location, the second location, the fourth field of view, and the second field of view. The method can also include sending, via the processor, a third signal representing the third set of frames to the at least one engine.

In some implementations, the method also includes receiving, via the processor and at a third time after the first time and the second time, third state information indicating (1) a fourth location of the first virtual representation in the virtual environment different than the first location and the third location, (2) a fifth location of the second virtual representation in the virtual environment different than the second location, (3) a fourth field of view of the first virtual representation in the virtual environment different than the first field of view and the third field of view, and (4) a fifth field of view of the second virtual representation in the virtual environment different than the second field of view. The method can also include receiving, via the processor and from the first user compute device, a third set of video frames of the first user. The method can also include generating, via the processor, a third set of frames for the video plane of the first virtual representation based on the third set of video frames, at least one image from the plurality of images, the fourth location, the fifth location, the fourth field of view, and the fifth field of view. The method can also include sending, via the processor, a third signal representing the third set of frames to the at least one engine.

In some implementations, the method also includes receiving, via the processor and at a third time after the first time and the second time, third state information indicating (1) a fourth location of the first virtual representation in the virtual environment different than the first location and the third location, (2) the second location of the second virtual representation in the virtual environment, (3) a fourth field of view of the first virtual representation in the virtual environment different than the first field of view and the third field of view, and (4) the second field of view of the second virtual representation in the virtual environment. The method can also include determining that the first virtual representation is not in the second field of view of the second virtual representation based on the fourth location, the second location, and the fourth field of view. The method can also include refraining from generating a third set of frames of the first virtual representation.

In some implementations, the method also includes dynamically updating the video plane, in real-time, to include a representation of at least one of a facial expression of the first user, a voice of the first user, or a torso movement of the first user.

In some embodiments, a non-immersive virtual reality (NIVR) method includes receiving, via a processor and from N compute devices of a non-immersive virtual reality system, the N compute devices associated with N users, a plurality of sets of images. Each set of images from the plurality of sets of images is associated with one user from the N users and includes images of that user and taken at different angles, N being at least two. N videos are received via the processor and from the N compute devices, each video from the N videos associated with a unique user from the N users. Each frame from the N videos is processed, via the processor, to generate a N processed videos. The method also includes receiving, via the processor and for each time from a plurality of times, state information indicating, for each virtual representation that is from N virtual representations and that is associated with a user from the N users, (1) a location for that virtual representation in a virtual environment at that time, and (2) a viewing direction for that virtual representation in the virtual environment at that time. The method also includes generating, via the processor and for each time from the plurality of times, $(N) \times (N-1)$ unique sets of frames for $(N) \times (N-1)$ video planes based on the state information, the N processed videos, and the plurality of sets of images, each set of frames from the $(N) \times (N-1)$ unique sets of frames associated with (1) one virtual representation from the N virtual representations, and (2) one video plane from the $(N) \times (N-1)$ video planes. The method also includes causing, via the processor and using at least one engine, at least one compute device from the N compute devices to display $(N-1)$ unique sets of frames from the $(N) \times (N-1)$ unique sets of frames within the virtual environment.

In some implementations, the generating of the $(N) \times (N-1)$ unique sets of frames is performed by the processor in parallel.

In some implementations, N is three or more.

In some implementations, the virtual environment is non-immersive.

In some implementations, the processing of the N videos includes: (1) decoding each frame of each video from the N videos to generate a plurality of decoded frames, and (2) editing, for each background portion of the plurality of decoded frames, that background portion to a standard format, to generate each processed frame of each processed video from the N processed video.

In some implementations, each video plane from the $(N-1)$ video planes is dynamically updated, substantially in real-time, to include a representation of at least one of a facial expression of one unique user from the N users, a voice of the one unique user, or a torso movement of one unique user.

In some implementations, the processor uses at least one generative adversarial network to generate the $(N) \times (N-1)$ unique frames.

All combinations of the foregoing concepts and additional concepts discussed here within (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a graphics processing unit (GPU), a controller, a microcontroller, a state machine and/or the like. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   receiving, via a processor and from a first user compute device of a non-immersive virtual reality system, the first user compute device associated with a first user, a first plurality of images of the first user, each image from the first plurality of images being an image of the first user taken at an associated angle from a plurality of different angles;
   receiving, via the processor and from a second user compute device of the non-immersive virtual reality system, the second user compute device associated with a second user, a second plurality of images of the second user, each image from the second plurality of images being an image of the second user taken at an associated angle from the plurality of different angles;
   receiving, via the processor and from the first user compute device, a first video of the first user;
   processing, via the processor, the first video to generate a first processed video;
   receiving, via the processor and from the second user compute device, a second video of the second user;
   processing, via the processor, the second video to generate a second processed video;
   determining, via the processor and for a first virtual representation of the first user, (1) a first location of the first virtual representation in a virtual environment, and (2) a first field of view of the first virtual representation in the virtual environment;
   determining, via the processor and for a second virtual representation of the second user, (1) a second location of the second virtual representation in the virtual environment, and (2) a second field of view of the second virtual representation in the virtual environment;
   generating, via the processor, at least one first frame for a first video plane of the first virtual representation based on the first processed video, at least one image from the first plurality of images, and angle request data determined based on the first location, the second location, the first field of view, and the second field of view, the generating the at least one first frame including inputting the first processed video, the at least one image from the first plurality of images, and the angle request data into a processing pipeline that includes at least one generative adversarial network;
   generating, via the processor, at least one second frame for a second video plane of the second virtual representation based on the second processed video, at least one image from the second plurality of images, the first location, the second location, the first field of view, and the second field of view;
   sending, via the processor, at least one first signal representing the at least one first frame for the first video plane to at least one engine, to cause display, at the second user compute device, of the at least one first frame for the first video plane in the virtual environment to the second user; and sending, via the processor, at least one second signal representing the at least one second frame for the second video plane to the at least one engine, to cause display, at the first user compute device, of the at least one second frame for the second video plane in the virtual environment to the first user.

2. The method of claim 1, wherein:
the first video plane is dynamically updated with at least one third frame, substantially in real-time, to include a representation of at least one of a facial expression of the first user, a voice of the first user, or a torso movement of the first user, and
the second video plane is dynamically updated with at least one fourth frame, substantially in real-time, to include a representation of at least one of a facial expression of the second user, a voice of the second user, or a torso movement of the second user.

3. The method of claim 1, wherein:
the generating of the at least one first frame for the first video plane and the generating of the at least one second frame for the second video plane are performed substantially in parallel, and
the sending of the first signal and the sending of the second signal are performed substantially in parallel.

4. The method of claim 1, wherein the virtual environment is an emulation of a virtual three-dimensional space.

5. The method of claim 1, wherein each frame from the first video has a first common background, each frame from the second video has a second common background different than the first common background, each frame from the first processed video has a third common background, and each frame from the second processed video has the third common background.

6. The method of claim 1, further comprising:
receiving, via the processor and from the first user compute device, a first request to join the virtual environment;
receiving, via the processor and from the second user compute device, a second request to join the virtual environment; and
at least one of:
sending, via the processor, at least one third signal to the first user compute device requesting the first plurality of images in response to determining that the first plurality of images has not been received; or
sending, via the processor, at least one fourth signal to the second user compute device requesting the second plurality of images in response to determining that the second plurality of images has not been received.

7. The method of claim 1, wherein:
the processing of the first video includes:
decoding, via the processor, each frame of the first video to generate a first plurality of decoded frames, and
editing, via the processor and for each background portion of a frame from the first plurality of decoded frames, that background portion to a standard format; and
the processing of the second video includes:
decoding, via the processor, each frame of the second video to generate a second plurality of decoded frames, and
editing, via the processor and for each background portion of a frame from the second plurality of decoded frames, that background portion to the standard format.

8. A method, comprising receiving, via a processor of a non-immersive virtual reality system, first state information indicating (1) a first location of a first virtual representation of a first user in a virtual environment, (2) a second location of a second virtual representation of a second user in the virtual environment, (3) a first field of view of the first virtual representation of the first user in the virtual environment, and (4) a second field of view of the second virtual representation of the second user in the virtual environment;
receiving, via the processor and from a first user compute device associated with the first user, a plurality of images of the first user, each image from the plurality of images being an image of the first user taken at an associated angle from a plurality of different angles;
receiving, via the processor and from the first user compute device, a first set of video frames of the first user;
generating, via the processor, a first set of frames for a video plane of the first virtual representation based on the first set of video frames, at least one image from the plurality of images, and first angle request data determined based on the first location, the second location, the first field of view, and the second field of view, the generating the first set of frames including inputting the first set of video frames, the at least one image from the plurality of images, and the first angle request data into a processing pipeline that includes at least one generative adversarial network;
sending, via the processor, a first signal representing the first set of frames to at least one engine to cause a second user compute device associated with the second user to display the first set of frames in the virtual environment to the second user;
receiving, via the processor, second state information indicating (1) a third location of the first virtual representation in the virtual environment different than the first location, (2) the second location of the second virtual representation in the virtual environment, (3) a third field of view of the first virtual representation in the virtual environment different than the first field of view, and (4) the second field of view of the second virtual representation in the virtual environment;
receiving, via the processor and from the first user compute device, a second set of video frames of the first user;
generating, via the processor, a second set of frames for the video plane of the first virtual representation (1) different than the first set of frames and (2) based on the second set of video frames, at least one image from the plurality of images, and second angle request data determined based on the third location, the second location, the third field of view, and the second field of view, the generating the second set of frames including inputting the second set of video frames, the at least one image from the plurality of images, and the second angle request data into the processing pipeline; and
sending, via the processor, a second signal representing the second set of frames to the at least one engine.

9. The method of claim 8, wherein the first set of frames shows at least one first perspective view of the first virtual representation of the first user, and the second set of frames shows at least one second perspective view of the first virtual representation of the first user different than the at least one first perspective view.

10. The method of claim 8, further comprising:
receiving, via the processor and at a third time after the first time and the second time, third state information indicating (1) a fourth location of the first virtual representation in the virtual environment different than the first location and the third location, (2) the second location of the second virtual representation in the virtual environment, (3) a fourth field of view of the first virtual representation in the virtual environment different than the first field of view and the third field of view, and (4) the second field of view of the second virtual representation in the virtual environment;
receiving, via the processor and from the first user compute device, a third set of video frames of the first user;
generating, via the processor, a third set of frame for the video plane of the first virtual representation based on the third set of video frames, at least one image from the plurality of images, the fourth location, the second location, the fourth field of view, and the second field of view; and
sending, via the processor, a third signal representing the third set of frames to the at least one engine.

11. The method of claim 8, further comprising:
receiving, via the processor and at a third time after the first time and the second time, third state information indicating (1) a fourth location of the first virtual representation in the virtual environment different than the first location and the third location, (2) a fifth location of the second virtual representation in the virtual environment different than the second location, (3) a fourth field of view of the first virtual representation in the virtual environment different than the first field of view and the third field of view, and (4) a fifth field of view of the second virtual representation in the virtual environment different than the second field of view;
receiving, via the processor and from the first user compute device, a third set of video frames of the first user;
generating, via the processor, a third set of frames for the video plane of the first virtual representation based on the third set of video frames, at least one image from the plurality of images, the fourth location, the fifth location, the fourth field of view, and the fifth field of view; and
sending, via the processor, a third signal representing the third set of frames to the at least one engine.

12. The method of claim 8, further comprising:
receiving, via the processor and at a third time after the first time and the second time, third state information indicating (1) a fourth location of the first virtual representation in the virtual environment different than the first location and the third location, (2) the second location of the second virtual representation in the virtual environment, (3) a fourth field of view of the first virtual representation in the virtual environment different than the first field of view and the third field of view, and (4) the second field of view of the second virtual representation in the virtual environment;
determining that the first virtual representation is not in the second field of view of the second virtual representation based on the fourth location, the second location, and the fourth field of view; and
refraining from generating a third set of frames of the first virtual representation.

13. The method of claim 8, further comprising:
dynamically updating the video plane, in real-time, to include a representation of at least one of a facial expression of the first user, a voice of the first user, or a torso movement of the first user.

14. A method, comprising
receiving, via a processor and from N compute devices of a non-immersive virtual reality system, the N compute devices associated with N users, a plurality of sets of images, each set of images from the plurality of sets of images being associated with one user from the N users and including images of that user and taken at different angles, N being at least two;
receiving, via the processor and from the N compute devices, N videos, each video from the N videos associated with a unique user from the N users;
processing, via the processor, each frame from the N videos to generate a N processed videos;
receiving, via the processor and for each time from a plurality of times, state information indicating, for each virtual representation that is from N virtual representations and that is associated with a user from the N users, (1) a location for that virtual representation in a virtual environment at that time, and (2) a viewing direction for that virtual representation in the virtual environment at that time;
generating, via the processor and for each time from the plurality of times, $(N) \times (N-1)$ unique sets of frames for $(N) \times (N-1)$ video planes based on the state information, the N processed videos, and the plurality of sets of images, each set of frames from the $(N) \times (N-1)$ unique sets of frames associated with (1) one virtual representation from the N virtual representations, and (2) one video plane from the $(N) \times (N-1)$ video planes; and
causing, via the processor and using at least one engine, at least one compute device from the N compute devices to display $(N-1)$ unique sets of frames from the $(N) \times (N-1)$ unique sets of frames within the virtual environment.

15. The method of claim 14, wherein the generating of the $(N) \times (N-1)$ unique sets of frames is performed by the processor in parallel.

16. The method of claim 14, wherein N is three or more.

17. The method of claim 14, wherein the virtual environment is non-immersive.

18. The method of claim 14, wherein:
the processing of the N videos includes:
decoding each frame of each video from the N videos to generate a plurality of decoded frames, and
editing, for each background portion of the plurality of decoded frames, that background portion to a standard format, to generate each processed frame of each processed video from the N processed video.

19. The method of claim 14, wherein:
each video plane from the $(N-1)$ video planes is dynamically updated, substantially in real-time, to include a representation of at least one of a facial expression of one unique user from the N users, a voice of the one unique user, or a torso movement of one unique user.

20. The method of claim 14, wherein the processor causes the N processed videos and the plurality of sets of images to be input into at least one generative adversarial network to generate the $(N) \times (N-1)$ unique frames.

* * * * *